(12) United States Patent
Espiau et al.

(10) Patent No.: US 8,102,123 B2
(45) Date of Patent: Jan. 24, 2012

(54) EXTERNAL RESONATOR ELECTRODE-LESS PLASMA LAMP AND METHOD OF EXCITING WITH RADIO-FREQUENCY ENERGY

(75) Inventors: Frederick Matthew Espiau, Topanga, CA (US); Mehran Matloubian, Encino, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 1119 days.

(21) Appl. No.: 11/981,884

(22) Filed: Oct. 31, 2007

(65) Prior Publication Data

US 2011/0285306 A1    Nov. 24, 2011

Related U.S. Application Data

(63) Continuation-in-part of application No. 11/543,736, filed on Oct. 4, 2006, now Pat. No. 7,291,985.

(60) Provisional application No. 60/723,144, filed on Oct. 4, 2005.

(51) Int. Cl.
*H01J 7/27* (2006.01)
*H01Q 1/26* (2006.01)
(52) U.S. Cl. .................. 315/111.71; 315/111.01; 315/34
(58) Field of Classification Search ............. 315/111.01, 315/111.21, 111.31, 111.51, 111.71, 111.91, 315/34, 248
See application file for complete search history.

(56) References Cited

U.S. PATENT DOCUMENTS

| | | | | |
|---|---|---|---|---|
| 4,383,203 A | * | 5/1983 | Stanley | .......................... 315/248 |
| 5,013,959 A | | 5/1991 | Kogelschatz | |
| 5,561,351 A | * | 10/1996 | Vrionis et al. | ................. 315/248 |
| 5,838,108 A | * | 11/1998 | Frank et al. | ...................... 315/39 |
| 5,886,480 A | * | 3/1999 | Penzenstadler et al. | ....... 315/248 |
| 6,018,218 A | | 1/2000 | Terada et al. | |
| 6,737,809 B2 | | 5/2004 | Espiau et al. | |
| 2001/0035720 A1 | | 11/2001 | Guthrie et al. | |
| 2005/0029947 A1 | | 2/2005 | Kraus et al. | |

FOREIGN PATENT DOCUMENTS

| | | |
|---|---|---|
| EP | 1 601 003 A | 11/2005 |
| GB | 2 413 005 A | 10/2005 |
| JP | 2006 040867 A | 2/2006 |
| WO | WO 2004/059694 A | 7/2004 |
| WO | WO 2006/006129 A | 1/2006 |

OTHER PUBLICATIONS

1st Office Action for Chinese Patent Application No. 200680036692. 9. Response to 1st Office Action for Chinese Patent Application No. 200680036692.9.
Notification for the Grant of Invention Patent Right (Notice of Allowance) for Chinese Patent Application No. 200680036692.9.

* cited by examiner

*Primary Examiner* — Douglas W Owens
*Assistant Examiner* — Minh D A
(74) *Attorney, Agent, or Firm* — Tope-McKay & Associates

(57) ABSTRACT

Described is an electrode-less plasma lamp comprising a gas-fill vessel, a gas-fill contained within the gas-fill vessel, an RF electromagnetic radiation source, an RF electromagnetic resonator, an output probe that couples RF energy from the RF electromagnetic resonator to the gas-fill vessel, an input probe that couples RF energy from the RF electromagnetic radiation source to the resonator, and a grounding strap that holds a metal veneer surrounding the resonator and a portion of the gas-fill vessel at RF ground. Also described are many variations of the electrode-less plasma lamp, non-limiting examples of which include embodiments that employ other probes in a Dielectric Resonant Oscillator to drive the lamp, a lamp employing more than one resonator per gas-fill vessel, and many methods of improving light-harvesting, including raising the gas-fill vessel away from the resonator via a coaxial transmission line, and collecting light with an optical reflector.

19 Claims, 34 Drawing Sheets

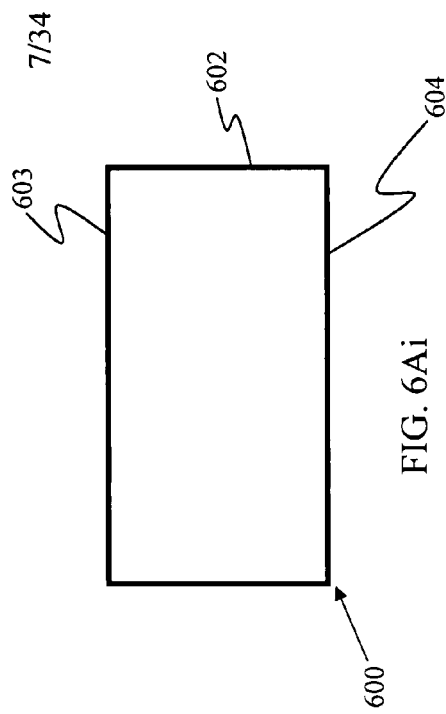
FIG. 6Ai
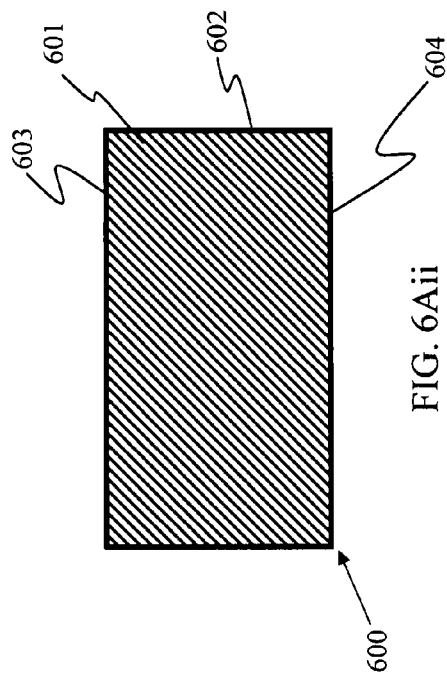
FIG. 6Aii
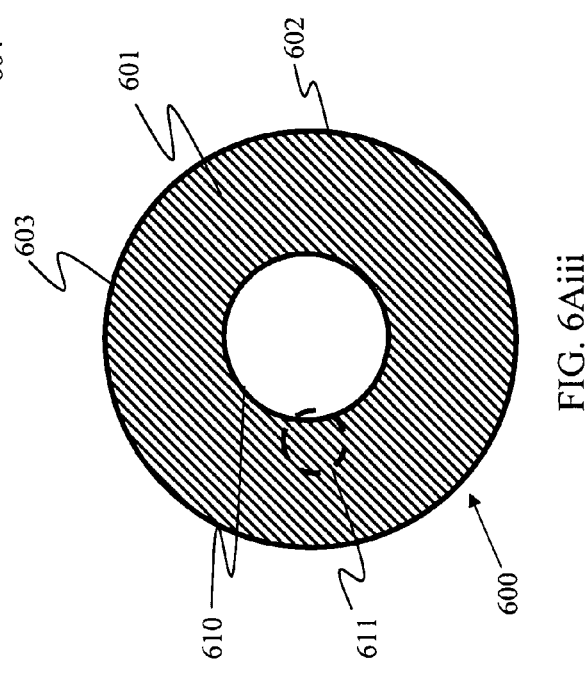
FIG. 6Aiii
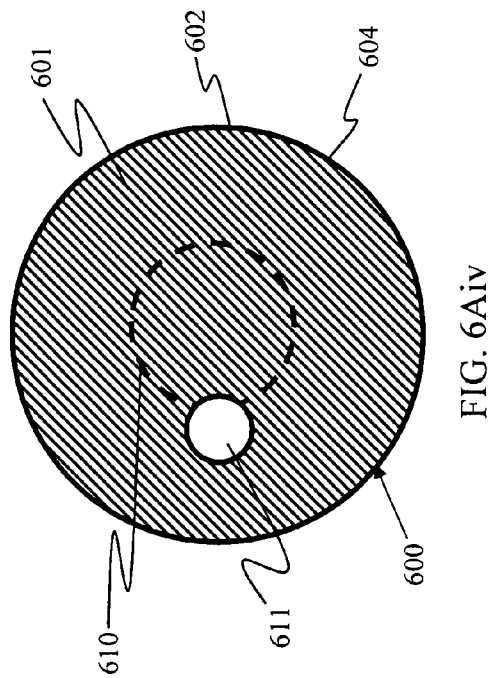
FIG. 6Aiv

FIG. 6Biii

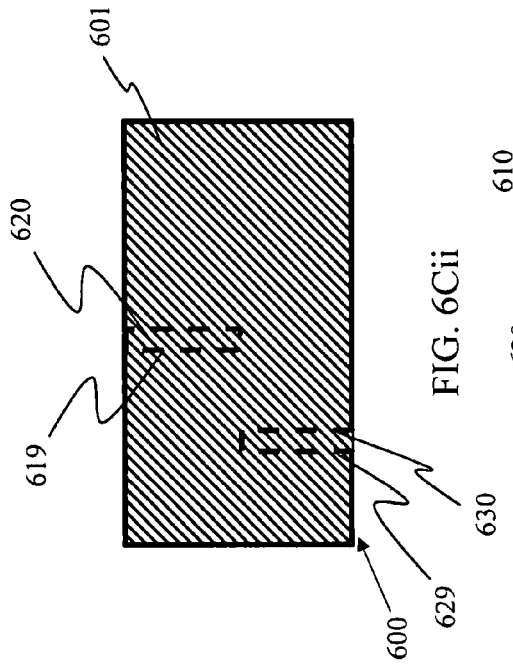
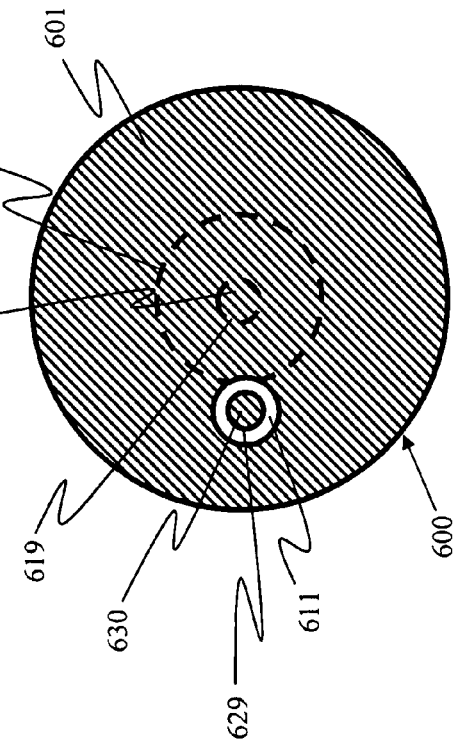
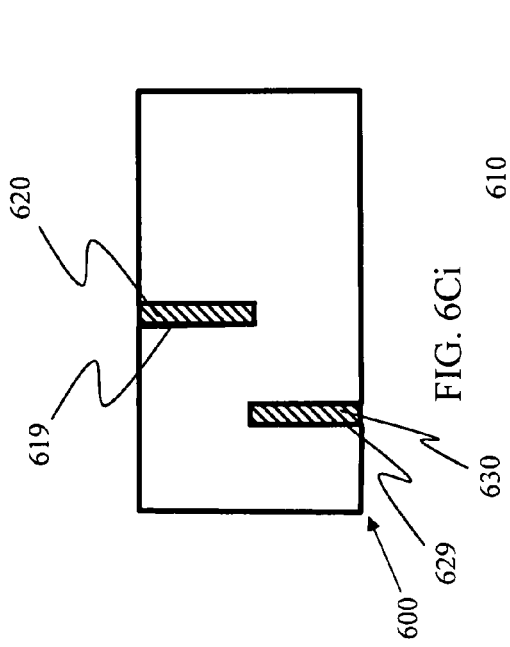

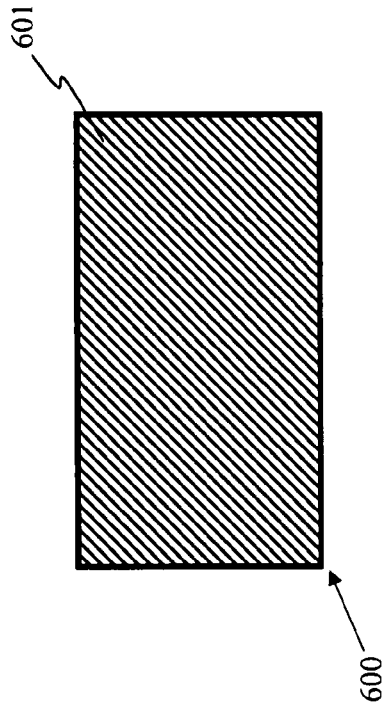
FIG. 6Dii
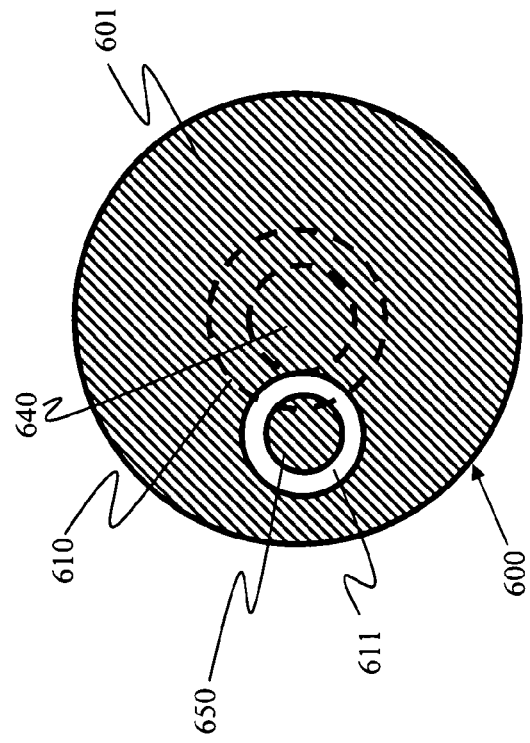
FIG. 6Div
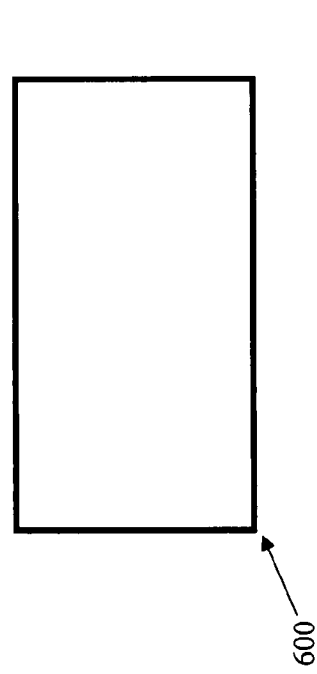
FIG. 6Di
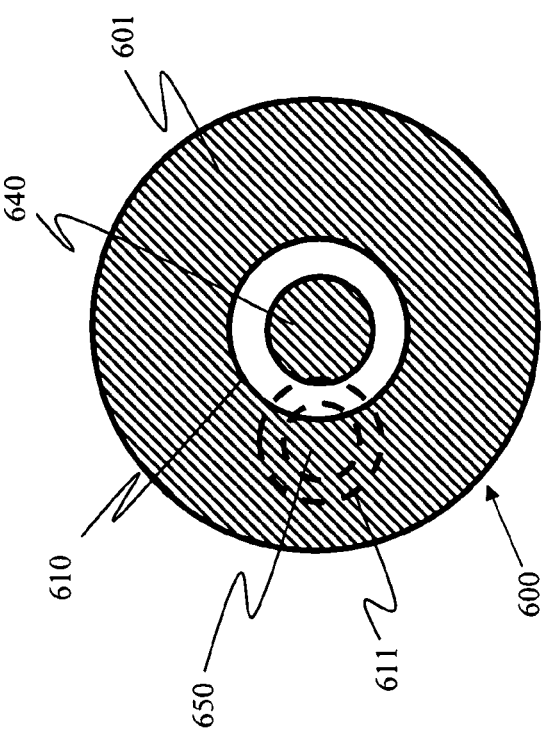
FIG. 6Diii

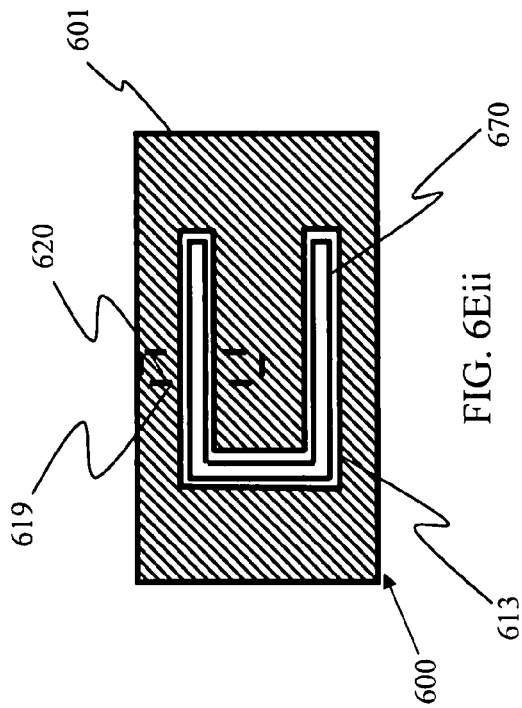
FIG. 6Ei
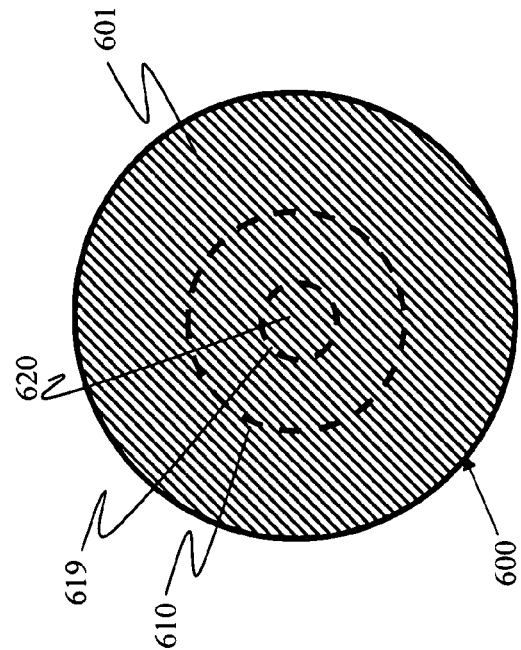
FIG. 6Eii
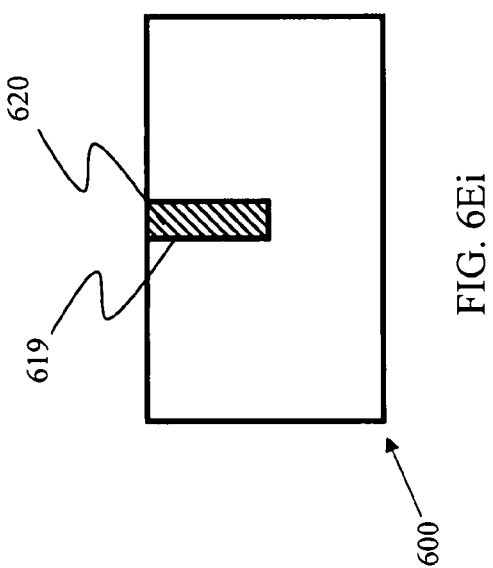
FIG. 6Eiii
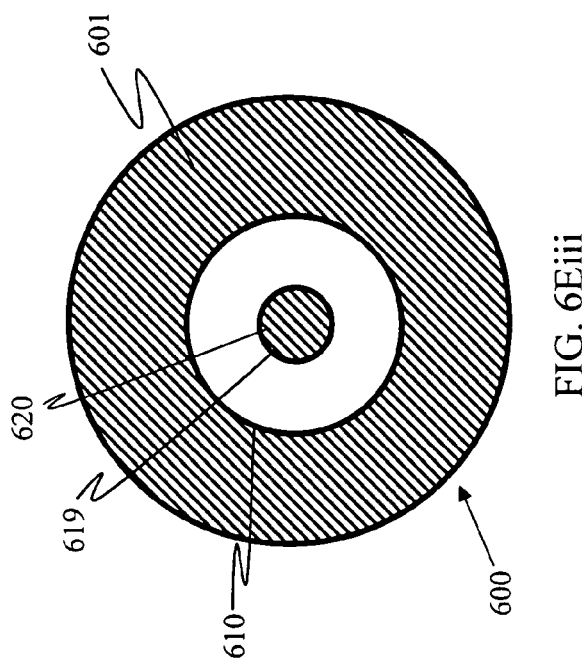
FIG. 6Eiv

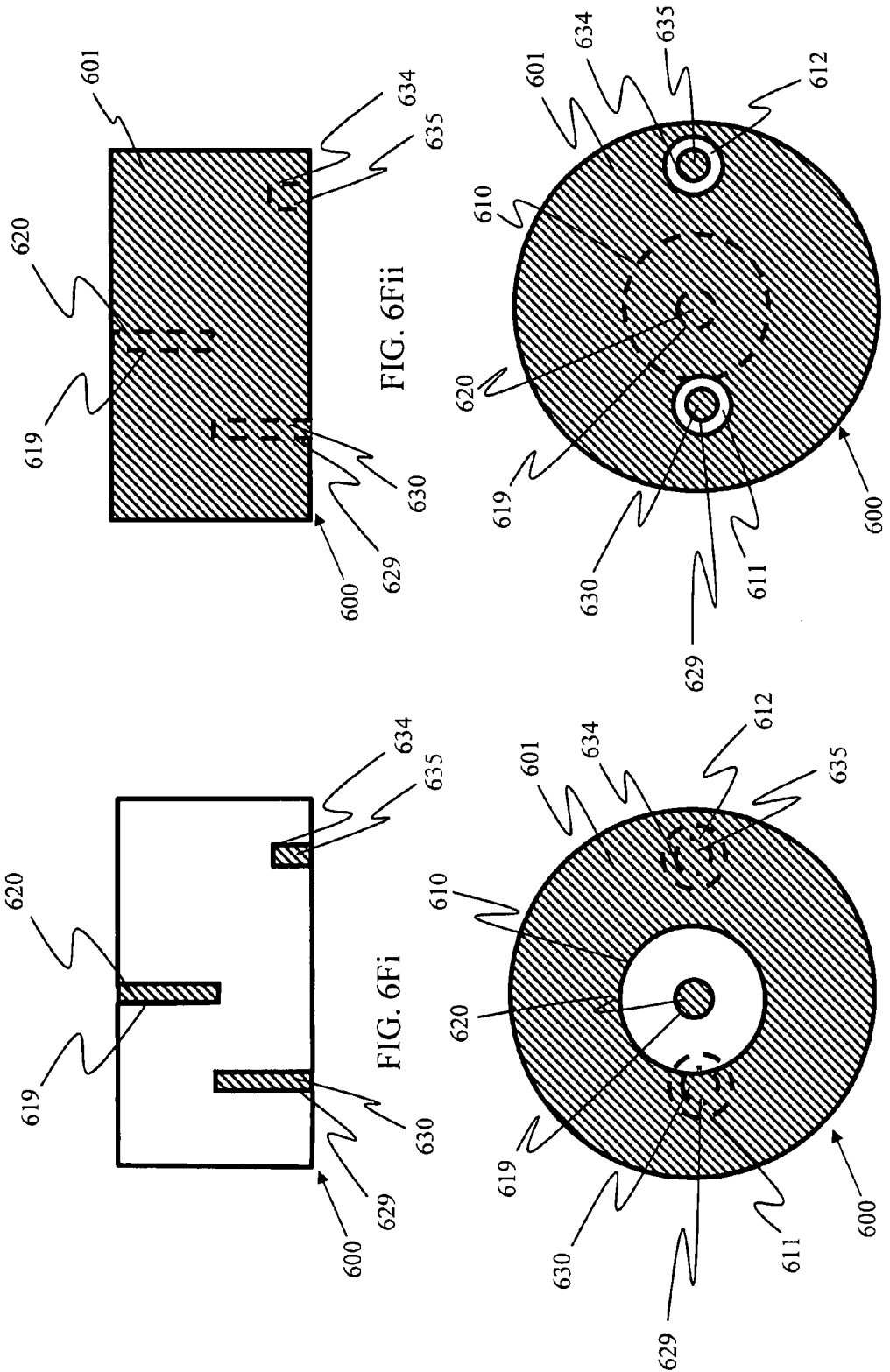

FIG. 6Giii

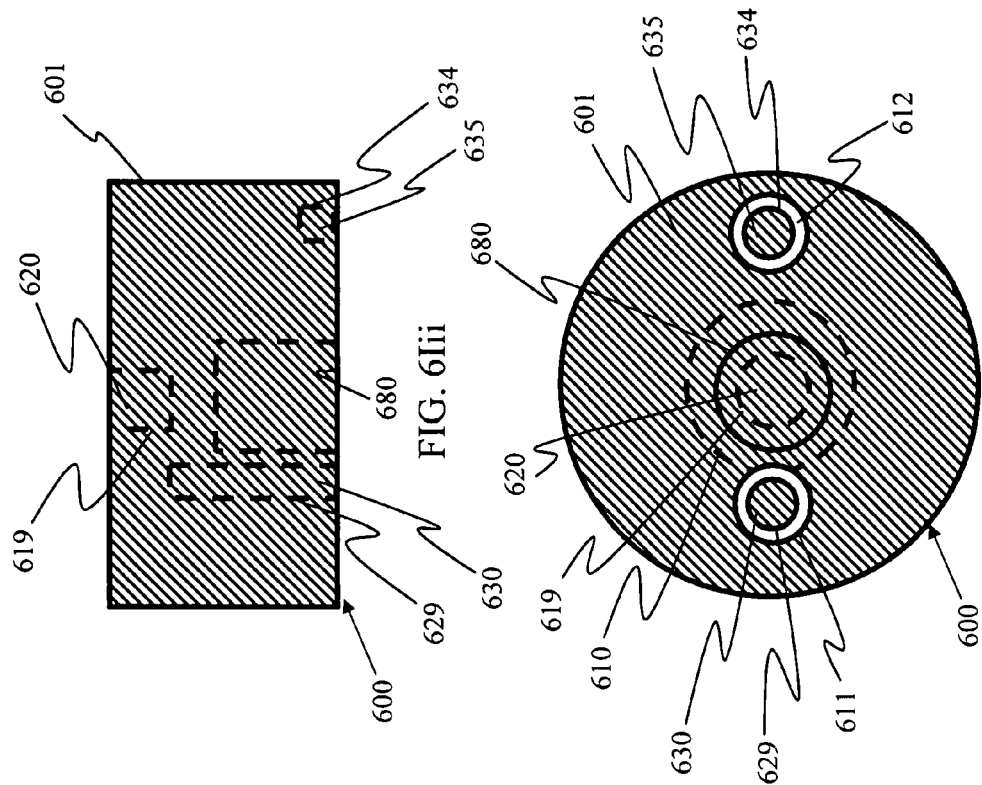
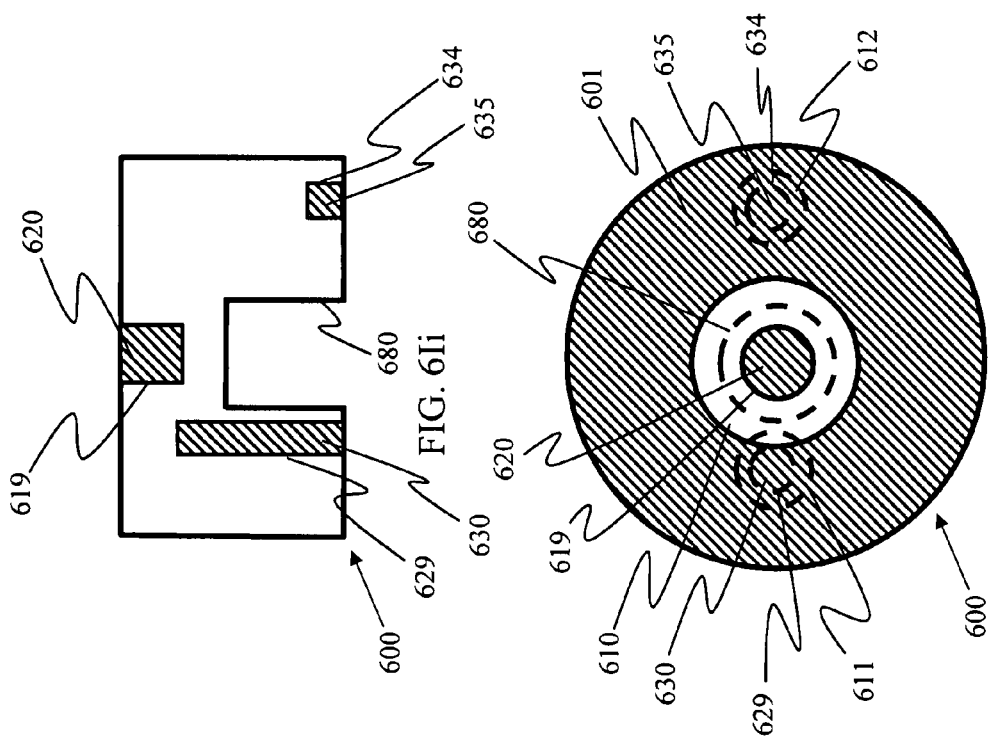

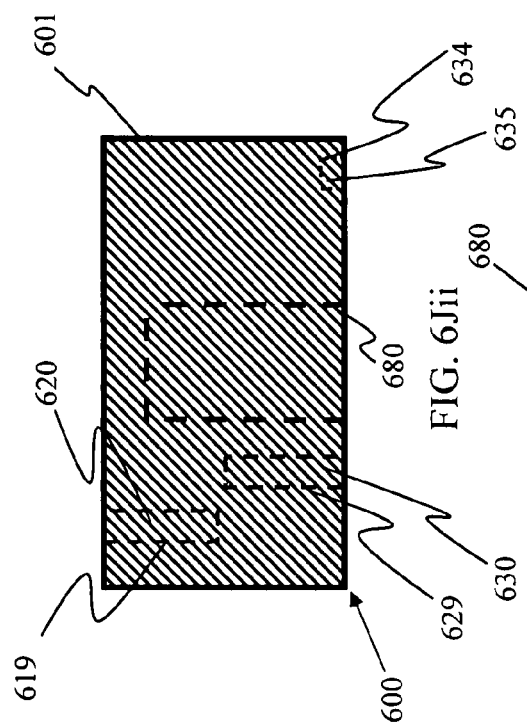
FIG. 6Ji
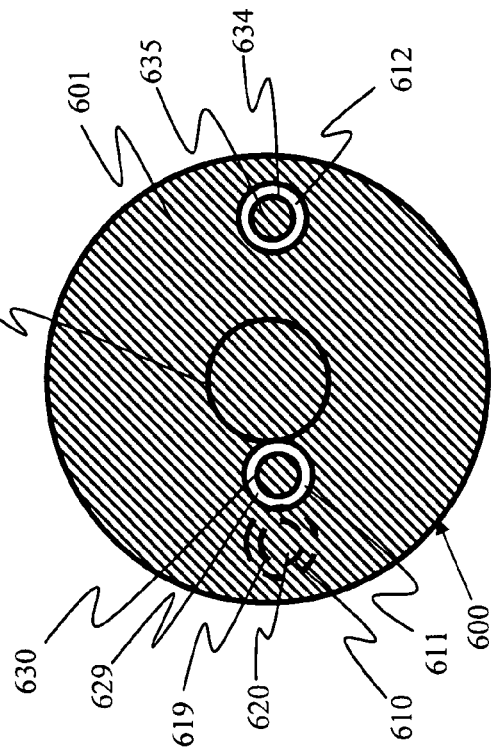
FIG. 6Jiii
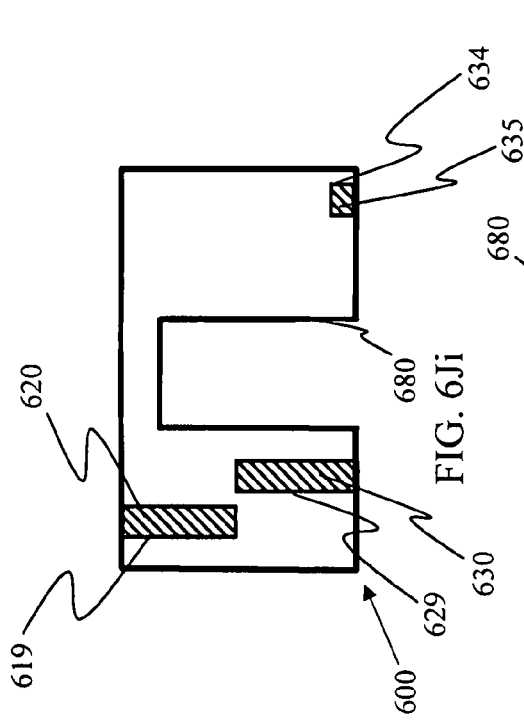
FIG. 6Jii
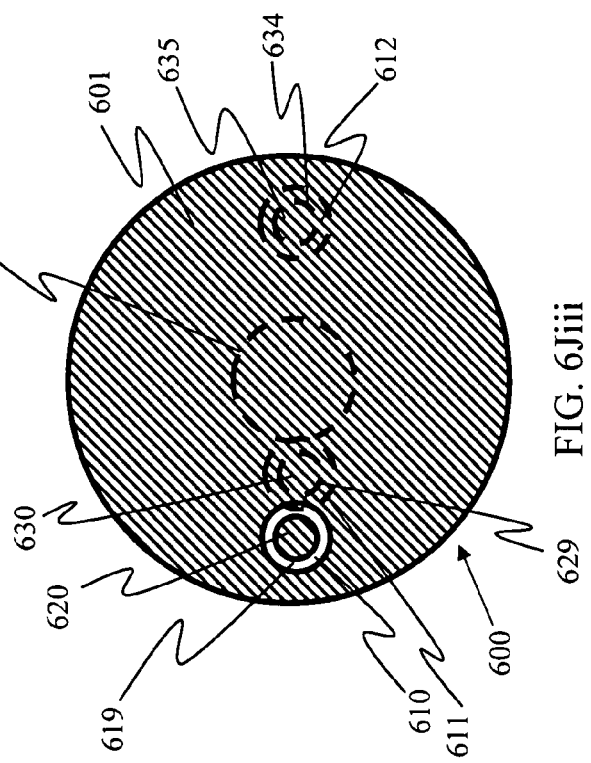
FIG. 6Jiv

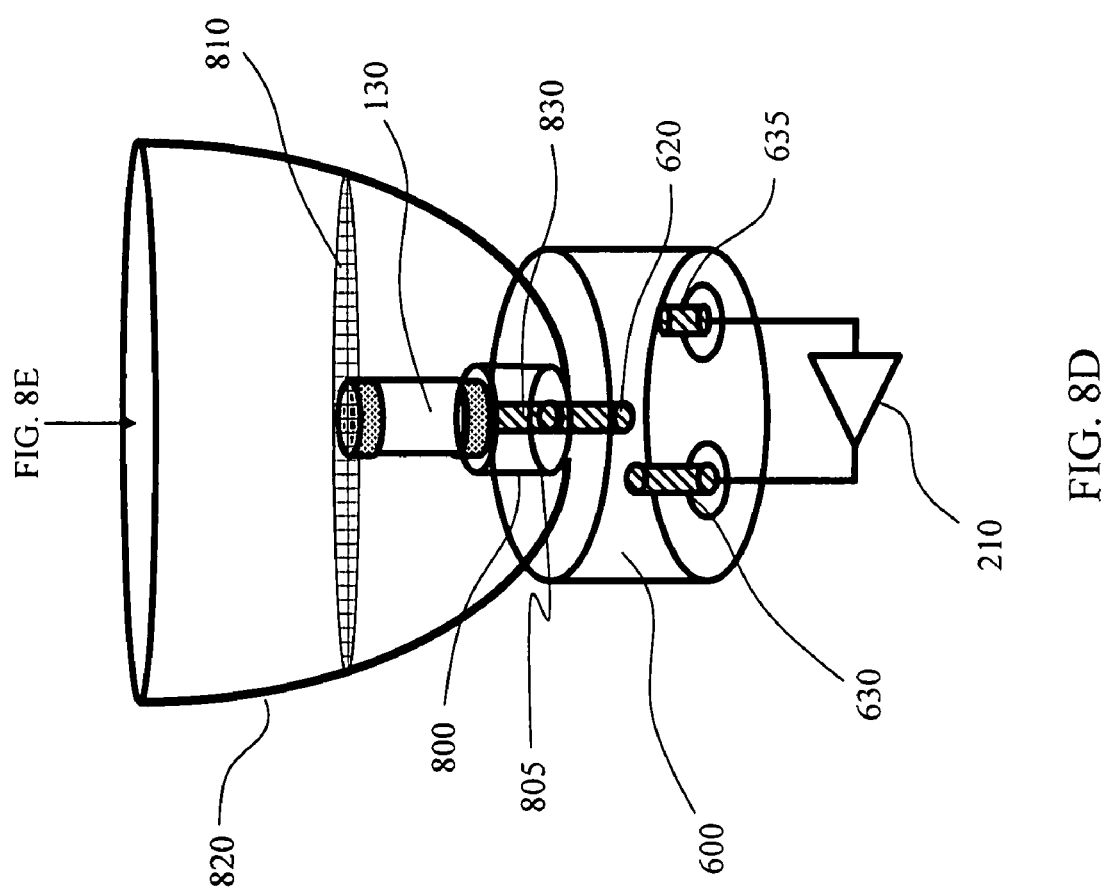

EXTERNAL RESONATOR ELECTRODE-LESS PLASMA LAMP AND METHOD OF EXCITING WITH RADIO-FREQUENCY ENERGY

PRIORITY CLAIM

The present invention is a continuation-in-part patent application, claiming the benefit of priority of U.S. Utility application Ser. No. 11/543,736, filed on Oct. 4, 2006 U.S. Pat. No. 7,291,985, entitled "External Resonator/Cavity Electrode-less Plasma Lamp and Method of Exciting with Radio-Frequency Energy," which further claims the benefit of priority of U.S. Provisional Application No. 60/723,144, filed on Oct. 4, 2005, entitled, "External Resonator/Cavity Electrode-less Plasma Lamp and Method of Exciting with Radio-Frequency Energy."

BACKGROUND (1) Field

The field of the present invention relates to devices and methods for generating light, more particularly to the field of plasma lamps, and still more particularly to plasma lamps driven by a radio-frequency source without the use of internal electrodes or surrounding dielectric bodies that enhance electromagnetic field coupling. Additionally, the field of the present invention relates to devices and methods where the lamp is not incorporated into or a subset of a microwave resonator, a cavity or a waveguide, in particular the lamp and resonator or cavity structure are not geometrically contiguous.

(2) Related Art

Plasma lamps provide extremely bright, broadband light, and are useful in applications such as projection systems, industrial processing, and general illumination. The typical plasma lamp manufactured today contains a gas-fill or mixture of a noble gas (Argon, Xenon, or other) and trace amounts of a light emitter that are excited to form a plasma. Plasma interaction with the light emitter (e.g. Sodium and Mercury) gives rise to light in the UV, visible, and near infrared portions of the electromagnetic spectrum. Gas ionization resulting in plasma formation is accomplished by passing a high-current through closely-spaced electrodes contained within the vessel that houses the plasma. This arrangement, however, suffers from electrode deterioration due to sputtering of the metal electrodes, and therefore exhibits a limited lifetime.

Electrode-less plasma lamps driven by microwave sources overcome the lifetime issue related to electrode deterioration and have been disclosed in the prior art. For example, both U.S. Pat. No. 6,617,806B2 (Kirkpatrick et. al.) and US Patent Application Number US2001/0035720A1 (Guthrie et. al.) disclose similar basic configurations of a gas-fill encased either in a bulb or a sealed recess within a dielectric body forming a waveguide, with microwave energy being provided by a source such as a magnetron and introduced into the waveguide and heating the plasma resistively. U.S. Pat. No. 6,737,809B2 (Espiau et. al.) discloses a somewhat different arrangement whereby the plasma-enclosing bulb is contiguous with a dielectric resonator and forms part of a resonant microwave circuit with a microwave amplifier to provide the excitation.

U.S. Pat. No. 7,098,598 (Kraus et. al.) discloses capacitive coupling by optimizing the value of the coupling capacitance to the bulb. The optimization is done using specific ranges of thicknesses of the coupling capacitor dielectric in combination with a specific range of dielectric constant. This approach limits the size of the bulb into which radio-frequency (RF) energy can be coupled efficiently for a given operating frequency. In particular, it is more difficult to couple energy into smaller bulbs because of the smaller value of the coupling capacitance.

Each of the embodiments described above uses a dielectric or metal/dielectric waveguiding body forming—whether deliberately or unwittingly—a resonant cavity surrounding the bulb containing the plasma. The driving microwave energy is introduced into the waveguide body using various probing means well-known to those skilled in the art of microwave engineering. The waveguide body surrounding the bulb brings with it a host of difficulties including wasted light, poor etendue, lamp size related to resonance or excitation frequency, shift in resonant frequency during lamp start-up/warm-up requiring additional circuitry and complexity, manufacturing obstacles, and related costs. These obstacles, and the obstacles discussed above, including lifetime and size limitations, are overcome by the invention presented herein.

SUMMARY

This invention provides distinct advantages over electrode-less plasma lamps in the background art. Firstly, using an external resonator or cavity structure enables lamp operation at frequencies well below 1 GHz, lowering lamp cost and extending the range of lamp applications. Moreover, in the present invention, it is possible to impedance match to the bulb very efficiently and relatively independently of the value of the coupling capacitor by using a high Q resonator in addition to the coupling capacitor, thus allowing efficient coupling of RF energy into any size bulb (gas-fill vessel). Furthermore during lamp start-up and warm-up the resonant frequency of the resonator does not shift significantly, eliminating the need for additional circuitry. Whereas the ability to collect light is a serious drawback of the approaches previously discussed in the art, the physical separation of the lamp from the dielectric waveguide body or the resonant cavity provided by this invention allows increased light harvesting. In addition, the lamp has significantly better etendue, which is a critical parameter for light sources used for projection systems such as lamps for rear projection televisions (RPTVs) and front projectors. Finally, by removing the fundamental compromise between dimensions of the dielectric waveguide body and operating frequency, this invention makes it possible to substantially reduce lamp size to again extend the range of applications. Moreover, in addition to these three substantial advantages, these lamps still form bright, spectrally-stable sources that exhibit energy efficiency and long lifetimes. Rather than incorporating the gas-fill vessel as a subset of the dielectric waveguiding body, the bulb is capacitively driven by an external resonator that delivers the required field to the gas-fill vessel to ignite the plasma and then sustains the plasma.

Briefly, the lamp includes an amplified RF source/oscillator operating in the frequency range between approximately 10 MHz to 10 GHz and emitting powers between approximately 10 W and 500 W. The lamp further includes an external resonator, preferably with (but not limited to) a quality factor (Q) of greater than 100. In the embodiment of a lumped circuit or a distributed circuit (such as a dielectric resonator or a coaxial resonator), the resonator follows the RF source and is intended to provide the necessary field to ignite the plasma and then couple the necessary energy to sustain the plasma. In its simplest implementation, the resonant circuit comprises a parallel resistor, capacitor, or inductor network, but is not limited to this configuration, and all other configurations known in the art are suitable equivalents. The lamp further includes impedance matching networks between the RF source and resonator and between the resonator and gas-fill vessel to ensure optimal energy transfer between the RF source and gas-fill vessel. The lamp further includes coupling structures that deliver energy in and out of the resonator. Such coupling schemes can be accomplished in a number of ways, non-limiting examples of which include: conductively, via coaxial probes or via patch antennae. The lamp further includes a closed vessel made out of quartz or similarly transparent and refractory materials; the approximate diameter of the vessel might be 6 mm, but, as can be appreciated by one of ordinary skill in the art, this size varies depending on the application. This closed vessel contains the gas fill. Portions of the outside walls of the vessel can be coated or in intimate mechanical contact with a metallic layer used to capacitively couple the RF energy to the plasma. In some cases a thin layer of a refractory dielectric material is used between the metallic layer and the vessel.

An outline for producing light with the lamp includes, but is not limited to, the acts: a) RF/microwave energy is directed at a resonator, which is not geometrically contiguous with the glass/quartz gas-fill vessel, the resonator may be in the form of a lumped circuit or distributed structure; b) field probes located at positions where the field strength is high in the resonator direct the RF energy to the gas-fill vessel; and c) the RF energy is capacitively coupled to the plasma through the metallic contacts on or in close proximity to the gas-fill vessel.

Although, at first glance, it may appear that the resonator and gas fill vessel are contiguous in some aspects presented, in all cases the presence of a coupling structure—such as a coupling capacitor formed by metal veneers, dielectric veneers, and the bulb material itself—between the resonator and gas fill vessel acts as a clear separation between the resonator and gas-fill vessel.

In one aspect, the plasma electrode-less lamp comprises a gas-fill vessel. The gas-fill vessel comprises a closed, transparent body comprising a first end, a second end, an outer surface, and an inner surface, the inner surface forming a cavity. The gas-fill vessel further comprises a first refractory veneer substantially covering a first portion of the body of the gas-fill vessel; a second refractory veneer substantially covering a second portion of the body of the gas-fill vessel; a first conductive veneer substantially covering the first refractory veneer; and a second conductive veneer substantially covering the second refractory veneer. The plasma electrode-less lamp further comprises a gas-fill contained within the gas-fill vessel, the gas-fill comprising a fluorophor and an inert gas. The plasma electrode-less lamp further comprises an RF electromagnetic radiation source comprising an RF electromagnetic oscillator and an RF amplifier comprising an RF amplifier input conductively connected with the RF electromagnetic oscillator and an RF amplifier output. The plasma electrode-less lamp further comprises an RF electromagnetic resonator having a Q such that a substantial amount of RF power is coupled into the gas-fill. The RF electromagnetic resonator comprises a body comprising a dielectric material, the body having an input end and an output end; a conductive veneer substantially covering the dielectric body; an output opening in the conductive veneer on the output end; and an input opening in the conductive veneer on the input end. The plasma electrode-less lamp further comprises an output probe conductively connected with the second conductive veneer of the gas-fill vessel, the output probe selected from the group consisting of e-field probe, h-field probe, and patch antenna, the output probe intersecting the output end substantially within the output opening, the size, shape, and position of the output probe creating substantial impedance matching between the RF electromagnetic resonator and the gas-fill vessel. The plasma electrode-less lamp further comprises an input probe conductively connected with the RF amplifier output of the RF electromagnetic radiation source, the input probe selected from the group consisting of e-field probe, h-field probe, and patch antenna, the input probe intersecting the input end substantially within the input opening, the size, shape, and position of the input probe creating substantial impedance matching between the RF electromagnetic resonator and the RF electromagnetic radiation source. Finally, the plasma electrode-less lamp further comprises a grounding strap conductively connecting the first conductive veneer of the gas-fill vessel with the conductive veneer of the RF electromagnetic resonator. The RF electromagnetic radiation is coupled to the gas via the RF electromagnetic resonator, which forms a plasma that heats the fluorophor and thus causes the fluorophor to fluoresce.

In another aspect, the body of the RF electromagnetic resonator is substantially a cylinder.

In yet another aspect, the body of the RF electromagnetic resonator is substantially a rectangular block.

In yet another aspect, the plasma electrode-less lamp further comprises a reflector. The reflector is conductively connected with the conductive veneer of the RF electromagnetic resonator. The reflector has a shape such that light emitted from the gas-fill vessel is substantially collected and substantially directed, focused, or collimated. The grounding strap is a wire mesh that conductively connects the reflector with the first conductive veneer of the gas-fill vessel without substantially obstructing light emanating from the reflector. The mesh further provides electromagnetic interference shielding for the RF plasma electrode-less lamp.

In yet another aspect, the plasma electrode-less lamp further comprises an extender. The extender conductively connecting the second conductive veneer of the gas-fill vessel with the output probe such that a gap is created between the gas-fill vessel and the RF electromagnetic resonator. The plasma electrode-less lamp further comprises a short stem. The short stem is substantially a thermal insulator. The short stem connects the second refractory veneer of the gas-fill vessel with the second end of the transparent body of the gas-fill vessel such that air cushions are created between the second end of the refractory veneer of the gas-fill vessel and the second end of the transparent body of the gas-fill vessel such that the gas-fill vessel is thermally isolated from the resonator.

In yet another aspect, the plasma electrode-less lamp further comprises a center conductor conductively connecting the output probe with the second conductive veneer of the gas-fill vessel; an outer conductor conductively connecting the grounding strap with the conductive veneer of the RF electromagnetic resonator; and a length such that the RF electromagnetic resonator is substantially impedance matched to the gas-fill vessel. Thus light collection efficiency is substantially improved by raising the gas-fill vessel substantially away from the RF electromagnetic resonator.

In yet another aspect, the plasma electrode-less lamp further comprises a tuning blind hole in the RF electromagnetic resonator. The tuning blind hole substantially penetrates into the RF electromagnetic resonator. The conductive veneer of the RF electromagnetic resonator extends substantially within the tuning blind hole such that RF electromagnetic radiation of substantially lower energy resonates inside the RF electromagnetic resonator. Thus the RF electromagnetic resonator is tuned by the size, shape, and position of the tuning blind hole.

In yet another aspect, the plasma electrode-less lamp further comprises a plurality of tuning blind holes in the RF electromagnetic resonator, wherein each of the tuning blind holes substantially penetrates into the RF electromagnetic resonator and wherein the conductive veneer of the RF electromagnetic resonator extends substantially within each of the tuning blind holes such that RF electromagnetic radiation of substantially lower energy resonates inside the RF electromagnetic resonator. Thus the RF electromagnetic resonator is tuned by the size, shape, and position of each of the tuning blind holes.

In yet another aspect, the plasma electrode-less lamp comprises a gas-fill vessel. The gas-fill vessel comprises a closed, transparent body comprising a first end, a second end, an outer surface and an inner surface, the inner surface forming a cavity. The gas-fill vessel further comprises a first refractory veneer substantially covering a first portion of the body of the gas-fill vessel; a second refractory veneer substantially covering a second portion of the body of the gas-fill vessel; a first conductive veneer substantially covering the first refractory veneer; and a second conductive veneer substantially covering the second refractory veneer. The plasma electrode-less lamp further comprises a gas-fill contained within the gas-fill vessel, the gas-fill comprising a fluorophor and an inert gas. The plasma electrode-less lamp further comprises an RF electromagnetic amplifier having gain substantial to sustain RF oscillations comprising an RF amplifier input and an RF amplifier output. The plasma electrode-less lamp further comprises an RF electromagnetic resonator having a Q such that a substantial amount of RF power is coupled into the gas-fill. The RF electromagnetic resonator comprises a body comprising a dielectric material, the body having an input end and an output end; a conductive veneer substantially covering the dielectric body; an output opening in the conductive veneer on the output end; an input opening in the conductive veneer on the input end; and a feedback opening in the conductive veneer on the input end. The plasma electrode-less lamp further comprises an output probe conductively connected with the second conductive veneer of the gas-fill vessel, the output probe selected from the group consisting of e-field probe, h-field probe, and patch antenna. The output probe intersects the output end substantially within the output opening. The size, shape, and position of the output probe create substantial impedance matching between the RF electromagnetic resonator and the gas-fill vessel. The plasma electrode-less lamp further comprises an input probe conductively connected with the RF amplifier output of the RF electromagnetic radiation source. The input probe is selected from the group consisting of e-field probe, h-field probe, and patch antenna. The input probe intersects the input end substantially within the input opening. The size, shape, and position of the input probe create substantial impedance matching between the RF electromagnetic resonator and the RF electromagnetic amplifier. The plasma electrode-less lamp further comprises a feedback probe conductively connected with the RF amplifier input of the RF electromagnetic radiation source. The feedback probe is selected from the group consisting of e-field probe, h-field probe, and patch antenna. The feedback probe intersects the input end substantially within the feedback opening. Finally, the plasma electrode-less lamp further comprises a grounding strap conductively connecting the first conductive veneer of the gas-fill vessel with the conductive veneer of the RF electromagnetic resonator. Thus RF electromagnetic radiation is coupled to the gas via the RF electromagnetic resonator, which forms a plasma that heats the fluorophor and thus causes the fluorophor to fluoresce.

In yet another aspect, the body of the RF electromagnetic resonator is substantially a cylinder.

In yet another aspect, the body of the RF electromagnetic resonator is substantially a rectangular block.

In yet another aspect, the plasma electrode-less lamp further comprises a reflector. The reflector is conductively connected with the conductive veneer of the RF electromagnetic resonator. The reflector has a shape such that light emitted from the gas-fill vessel is substantially collected and substantially directed, focused, or collimated, and wherein the grounding strap is a wire mesh that conductively connects the reflector with the first conductive veneer of the gas-fill vessel without substantially obstructing light emanating from the reflector. The mesh further provides electromagnetic interference shielding of the gas-fill vessel.

In yet another aspect, the plasma electrode-less lamp further comprises an extender, the extender conductively connecting the second conductive veneer of the gas-fill vessel with the output probe such that a gap is created between the gas-fill vessel and the RF electromagnetic resonator. The plasma electrode-less lamp further comprises a short stem, the short stem substantially a thermal insulator. The short stem connects the second refractory veneer of the gas-fill vessel with the second end of the transparent body of the gas-fill vessel such that thermally-insulating air cushions are created between the second end of the refractory veneer of the gas-fill vessel and the second end of the transparent body of the gas-fill vessel.

In yet another aspect, the plasma electrode-less lamp further comprises a coaxial transmission line. The coaxial transmission line comprises a center conductor conductively connecting the output probe with the second conductive veneer of the gas-fill vessel; an outer conductor conductively connecting the grounding strap with the conductive veneer of the RF electromagnetic resonator; and a length such that the RF electromagnetic resonator is substantially impedance matched to the gas-fill vessel. Thus light collection efficiency is improved by raising the gas-fill vessel substantially away from the RF electromagnetic resonator.

In yet another aspect, the plasma electrode-less lamp further comprises a tuning blind hole in the RF electromagnetic resonator. The tuning blind hole substantially penetrates into the RF electromagnetic resonator. The conductive veneer of the RF electromagnetic resonator extends substantially within the tuning blind hole such that RF electromagnetic radiation of substantially lower energy resonates inside the RF electromagnetic resonator. Thus the RF electromagnetic resonator is tuned by the size, shape, and position of the tuning blind hole.

In yet another aspect, the plasma electrode-less lamp further comprises a plurality of tuning blind holes in the RF electromagnetic resonator, wherein each of the tuning blind holes substantially penetrates into the RF electromagnetic resonator and wherein the conductive veneer of the RF electromagnetic resonator extends substantially within each of the tuning blind holes such that RF electromagnetic radiation of substantially lower energy resonates inside the RF electromagnetic resonator. Thus the RF electromagnetic resonator is tuned by the size, shape, and position of each of the tuning blind holes.

In yet another aspect, the plasma electrode-less lamp comprises a gas-fill vessel. The gas-fill vessel comprises a closed, transparent body comprising a first end, a second end, an outer surface, and an inner surface, the inner surface forming a cavity. The gas-fill vessel further comprises a first refractory veneer substantially covering a first portion of the body of the gas-fill vessel; a second refractory veneer substantially covering a second portion of the body of the gas-fill vessel; a first conductive veneer substantially covering the first refractory veneer; and a second conductive veneer substantially covering the second refractory veneer. The plasma electrode-less lamp further comprises a gas-fill contained within the gas-fill vessel, the gas-fill comprising a fluorophor and an inert gas. The plasma electrode-less lamp further comprises an RF phase shifter comprising a phase shifter output and a phase shifter input. The plasma electrode-less lamp further comprises an RF power splitter comprising a splitter input; a first splitter output conductively connected with the phase shifter input of the RF phase shifter; and a second splitter output. The plasma electrode-less lamp further comprises an RF electromagnetic amplifier comprising an RF amplifier input conductively connected with a source of RF oscillations and an RF amplifier output conductively connected with the splitter input of the RF power splitter. The plasma electrode-less lamp further comprises a first RF electromagnetic resonator having a first Q such that a substantial amount of RF power is coupled into the gas-fill. The RF electromagnetic resonator comprises a first body comprising a first dielectric material, the first body having a first input end and a first output end; a first conductive veneer substantially covering the first dielectric body; a first output opening in the first conductive veneer on the first output end; and a first input opening in the first conductive veneer on the first input end. The plasma electrode-less lamp further comprises a first output probe conductively connected with the first conductive veneer of the gas-fill vessel. The first output probe is selected from the group consisting of e-field probe, h-field probe, and patch antenna. The first output probe intersects the first output end substantially within the first output opening. The size, shape, and position of the first output probe create substantial impedance matching between the first RF electromagnetic resonator and the gas-fill vessel. The plasma electrode-less lamp further comprises a first input probe conductively connected with the phase shifter output. The first input probe is selected from the group consisting of e-field probe, h-field probe, and patch antenna. The first input probe intersects the first input end substantially within the first input opening. The size, shape, and position of the first input probe create substantial impedance matching between the first RF electromagnetic resonator and the RF electromagnetic amplifier. The plasma electrode-less lamp further comprises a second RF electromagnetic resonator having a second Q such that a substantial amount of RF power is coupled into the gas-fill. The second RF electromagnetic resonator comprises a second body comprising a second dielectric material. The second body has a second input end and a second output end; a second conductive veneer substantially covering the second dielectric body; a second output opening in the second conductive veneer on the second output end; and a second input opening in the second conductive veneer on the second input end. The plasma electrode-less lamp further comprises a second output probe conductively connected with the second conductive veneer of the gas-fill vessel. The second output probe is selected from the group consisting of e-field probe, h-field probe, and patch antenna. The second output probe intersects the second output end substantially within the second output opening. The size, shape, and position of the second output probe creates substantial impedance matching between the second RF electromagnetic resonator and the gas-fill vessel. The plasma electrode-less lamp further comprises a second input probe conductively connected with the second splitter output. The second input probe is selected from the group consisting of e-field probe, h-field probe, and patch antenna. The second input probe intersects the second input end substantially within the second input opening. The size, shape, and position of the second input probe creating substantial impedance matching between the second RF electromagnetic resonator and the RF electromagnetic amplifier. Finally, the plasma electrode-less lamp further comprises a grounding strap conductively connecting the first conductive veneer of the first RF electromagnetic resonator with the second conductive veneer of the second RF electromagnetic resonator. Thus, RF electromagnetic radiation is coupled to the gas via both the first RF electromagnetic resonator and the second RF electromagnetic resonator, the gas forming a plasma that heats the fluorophor and thus causes the fluorophor to fluoresce.

In yet another aspect, the plasma electrode-less lamp further comprises a feedback opening in the second conductive veneer on the second input end of the second RF electromagnetic resonator. The plasma electrode-less lamp further comprises a feedback probe selected from the group consisting of e-field probe, h-field probe, and patch antenna. The feedback probe intersects the second input end substantially within the second feedback opening. The feedback probe is further conductively connected with the RF amplifier input. The feedback probe thus acts as the source of RF oscillations. The RF electromagnetic amplifier has sufficient gain to sustain RF oscillations.

In yet another aspect, the plasma electrode-less lamp comprises a gas-fill vessel. The gas-fill vessel comprises a closed, transparent body comprising a first end, a second end, an outer surface, and an inner surface, the inner surface forming a cavity. The gas-fill vessel further comprises a first refractory veneer substantially covering a first portion of the body of the gas-fill vessel; a second refractory veneer substantially covering a second portion of the body of the gas-fill vessel; a first conductive veneer substantially covering the first refractory veneer; and a second conductive veneer substantially covering the second refractory veneer. The plasma electrode-less lamp further comprises a gas-fill contained within the gas-fill vessel, the gas-fill comprising a fluorophor and an inert gas. The plasma electrode-less lamp further comprises an RF electromagnetic radiation source comprising an RF electromagnetic oscillator and an RF amplifier comprising an RF amplifier input conductively connected with the RF electromagnetic oscillator and an RF amplifier output. The plasma electrode-less lamp further comprises an RF electromagnetic resonator comprising a toroidal body comprising a dielectric material with a surface and a central hole; a conductive veneer substantially covering the surface of the toroidal body and inside the central hole; an output opening in the conductive veneer; and an input opening in the conductive veneer. The plasma electrode-less lamp further comprises an output probe conductively connected with the first conductive veneer of the gas-fill vessel. The output probe is selected from the group consisting of e-field probe, h-field probe, and patch antenna. The output probe intersects the output end substantially within the output opening. The size, shape, and position of the output probe create substantial impedance matching between the RF electromagnetic resonator and the gas-fill vessel. The plasma electrode-less lamp further comprises an input probe conductively connected with the RF amplifier output of the RF electromagnetic radiation source. The input probe is selected from the group consisting of e-field probe, h-field probe, and patch antenna. The input probe intersects the input end substantially within the input opening. The size, shape, and position of the input probe create substantial impedance matching between the RF electromagnetic resonator and the RF electromagnetic radiation source. Finally, the plasma electrode-less lamp further comprises a grounding strap conductively connecting the first conductive veneer of the gas-fill vessel with the conductive veneer of the RF electromagnetic resonator. Thus RF electromagnetic radiation is coupled to the gas via the RF electromagnetic resonator, which forms a plasma that heats the fluorophor and thus causes the fluorophor to fluoresce.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6Ai is a cross-sectional view of the resonator in FIG. 6A; the direction of the cross-section is as shown in FIG. 6A;

FIG. 6Aii is an elevation view of the resonator in FIG. 6A; the direction of viewing is as shown in FIG. 6A;

FIG. 6Aiii is a plan view of the resonator in FIG. 6A; the direction of viewing is as shown in FIG. 6A;

FIG. 6Aiv is a plan view of the resonator in FIG. 6A; the direction of viewing is as shown in FIG. 6A;

FIG. 6Bi is a cross-sectional view of the resonator in FIG. 6B; the direction of the cross-section is as shown in FIG. 6B;

FIG. 6Bii is an elevation view of the resonator in FIG. 6B; the direction of viewing is as shown in FIG. 6B;

FIG. 6Biii is a plan view of the resonator in FIG. 6B; the direction of viewing is as shown in FIG. 6B;

FIG. 6Biv is a plan view of the resonator in FIG. 6B; the direction of viewing is as shown in FIG. 6B;

FIG. 6Ci is a cross-sectional view of the resonator in FIG. 6C; the direction of the cross-section is as shown in FIG. 6C;

FIG. 6Cii is an elevation view of the resonator in FIG. 6C; the direction of viewing is as shown in FIG. 6C;

FIG. 6Ciii is a plan view of the resonator in FIG. 6C; the direction of viewing is as shown in FIG. 6C;

FIG. 6Civ is a plan view of the resonator in FIG. 6C; the direction of viewing is as shown in FIG. 6C;

FIG. 6Di is a cross-sectional view of the resonator in FIG. 6D; the direction of the cross-section is as shown in FIG. 6D;

FIG. 6Dii is an elevation view of the resonator in FIG. 6D; the direction of viewing is as shown in FIG. 6D;

FIG. 6Diii is a plan view of the resonator in FIG. 6D; the direction of viewing is as shown in FIG. 6D;

FIG. 6Div is a plan view of the resonator in FIG. 6D; the direction of viewing is as shown in FIG. 6D;

FIG. 6Ei is a cross-sectional view of the resonator in FIG. 6E; the direction of the cross-section is as shown in FIG. 6E;

FIG. 6Eii is an elevation view of the resonator in FIG. 6E; the direction of viewing is as shown in FIG. 6E;

FIG. 6Eiii is a plan view of the resonator in FIG. 6E; the direction of viewing is as shown in FIG. 6E;

FIG. 6Eiv is a plan view of the resonator in FIG. 6E; the direction of viewing is as shown in FIG. 6E;

FIG. 6Fi is a cross-sectional view of the resonator in FIG. 6F; the direction of the cross-section is as shown in FIG. 6F;

FIG. 6Fii is an elevation view of the resonator in FIG. 6F; the direction of viewing is as shown in FIG. 6F;

FIG. 6Fiii is a plan view of the resonator in FIG. 6F; the direction of viewing is as shown in FIG. 6F;

FIG. 6Fiv is a plan view of the resonator in FIG. 6F; the direction of viewing is as shown in FIG. 6F;

FIG. 6Gi is a cross-sectional view of the resonator in FIG. 6G; the direction of the cross-section is as shown in FIG. 6G;

FIG. 6Gii is an elevation view of the resonator in FIG. 6G; the direction of viewing is as shown in FIG. 6G;

FIG. 6Giii is a plan view of the resonator in FIG. 6G; the direction of viewing is as shown in FIG. 6G;

FIG. 6Giv is a plan view of the resonator in FIG. 6G; the direction of viewing is as shown in FIG. 6G;

FIG. 6Ii is a cross-sectional view of the resonator in FIG. 6I highlighting the tuning blind hole;

FIG. 6Iii is an elevation view of the resonator in FIG. 6I; the direction of viewing is as shown in FIG. 6I;

FIG. 6Iiii is a plan view of the resonator in FIG. 6I; the direction of viewing is as shown in FIG. 6I;

FIG. 6Iiv is a plan view of the resonator in FIG. 6I; the direction of viewing is as shown in FIG. 6I;

FIG. 6Ji is a cross-sectional view of the resonator in FIG. 6I highlighting the tuning blind hole;

FIG. 6Jii is an elevation view of the resonator in FIG. 6J; the direction of viewing is as shown in FIG. 6J;

FIG. 6Jiii is a plan view of the resonator in FIG. 6J; the direction of viewing is as shown in FIG. 6J;

FIG. 6Jiv is a plan view of the resonator in FIG. 6J; the direction of viewing is as shown in FIG. 6J;

FIG. 7A depicts a distributed resonator as shown in FIG. 6C connected to a gas-fill vessel, where energy is coupled from an RF source into the resonator via an input probe, and energy is coupled out of the resonator to the gas-fill vessel through an output probe, a grounding strap is seen connected with the gas-fill vessel making electrical connection to the circuit ground;

FIG. 7B depicts a distributed resonator as shown in FIG. 6F connected to a gas-fill vessel; feedback from the short feedback probe is delivered to the input of an RF amplifier; the longer input probe serves as the other probe in the DRO; energy is coupled out of the resonator to the gas-fill vessel through an output probe; a grounding strap is seen connected with the gas-fill vessel making electrical connection to the circuit ground;

FIG. 8D is a perspective view of a distributed resonator and gas-fill vessel similar to FIG. 8C, the grounding strap has been replaced by a metal wire mesh to provide an improved ground connection as well as provide electromagnetic interference (EMI) shielding;

DETAILED DESCRIPTION

Figure 1:
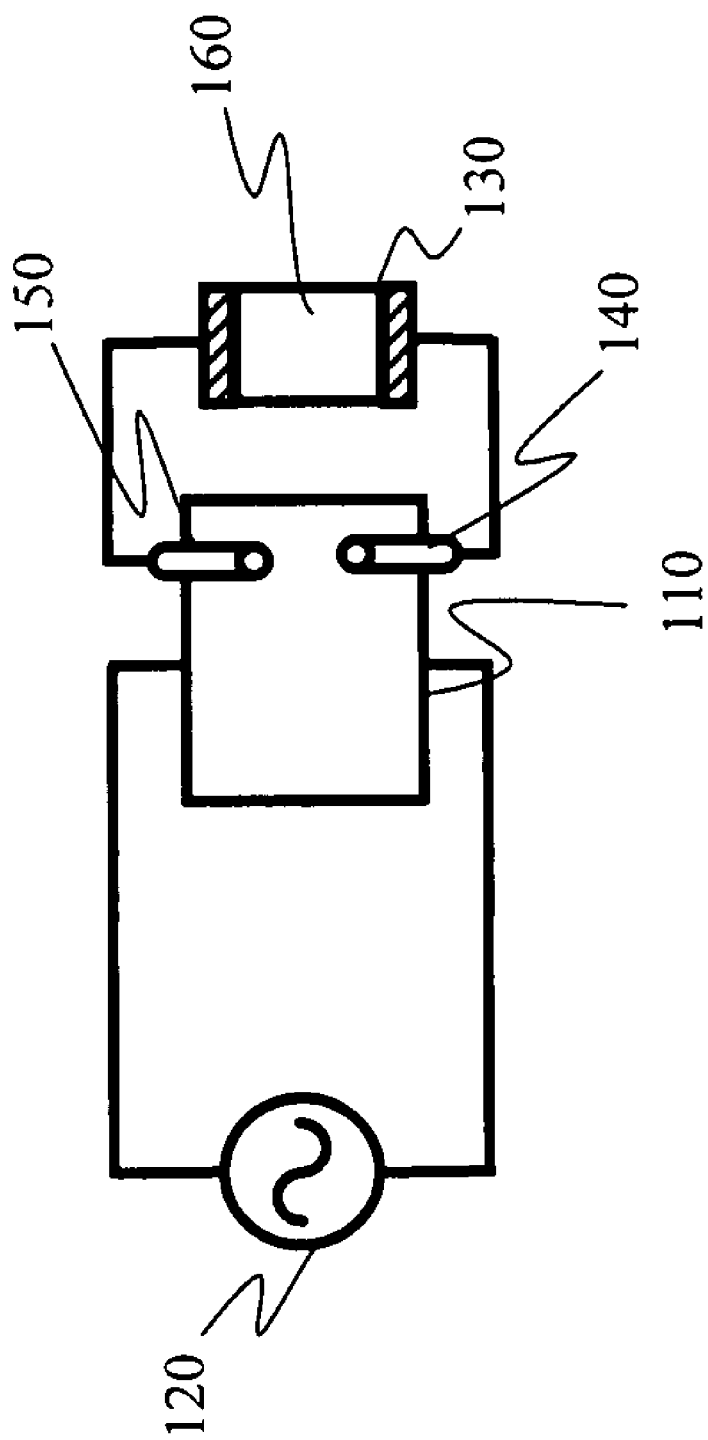
FIG. 1 is a generalized schematic of a Radio Frequency (RF) source which drives a resonator, which, in turn, drives a gas-fill vessel not geometrically contiguous with (detached from) the resonator.

The present invention relates to a plasma lamp and, more particularly, to a plasma lamp without internal electrodes and having a gas-fill vessel that is not contiguous with (detached from) any RF/microwave cavities or resonators. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention.

However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Coupling capacitor—The term "coupling capacitor" as used with respect to this invention refers to an RF/microwave structure or compound structure comprising many separate RF/microwave elements with an effective impedance dominated by an effective capacitance. This effective capacitance can then be used to couple RF energy between RF elements. An example of a coupling capacitor, as used with respect to this invention, is the series of materials between resonator and gas-fill, an example of which might be a metal veneer, a refractory veneer, and the gas-fill vessel material itself.

Distributed Structure—The term "distributed structure" as used with respect to this invention refers to an RF/microwave structure, the dimensions of which are comparable to the wavelength of the frequency source. This could be a length of a transmission line or a resonator.

E-field probe—The term "e-field probe" or "E-field probe" as used with respect to this invention refers to any means of coupling to radio frequency electromagnetic energy that couples substantially more energy from the interaction with the electric field than the magnetic field.

Feedback-induced Oscillations—The term "feedback-induced oscillations" as used with respect to this invention refers to feeding back (in an additive sense/substantially in-phase) part of the output power of an amplifier into the input of the amplifier with sufficient gain on the positive-feedback to make the amplifier oscillate.

Fluorescence—The term "fluorescence" as used with respect to this invention refers to the emission of radiation associated with the relaxation of an atom or molecule from an excited energy level to a lower (usually ground state) level.

Fluorophor—The term "fluorophor" as used with respect to this invention refers to a material that undergoes fluorescence (see above definition of fluorescence).

Grounding strap—The term "grounding strap" as used with respect to this invention refers to any art-known mechanism that effectively straps the potential of one RF structure to the potential of another RF structure, the most common use of such a structure mechanism is tying an RF element to RF ground, giving rise to the term "grounding strap."

H-field probe—The term "h-field probe" or "H-field probe" as used with respect to this invention refers to any means of coupling to radio frequency electromagnetic energy that couples substantially more energy from the interaction with the magnetic field than the electric field.

Lumped Circuit—The term "lumped circuit" as used with respect to this invention refers to a circuit comprising actual resistors, capacitors and inductors as opposed to, for example, a transmission line or a dielectric resonator (circuit components that are comparable in size to the wavelength of the RF source).

Lumped Parallel Oscillator—The term "lumped parallel oscillator" as used with respect to this invention refers to resistors, capacitors, and inductors that are connected in parallel to form a resonator.

Parasitics—The term "parasitics" as used with respect to this invention refers to non-idealities in the components, in this case, used to distribute energy. These are "extra" resistances, capacitances and inductances of the components that effectively waste the power of the RF/microwave source.

Patch antenna—The term "patch antenna" as used with respect to this invention refers to any means of coupling to radio frequency electromagnetic energy that couples substantially similar amount of energy from the interaction with the magnetic field and the electric field.

Quality Factor (Q)—The term "quality factor" or "Q" as used with respect to this invention refers to the property of a resonator that determines how well a resonator stores energy or how lossy a resonator is. A higher Q resonator stores energy better and has a lower loss than a lower Q resonator.

Refractory—The term "refractory" as used with respect to this invention refers to a material having the ability to retain its physical shape and chemical identity when subjected to high temperatures.

Veneer—The term "veneer" as used with respect to this invention means to face or cover (an object) with any material that is more desirable as a surface material than the basic material of the object.

(2) Specific Aspects

FIG. 1 illustrates a general/generic embodiment of the electrode-less lamp. An electromagnetic resonator 110 is driven by an electromagnetic radiation source 120, the radiation being in the microwave/RF portions of the electromagnetic spectrum. The RF/microwave energy stored in the electromagnetic resonator 110 gives rise to large electric fields, which are sampled by a first field probe 140 and second field probe 150. As can be appreciated by one of ordinary skill in the art, it does not matter which of the field probes is designated "first" or "second." One of the field probes is connected with a maximum or high electric field point of the resonator while the other field probe is connected with a minimum or low electric field point of the resonator or alternatively can be connected to RF circuit ground. Subsequently the electric field is distributed to the gas-fill vessel 130, which is not geometrically contiguous with (detached from) the electromagnetic resonator 110. The gas-fill vessel 130 includes a cavity 160 that contains a gas. The gas transitions into a plasma state under the presence of the RF energy; this gas is normally a noble gas but is not limited to one of the noble gases. Subsequent energy transfer between the plasma and the fluorophor (light emitter such as a metal halide or similar material), also included in the gas-fill vessel 130, gives rise to intense visible, UV, or infrared radiation, usable in a multitude of lighting applications.

In one embodiment, the RF/microwave electromagnetic radiation source 120 comprises an energy source followed by several stages of amplification so that the overall power delivered to the electromagnetic resonator 110 is in the 10 to 500 W range, although powers outside this range might be necessary depending on the application and would also be accessible with this invention. Although the electromagnetic radiation source 120 is shown as an agglomeration of solid state electronics, it may also comprise other sources known to one of ordinary skill in the art. In another embodiment, the RF/microwave electromagnetic radiation source 120 comprises an RF/microwave oscillator. Feedback between the amplification stages 210 (an RF amplifier) and the electromagnetic resonator 110 is used to build up a sustained RF energy source that drives the electromagnetic resonator 110 and consequently the gas-fill vessel 130.

The electromagnetic resonator 110 can be embodied as a distributed RF/microwave structure, such as a dielectric resonator or a coaxial resonator, or as a lumped circuit, such as a parallel resonant (RLC) network. In the case of a distributed resonator, the RF/microwave electric field varies in amplitude as a function of position within it. In this case, one of the two field probes 140 or 150 is positioned so as to couple to the maximum electric field amplitude within the electromagnetic resonator and the other field probe is positioned to couple to minimum electric field or alternatively is connected to circuit ground. For a lumped parallel resonator the field is independent of position along it and first and second field probes 140 and 150 can be placed arbitrarily. The electromagnetic resonator 110 has a distinctive frequency behavior enabling energy storage over a limited frequency range. In the case of a distributed structure this frequency range is determined by geometry and material parameters, whereas in the case of a lumped resonator, this same frequency of operation is determined by circuit topology and component values.

As can be appreciated by one of ordinary skill in the art, plasma lamp operation substantially near 100 MHz enables RF energy distribution with minimal impact from parasitics, which are non-idealities in the components used to distribute energy. These parasitics are typically a function of frequency and increase in severity with increasing frequency. Additionally, by operating at a lower frequency, lamp cost can be reduced enabling penetration of this technology into the existing lamp socket markets. However, operation in this frequency range places a constraint on lamp geometry/material parameters in order to effectively couple RF energy into the plasma, thereby limiting the range of applications. As operational frequency is increased this constraint is relaxed enabling the use of smaller light bulbs. In particular as high-frequency, high-power amplifiers mature, dropping their cost, operation substantially near 10 GHz will facilitate effective light point sources, which are desirable in many high-end applications.

Figures 2A, 2B:
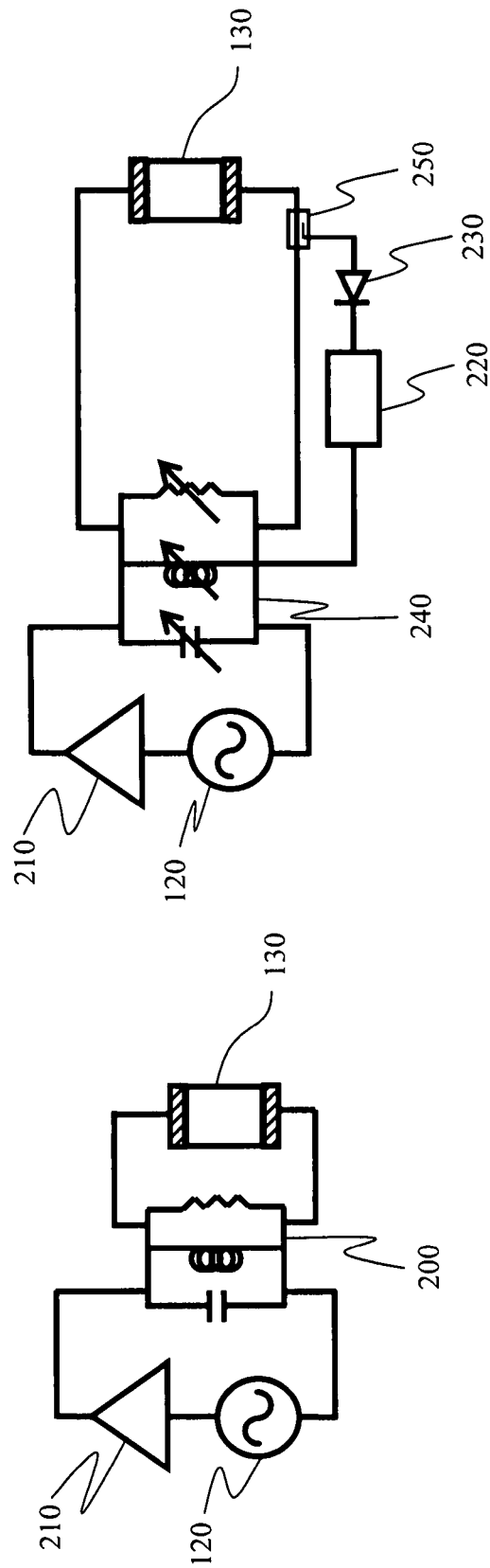
FIG. 2A is a generalized schematic of a lumped Resistor/Inductor/Capacitor (RLC) resonator electrode-less plasma lamp, with the resonator being driven by an RF source which in turn drives the gas-fill vessel, as opposed to gas-fill vessel being a subset of the resonator.
FIG. 2B is a generalized schematic of a lumped RLC resonator electrode-less plasma lamp driven by an RF source; the RLC resonator is composed of tunable elements controlled by a tuning circuit, with feedback providing information to the tuning circuit, which, in turn, tunes the resonator to maximize the RF energy delivered to the gas-fill vessel.

FIG. 2A illustrates an embodiment of the plasma electrodeless lamp where the electromagnetic resonator 110 is a lumped resonator 200. In this case the lumped resonator 200 comprises a parallel RLC circuit that stores the energy delivered by the amplification stages 210 and consequently develops a large potential drop. It is highly desirable to use L and C components with minimum parasitics and R value that is very large (for parallel RLC resonator) to maximize the Q of the resonator. The Q of the resonator should be large enough that the input power is substantially transferred to the gas-fill. The resonator thus serves as more than just an impedance matching network, its Q serves to build up the field until the rate of energy coupling into the gas-fill vessel 130 is large enough to sustain a bright plasma. This implementation is preferred in the lower operating frequency range of the lamp. RF/microwave energy is delivered to the gas-fill vessel 130, which gives off intense radiation. In this embodiment amplification stages 210 are driven by an RF/microwave source 120 at the resonance frequency of the electromagnetic lumped resonator 200. Lamp operation at frequencies substantially less than 100 MHz enables RF distribution with minimal parasitic impact, which makes the use of simple cabling to deliver RF energy to the gas-fill vessel feasible.

FIG. 2B illustrates an embodiment of the plasma electrodeless lamp with a tunable lumped resonator 240. As with FIG. 2A, the resonator is driven by the combination of electromagnetic radiation source 120 and amplification stage 210. An RF/microwave sensor 230 measures the amount of energy not delivered to the gas-fill vessel 130 using an RF coupler 250 and provides feedback to a tuning control circuit 220. In turn, the tuning control circuit adjusts the tunable lumped resonator's 240 parameters to maximize the energy delivered to the gas-fill vessel 130. This enables a reduction in wasted RF energy and therefore provides enhanced lamp efficiency. Feedback approaches are not limited to lumped resonators and can be extended to distributed structures.

Figure 3:
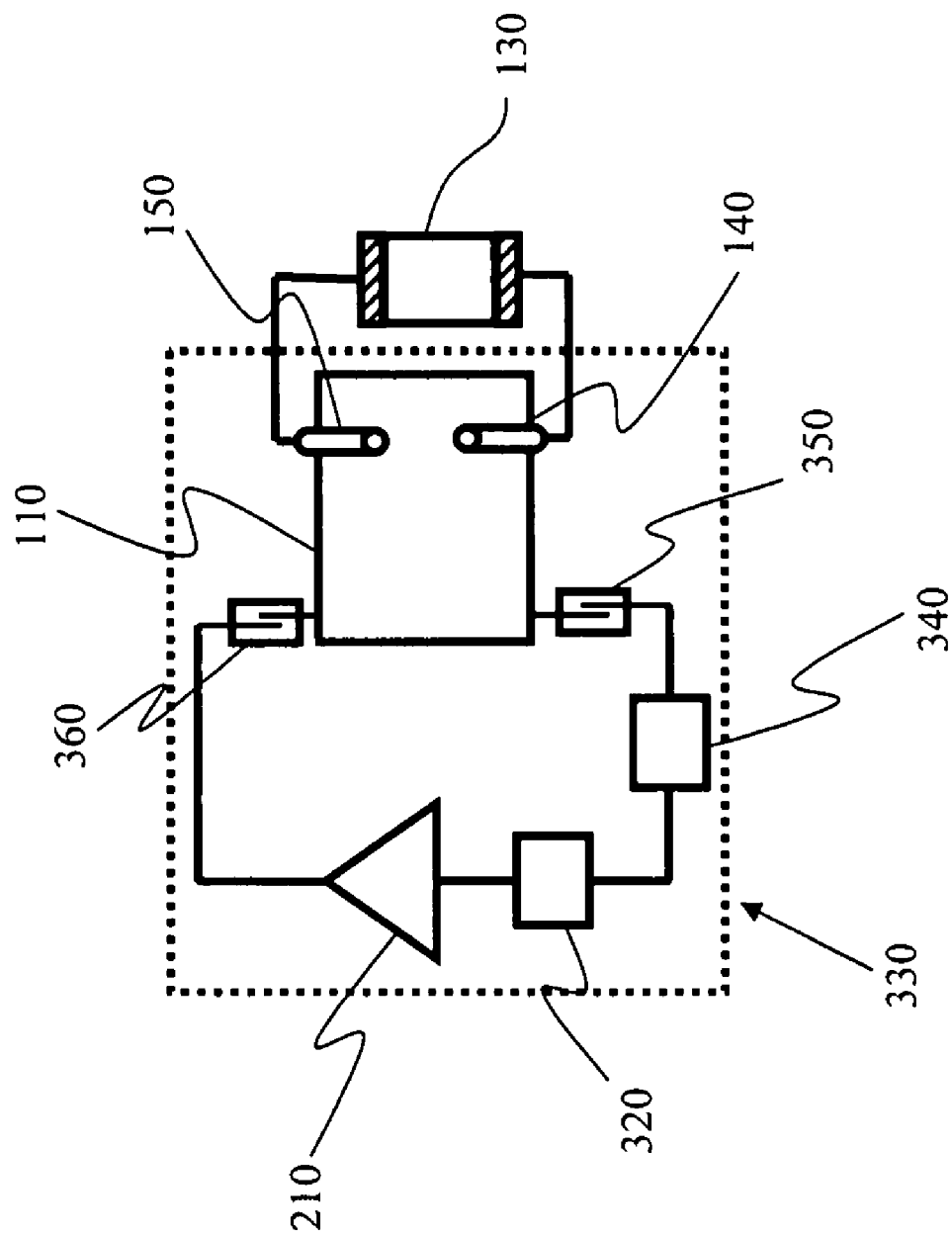
FIG. 3 is a generalized schematic of an electrode-less plasma lamp where the gas-fill vessel is driven by coupling the electric field from the dielectric resonator of a Dielectric Resonator Oscillator (DRO), and the gas-fill vessel is not contiguous with the resonator.

FIG. 3 illustrates an embodiment of the plasma electrodeless lamp incorporating a Dielectric Resonant Oscillator (DRO) 330. In this case RF/microwave energy is sustained through feedback-induced oscillation. The DRO 330 couples energy to and from the electromagnetic resonator 110 through coupling structures 350 and 360. The sampled RF/microwave field is fed back to the amplification stages 210, in so doing the sample signal passes through delay elements 340 and loss elements 320. Provided the amplification stages can overcome the loop loss, oscillation will initiate at a frequency determined by the physical and geometrical properties of the resonator. One of the two field probes 140 or 150 is positioned so as to couple to the maximum or high electric field amplitude within the electromagnetic resonator and the other field probe is positioned to couple to minimum electric field or alternatively is connected to circuit ground. The energy coupled out of the resonator is subsequently delivered to the gas-fill vessel 130. As can be appreciated by one of ordinary skill in the art, by separating the dielectric resonator (electromagnetic resonator 110) from the bulb (gas-fill vessel 130), the lamp design becomes much more flexible. As the lamp starts-up or warms-up the resonant frequency of the resonator does not change significantly and no additional circuitry is necessary for the start-up process. More light can be harvested from the gas-fill vessel and the lamp has better etendue which is a critical parameter for projection systems. The size of the gas-fill vessel used will be independent of the size of the resonator and each can be optimized separately. As operating frequency is lowered, the size of the dielectric resonator needed for the same resonator geometry increases, but, by using much higher dielectric constant materials, one can actually maintain or reduce the size of the dielectric resonator without concern about thermal mismatch between the dielectric resonator material and the bulb.

Figure 4C:
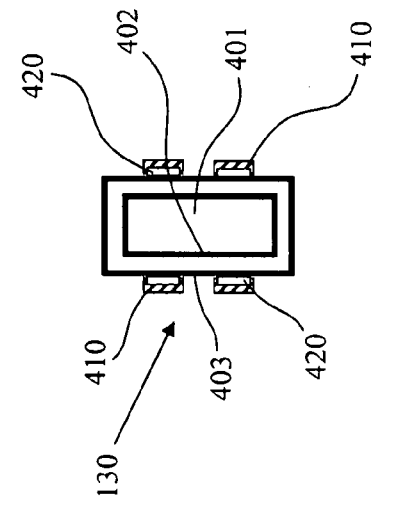
FIG. 4C is a cross-sectional view of yet another possible embodiment of a gas-fill vessel; in this case, the refractory veneer and conductive veneer form rings around the body of the gas-fill vessel, rather than the ends as shown in FIG. 4A and FIG. 4B.
Figure 4B:
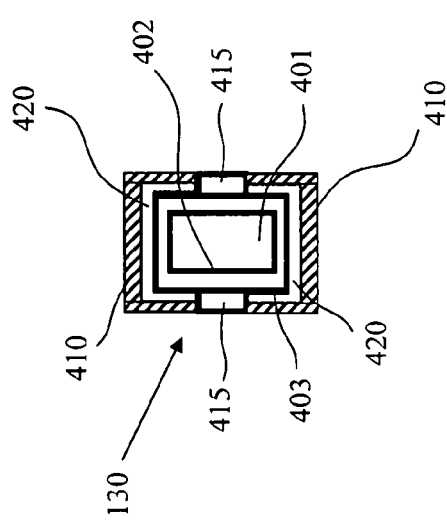
FIG. 4B is a cross-sectional view of another example of a gas-fill vessel with end dielectric layers that also surround a portion of the bulb to reflect some of the light back into the plasma, which enhances the performance of the lamp; a transparent dielectric ring at the center of the gas-fill vessel enhances the electric field in that region.
Figure 4A:
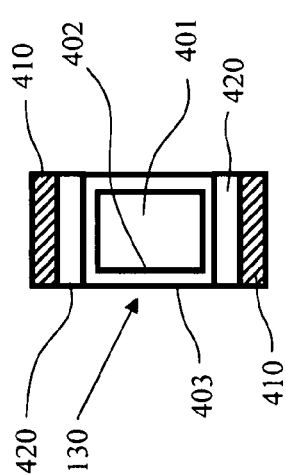
FIG. 4A is a cross-sectional view of a gas-fill vessel with added end dielectric or refractory layer that act as a diffusion barrier between the end metallic coupling electrodes and the gas-fill vessel.

FIG. 4A is a cross-sectional view of one possible embodiment of a gas-fill vessel 130. It comprises a closed, transparent body 401 with an inner surface 402 and outer surface 403. The transparent body can be made of quartz or some other suitably transparent and refractory material, non-limiting examples of which are alumina—either transparent or translucent, and sapphire. A refractory veneer 420 covers a portion of the gas-fill vessel 130; the refractory veneer 420 is shown here covering the ends of the transparent body. This refractory veneer 420 can be made of suitable dielectrics, non-limiting examples of which include alumina, barium titanium oxide, titanium oxide, and silicon nitride; the refractory veneer could also be made from a refractory metal, non-limiting examples of which include tungsten, tantalum and titanium. A conductive veneer 410 is affixed onto the refractory veneer 420; the conductive veneer 410 serves as a metal electrode. The combination of the conductive veneer 410, refractory veneer 420, and gas-fill vessel material forms a coupling capacitor separating the plasma from the resonator. Radiation escapes the gas-fill vessel through the transparent body 401. RF energy is capacitively coupled to the gas within the gas-fill vessel 130 through the conductive veneers 410, which act as metallic electrodes. The refractory veneer 420 and the conductive veneer 410 are shown here in cross-section covering the ends of the gas-fill vessel 130; however, one of ordinary skill in the art can appreciate that the covering of the ends admits many shapes, a non-limiting example of which would be a ring. When the refractory veneer 420 and conductive veneer 410 are both in the shape of a ring that covers the end of the gas-fill vessel 130, light can escape from the ends of the bulbs, and this also allows a wider parameter space for the capacitance of the coupling capacitor to be accessed.

FIG. 4B is a cross-sectional view of another possible embodiment of a gas-fill vessel 130. It comprises a transparent body 401 with inner surface 402 and outer surface 403. The transparent body 401 can be made of quartz or some other suitably transparent and refractory material. A refractory veneer 420 covers a portion of the gas-fill vessel 130 and the outside surface of the gas-fill vessel 130, or the inner surface of refractory veneer 420 can be made from (or covered with) an optically reflective material to reflect part of the light back into the plasma to enhance the properties of the emitted light. A conductive veneer 410 is affixed onto the refractory veneer 420; the conductive veneer 410 serves as metal electrodes. At the center of the gas-fill vessel, a transparent dielectric layer 415 made from quartz, sapphire or other substantially optically transparent and refractory material serves to enhance the electric field.

FIG. 4C is a cross-sectional view of yet another possible embodiment of a gas-fill vessel 130. In this case, the refractory veneer 420 and conductive veneer 410 form rings around the body of the gas-fill vessel 130, rather than the ends as shown in FIG. 4A and FIG. 4B. One of ordinary skill in the art can appreciate that it is not necessary to cover the ends; it is only necessary that coupling to the gas-fill vessel 130 be made at two points on the gas-fill vessel 130. The kinds of couplings to the gas-fill vessel 130 need not even be the same, thus the gas-fill vessel 130 can be coupled into and out of using, for example, one bodily ring and one end-cap, one end-ring and one end-cap, one end-ring and one bodily ring, etc. In each case, each coupling is effectively a coupling capacitor, and it is the coupling capacitance of such a coupling capacitor, together with its optical properties, that determine the functionality of the couplings.

Figure 5B:
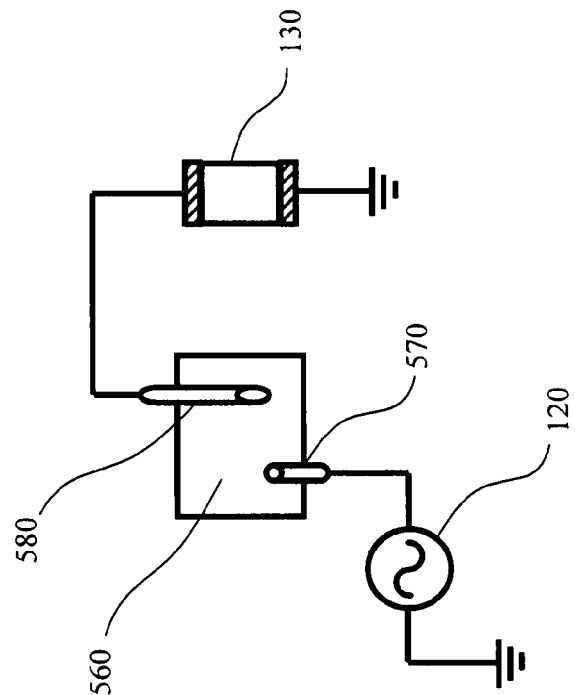
FIG. 5B is a generalized schematic of a specific implementation of the lamp of FIG. 5A. In this case, the matching networks take the form of probes interacting with the resonator.
Figure 5A:
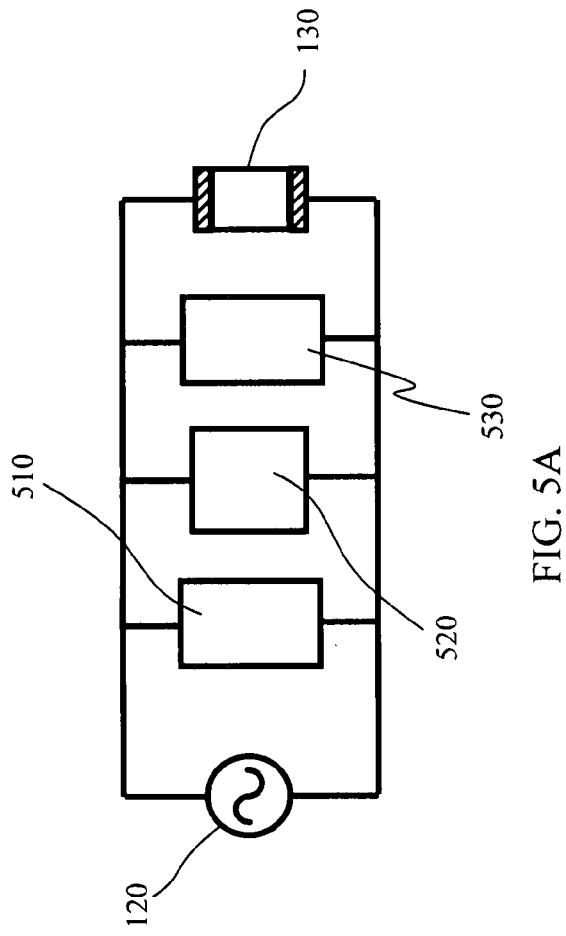
FIG. 5A is a generalized schematic of a gas-fill vessel being driven by an RF source; to optimize lamp efficiency and light output, a plurality of impedance matching networks are present between the RF source and the resonator and between the resonator and gas-fill vessel.

FIG. 5A illustrates a general schematic for efficient energy transfer from RF source 120 to gas fill vessel 130. Energy from the RF source is directed to an impedance matching network 510 that enables the effective transfer of energy from RF source to resonator 520. Another impedance matching network 530, in turn, enables efficient energy transfer from resonator to gas fill vessel 130. The use of impedance matching networks also allows the source to have an impedance other than 50 ohm; this may provide an advantage with respect to RF source performance in the form of reduced heating or power consumption from the RF source. Lowering power consumption and losses from the RF source would enable a greater efficiency for the lamp as a whole. As can be appreciated by one of ordinary skill in the art, impedance matching networks 510 and 530 are not necessarily identical.

FIG. 5B shows a specific implementation of FIG. 5A. The RF source 120 delivers energy to the resonator 560 through a field probe 570. The impedance matching network in this case is implemented in the interaction between the field probe 570, which may be coaxial, and the resonator 560. That is, not only does the field probe 570 enable the coupling of energy to the resonator, it also acts as an impedance transformer. As the field probe 570 moves into the resonator, its interaction with the resonator 560 evolves from weaker to stronger, the interaction being quantified by a coupling constant. Typically this interaction can be classified into three regimes: undercoupled, critically coupled, or over-coupled. As the interaction between probe and resonator changes so does the impedance presented to the RF source. Therefore, it is possible to impedance match the RF source 120 to the resonator 560 by controlling the depth of the field probe 570 inside of the resonator 560. In addition to depth, the diameter of the field probe 570 impacts its impedance and coupling to the resonator 560 as well. Energy is then directed from the resonator 560 to the gas fill vessel 130 by means of another field probe 580. One of ordinary skill can appreciate that the above impedance matching arguments for field probe 570 hold for field probe 580 as well. Given that, in general, the impedances of RF source 120 and gas fill vessel 130 are substantially different, the depths and sizes of field probes 570 and 580 will differ as well.

Figure 6A:
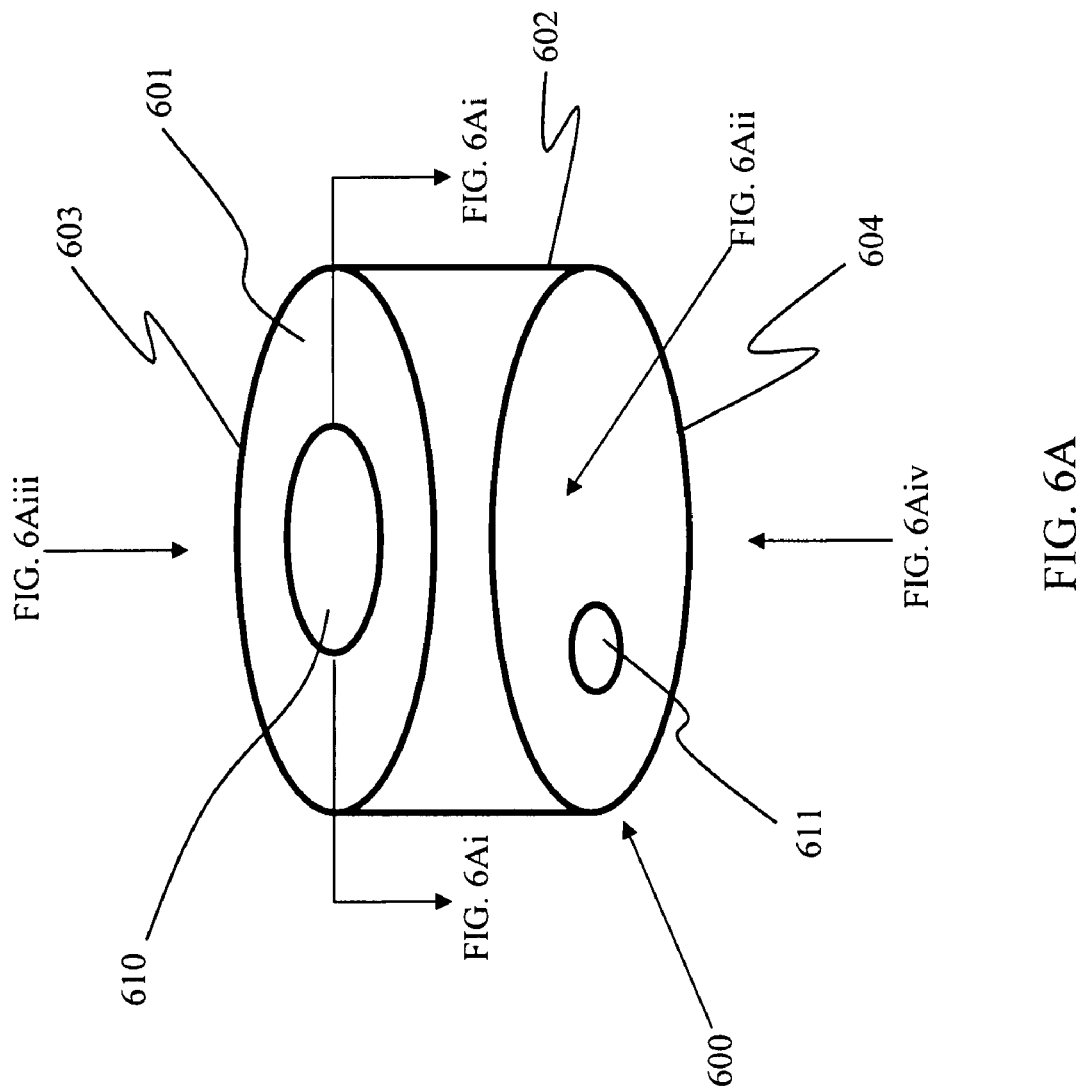
FIG. 6A is a perspective view of a specific embodiment of an electromagnetic resonator used in the present invention.

FIG. 6A is a perspective view of a specific embodiment of an electromagnetic resonator 600 used in the present invention. The resonator 600 is a dielectric distributed structure, for example a dielectric resonator made from a material with dielectric constant greater than 2, non-limiting examples of which are alumina and sapphire. The external walls of the resonator 600 are substantially covered by a conductive veneer 601, which comprises an electrically conductive material. The conductive veneer 601 is conductively connected with RF circuit ground (not shown in the figures). A non-limiting example of the shape of the resonator is portrayed in FIG. 6A, the shape comprising a substantially cylindrical body 602 having an output end 603 and an input end 604. On opposing sides of the resonator 600, which in this case are output end 603 and input end 604, an output opening 610 and an input opening 611 in the conductive material expose the underlying dielectric material of the resonator 600. Although the preferred embodiment of the invention utilizes a resonator 600 that is substantially a right-circular cylinder (a "puck"), any arbitrarily-shaped dielectric of substantially the same size and substantially the same quality factor will support RF field modes and allow one to fulfill the same application with an arbitrarily-shaped resonator as with a puck-shaped resonator. Likewise, although the input opening 611 and output opening 610 are shown as substantially circular, virtually any shape produces substantially the same result, given that the shape in question has substantially the same area. In addition, the sizes of the input opening 611 and output opening 610 relative to each other and the size of the resonator are for ease of illustration only; virtually any size can be used for these openings so long as it accomplishes substantially the same result.

FIG. 6Ai is a cross-sectional view of the resonator 600 in FIG. 6A; the direction of the cross-section is as shown in FIG. 6A. The cross-section shows only the bulk of the dielectric resonator 600 in this case, comprising the cylindrical body 602, the output end 603 and the input end 604.

FIG. 6Aii is an elevation view of the resonator 600 in FIG. 6A; the direction of viewing is as shown in FIG. 6A. The elevation view displays the conductive veneer 601 covering the cylindrical body 602. The elevation view also displays the output end 603 and input end 604 of the cylindrical body 602.

FIG. 6Aiii is a plan view of the resonator 600 in FIG. 6A; the direction of viewing is as shown in FIG. 6A. The plan view looks on the output opening 603 of the cylindrical body 602. The plan view displays the output opening 610 and (hidden from view) the input opening 611.

FIG. 6Aiv is a plan view of the resonator 600 in FIG. 6A; the direction of viewing is as shown in FIG. 6A. The plan view looks on the input opening 604 of the cylindrical body 602. The plan view displays the input opening 611 and (hidden from view) the output opening 610.

Figure 6B:
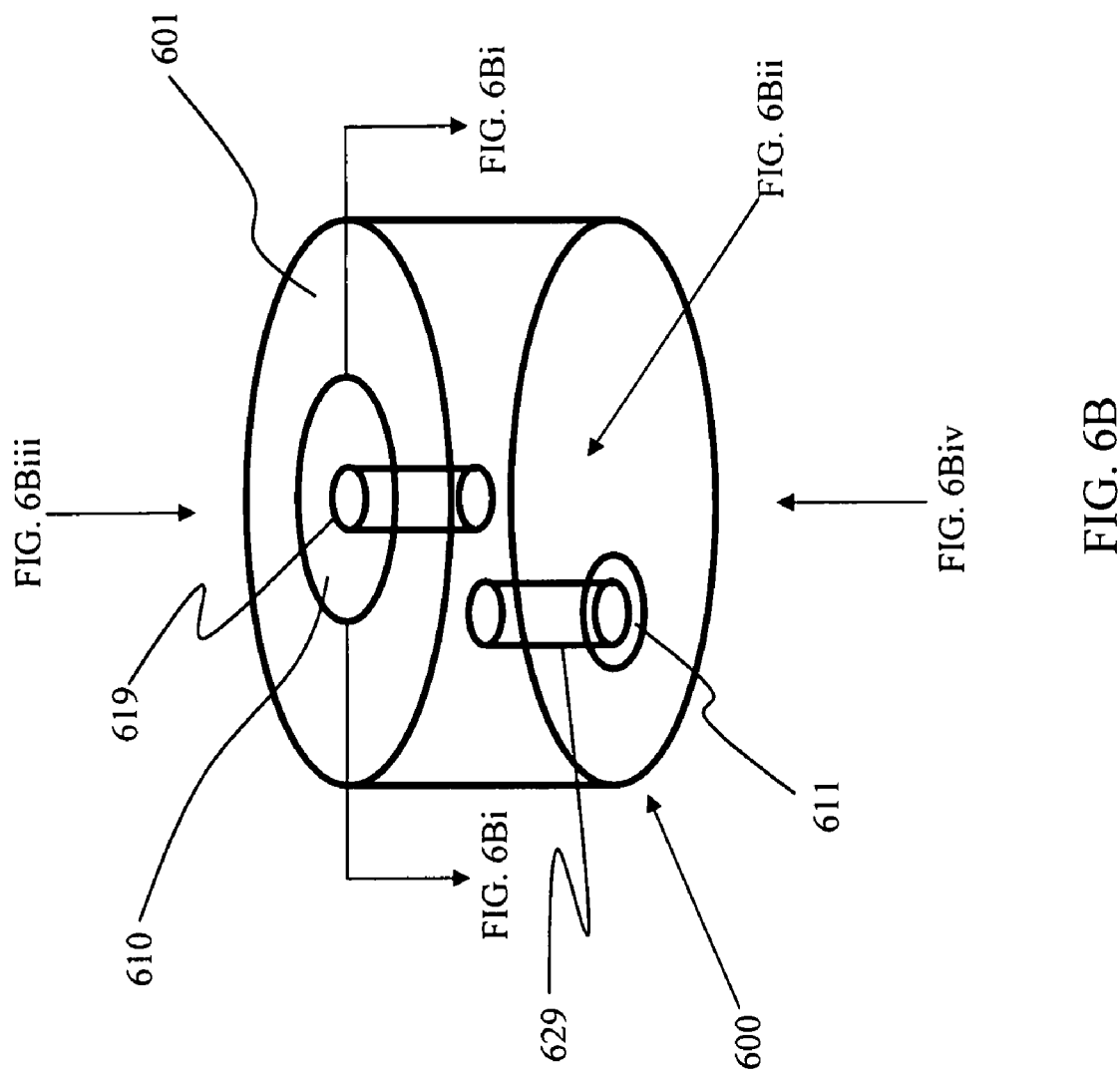
FIG. 6B is a perspective view of the resonator as shown in FIG. 6A with two blind holes penetrating substantially into the dielectric material that comprises the resonator.
Figure 6B:
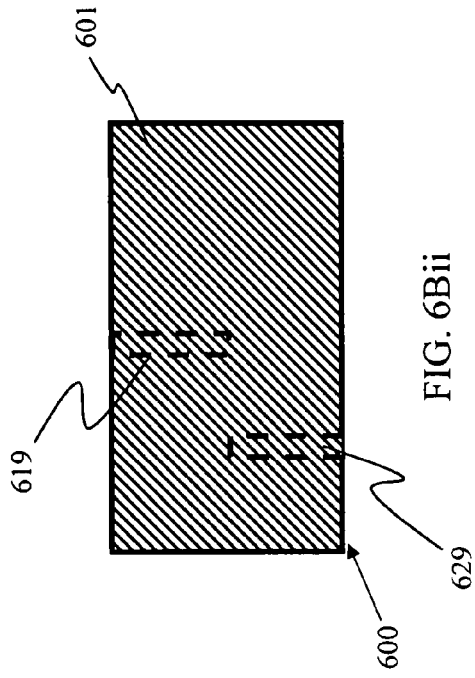
Figure 6B:
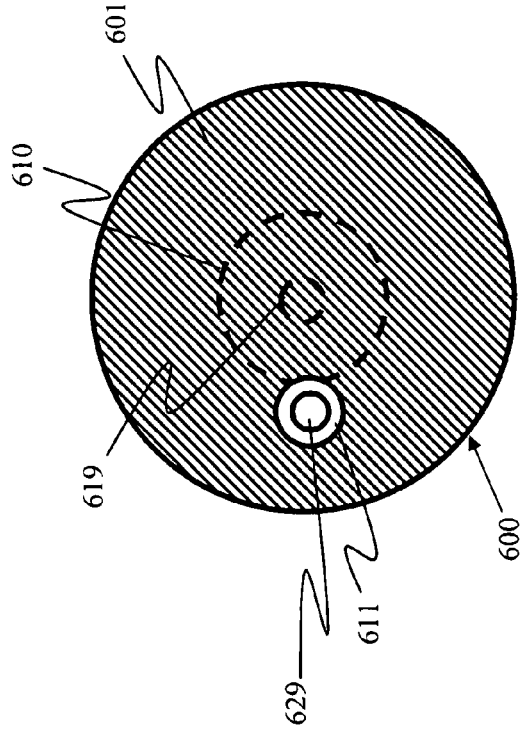
Figure 6B:
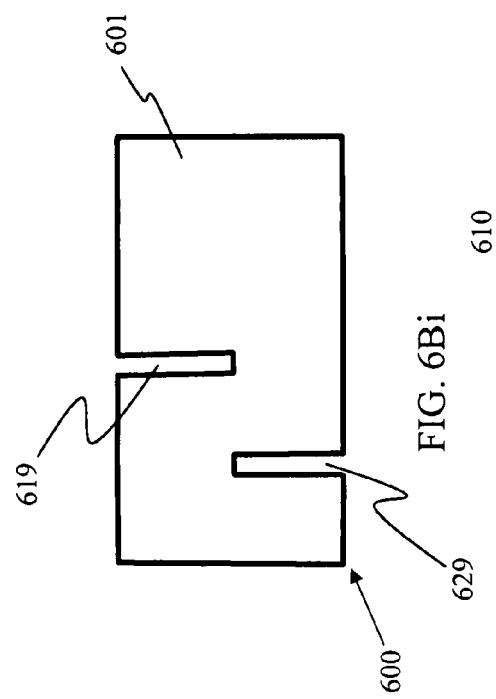

FIG. 6B is a perspective view of the resonator 600 as shown in FIG. 6A with two blind holes penetrating substantially into the dielectric material that comprises the resonator 600. The output blind hole 619 begins substantially within the output opening 610, and the input blind hole begins substantially within the input opening 611. For the sake of brevity, the cylindrical body 602, output end 603, and input end 604 will not be further referred to in the drawings or text; one of ordinary skill in the art can obviously appreciate that these elements only serve to label the simple geometry of the resonator 600 and are not necessary for the understanding of the detailed description.

FIG. 6Bi is a cross-sectional view of the resonator 600 in FIG. 6B; the direction of the cross-section is as shown in FIG. 6B. The cross-section shows the two blind holes in the resonator 600, the output blind hole 619 and the input blind hole 629.

FIG. 6Bii is an elevation view of the resonator 600 in FIG. 6B; the direction of viewing is as shown in FIG. 6B. The elevation view displays the conductive veneer 601 as well as (hidden from view) the output blind hole 619 and (hidden from view) the input blind hole 629.

FIG. 6Biii is a plan view of the resonator 600 in FIG. 6B; the direction of viewing is as shown in FIG. 6B. The plan view displays the output opening 610 and the output blind hole 619 that starts substantially within the output opening 610. The plan view also displays (hidden from view) the input opening 611 and (hidden from view) the input blind hole 629 that starts substantially within the input opening 611.

FIG. 6Biv is a plan view of the resonator 600 in FIG. 6B; the direction of viewing is as shown in FIG. 6B. The plan view displays the input opening 611 and the input blind hole 629 that starts substantially within the input opening 611. The plan view also displays (hidden from view) the output opening 610 and (hidden from view) the output blind hole 619 that starts substantially within the output opening 610.

Figure 6C:
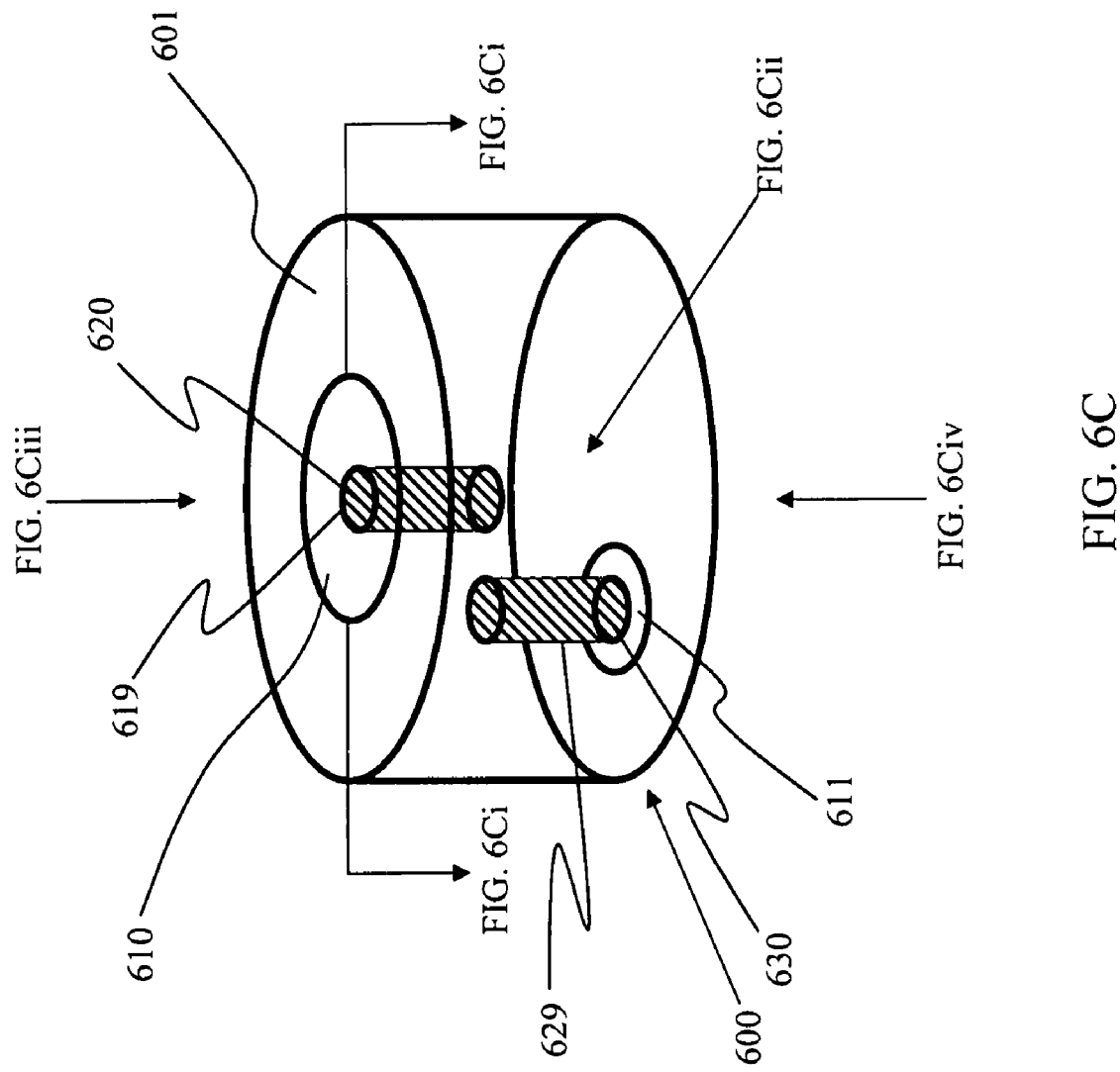
FIG. 6C is a perspective view of the resonator in FIG. 6B with a specific mechanism for coupling to the RF electromagnetic field modes of the resonator.

FIG. 6C is a perspective view of the resonator 600 in FIG. 6B with a specific mechanism for coupling to the RF electromagnetic field modes of the resonator 600. Output e-field probe 620 and input e-field probe 630 are made from high conductivity metals, non-limiting examples of which are copper, gold, and silver; alternatively, the e-field probes 620 and 630 can be made from materials with superior thermal properties, a non-limiting example of which is Kovar, and have a high-conductivity veneer or coating, non-limiting examples of which are copper, gold, and silver. The output e-field probe 620 is inserted into the output blind hole 619, the output e-field probe 620 having such a shape that it makes substantially intimate contact with the entire output blind hole 619. Similarly, the input e-field probe 630 is inserted into the input blind hole 629, the input e-field probe 630 having such a shape that it makes substantially intimate contact with the entire input blind hole 629. The contact between output e-field probe 620 and the output blind hole 619 of the resonator 600 is intimate enough that it substantially prevents arcing between the output e-field probe 620 and the output blind hole 619 of the resonator 600 at the highest RF powers at which a user will operate the lamp. Similarly, the contact between input e-field probe 630 and the input blind hole 629 of the resonator 600 is intimate enough that it substantially prevents arcing between the input e-field probe 630 and the input blind hole 629 of the resonator 600 at the highest RF powers at which a user will operate the lamp. Intimate contact between either e-field probe (620 or 630) and its respective blind hole (619 or 629) can be aided by a layer of silver epoxy or silver cement or other high temperature epoxy or cement between a blind hole and an e-field probe; alternatively, a layer of a substantially deformable material, a non-limiting example of which is polytetrafluorethylene (PTFE, which is commonly known as TEFLON®), between an e-field probe and a blind hole can also aid in the making of substantially intimate contact. Energy from the RF source 120 (not shown) is coupled into the resonator 600 via input e-field probe 630 and RF energy is coupled out of the resonator 600 to the gas-fill vessel 130 (not shown) via output e-field probe 620. Output e-field probe 620 is ideally located at the location of the maximum or high RF electric field of the resonator 600. Input e-field probe 630 is located near the location of the maximum or high RF electric field of the resonator 600. The length, diameter, and position of the e-field probes 620 and 630 are optimized to maximize transfer of RF energy to the gas-fill vessel 130. The resonant frequency of the resonator 600 is determined by at least these factors: the dielectric constant of the material from which the resonator 600 is made; the dimensions of the resonator 600; the size, shape and location of the output opening 610 and the input opening 611; and the dimensions, shape and location of the e-field probes 620 and 630. As an example of typical dimensions, a dielectric resonator 600, made from Alumina and working at a fundamental resonant frequency of 2 GHz, shaped substantially as a right-circular cylinder, has a diameter of approximately 35 mm and a height of approximately 20 mm. The input e-field probe 630 has a diameter of approximately 1.25 mm, and the input blind hole 629, which is substantially cylindrical, has a depth of approximately 9 mm; the output e-field probe 620 has a diameter of approximately 1.25 mm, and the output blind hole 619, which is also substantially cylindrical, has a depth of approximately 11 mm.

FIG. 6Ci is a cross-sectional view of the resonator 600 in FIG. 6C; the direction of the cross-section is as shown in FIG. 6C. The cross-section shows the two blind holes in the resonator 600, the output blind hole 619 and the input blind hole 629. In addition, the cross-section shows output e-field probe 620 in output blind hole 619 and input e-field probe 630 in input blind hole 629.

FIG. 6Cii is an elevation view of the resonator 600 in FIG. 6C; the direction of viewing is as shown in FIG. 6C. The elevation view displays the conductive veneer 601 as well as (hidden from view) the output blind hole 619, (hidden from view) the input blind hole 629, (hidden from view) the output e-field probe 620, and (hidden from view) the input e-field probe 630.

FIG. 6Ciii is a plan view of the resonator 600 in FIG. 6C; the direction of viewing is as shown in FIG. 6C. The plan view displays the output opening 610 and the output blind hole 619 that starts substantially within the output opening 610, as well as the output e-field probe 620. The plan view also displays (hidden from view) the input opening 611, (hidden from view) the input blind hole 629 that starts substantially within the input opening 611, as well as (hidden from view) the input e-field probe 630.

FIG. 6Civ is a plan view of the resonator 600 in FIG. 6C; the direction of viewing is as shown in FIG. 6C. The plan view displays the input opening 611 and the input blind hole 629 that starts substantially within the input opening 611, as well as the input e-field probe 630. The plan view also displays (hidden from view) the output opening 610 and (hidden from view) the output blind hole 619 that starts substantially within the output opening 610, as well as (hidden from view) the output e-field probe 620.

Figure 6D:
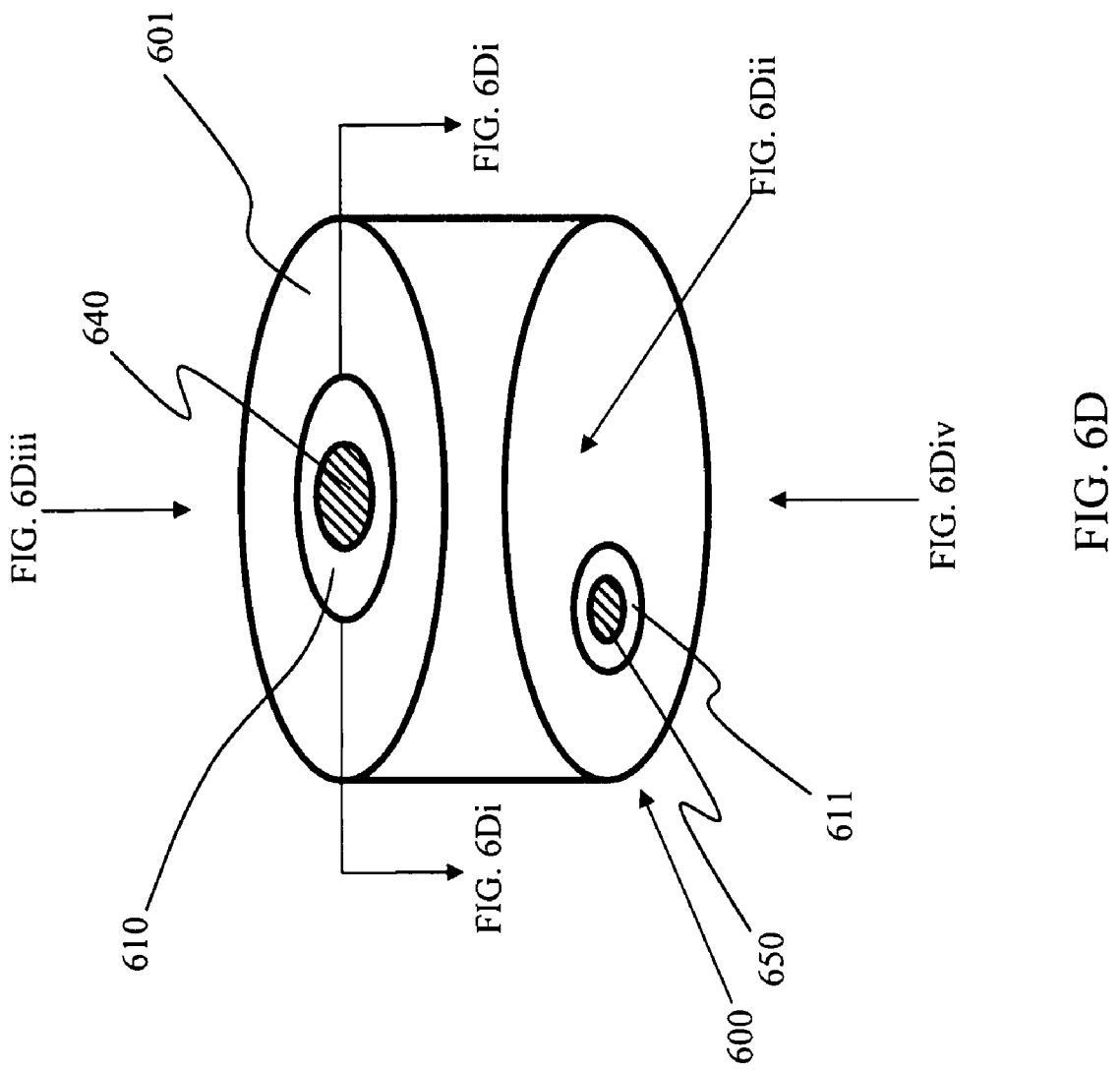
FIG. 6D is a perspective view of a resonator as described in FIG. 6C with patch antennae replacing e-field probes for coupling RF energy into and out of the resonator.

FIG. 6D is a perspective view of a resonator 600 as described in FIG. 6C with patch antennae replacing e-field probes for coupling RF energy into and out of the resonator 600. Output patch antenna 640 has replaced the combination of the output e-field probe 620 and the output blind hole 619. Similarly, input patch antenna 650 has replaced the combination of the input e-field probe 630 and the input blind hole 629. As in the resonators 600 of FIG. 6A, FIG. 6B, and FIG. 6C, a conductive veneer 601 covers the resonator 600 except for output opening 610 and input opening 611, which expose the underlying dielectric around the patch antennae 640 and 650. Again, as in the resonators 600 of FIG. 6A, FIG. 6B, and FIG. 6C, the conductive veneer 601 is connected to RF circuit ground. The input patch antenna 650 couples RF energy into the resonator 600 and output patch antenna 640, preferably centered at the location of maximum electric field, couples RF energy out of the resonator 600 and into a gas-fill vessel 130. In this case, both impedance matching and the resonant frequency of the resonator 600 are determined through the geometry of the patch antennae 640 and 650, that is through the diameter of 640 and 650, as well as the location of the patch on the resonator and dimensions and dielectric constant of the resonator. As can be appreciated by one of skill in the art, the shapes of the patch antennae 640 and 650 are arbitrary and need not be the same; in particular, the shapes can be picked to adjust the coupling of RF energy into and out of the resonator 600 and to the gas-fill vessel 130 (not shown), as well as adjust the RF resonant frequency of the resonator 600.

FIG. 6Di is a cross-sectional view of the resonator 600 in FIG. 6D; the direction of the cross-section is as shown in FIG. 6D. As in FIG. 6Ai, the cross-section shows only the bulk of the dielectric resonator 600 in this case.

FIG. 6Dii is an elevation view of the resonator 600 in FIG. 6D; the direction of viewing is as shown in FIG. 6D. As in FIG. 6Bii, the elevation view shows only the conductive veneer 601 on the exterior of the resonator 600.

FIG. 6Diii is a plan view of the resonator 600 in FIG. 6D; the direction of viewing is as shown in FIG. 6D. The plan view displays the output opening 610 and the output patch antenna 640. The plan view also displays (hidden from view) the input opening 611, (hidden from view) the input patch antenna 650.

FIG. 6Div is a plan view of the resonator 600 in FIG. 6D; the direction of viewing is as shown in FIG. 6D. The plan view displays the input opening 611 and the input patch antenna 650. The plan view also displays (hidden from view) the output opening 610 and (hidden from view) the output patch antenna 640.

Figure 6E:
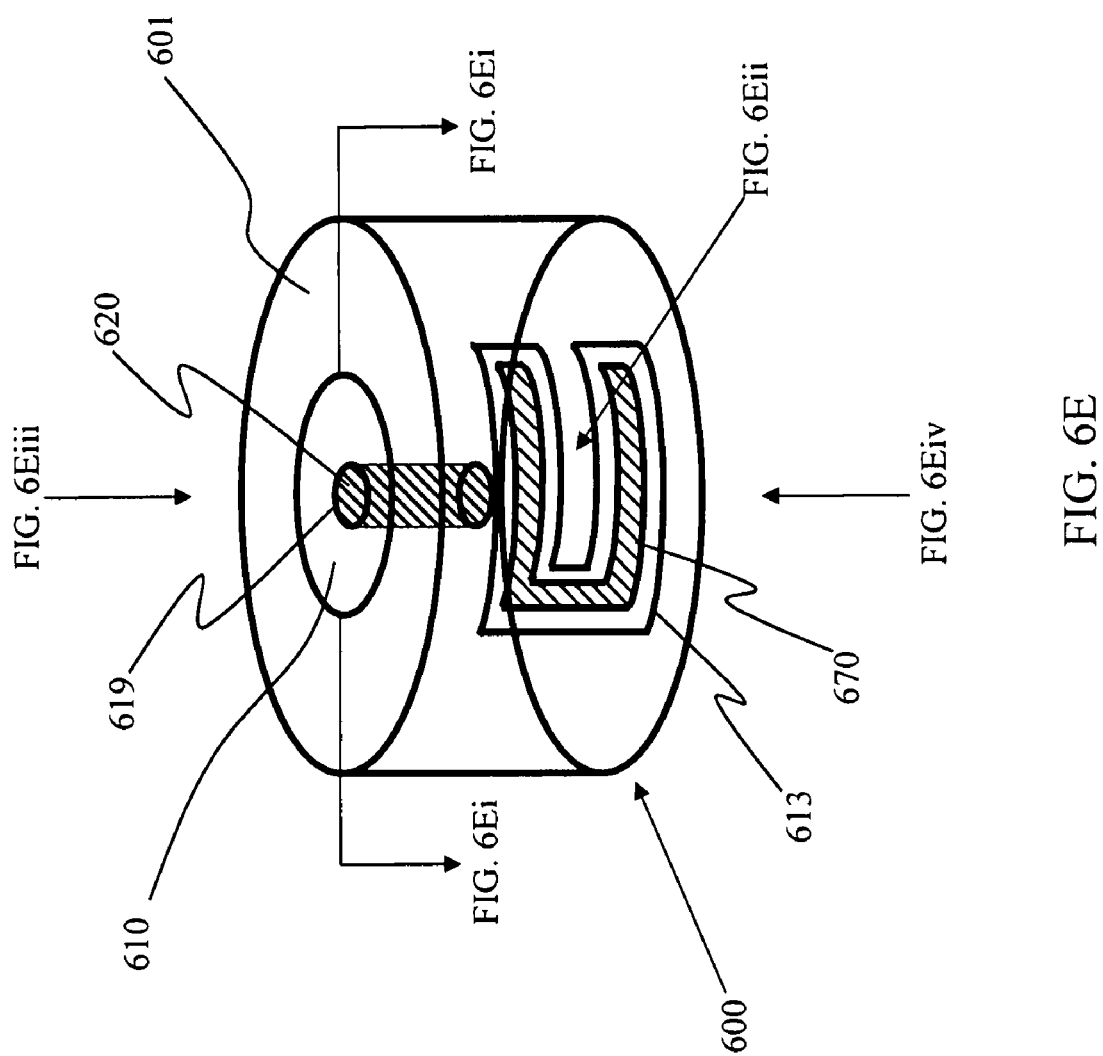
FIG. 6E is a perspective view of a resonator, similar to the resonator of FIG. 6C, in which the input opening, the input blind hole, and the input e-field probe have been replaced by an input h-field patch opening and an input h-field patch.

FIG. 6E is a perspective view of a resonator 600, similar to the resonator 600 of FIG. 6C, in which the input opening 611, the input blind hole 629, and the input e-field probe 630 have been replaced by an input h-field patch opening 613 and an input h-field patch 670. The input h-field patch opening 613 is an opening in the sidewall conductive veneer 601 of the resonator 600, which exposes the underlying dielectric. The input h-field patch 670 is a mechanism that couples a substantial amount of RF energy due to a magnetic field interaction with the magnetic field mode of the resonator 600. RF energy can be coupled in and out of the resonator 600 via the h-field patch 670. RF energy is coupled to the gas-fill vessel 130 (not shown) via the output e-field probe 620. In this case, both impedance matching and the resonant frequency of the resonator 600 are determined by the size, shape, position, and composition of the input h-field patch 670; the size and shape of the input h-field patch opening; the size, shape, and position of the output e-field probe 620, as well as the dimensions and dielectric constant of the resonator 600. As can be appreciated by one of skill in the art, the shape of the input h-field patch 670 can be made in other shapes to adjust the coupling of RF energy into and out of the resonator 600.

FIG. 6Ei is a cross-sectional view of the resonator 600 in FIG. 6E; the direction of the cross-section is as shown in FIG. 6E. The cross-section shows a single blind hole in the resonator 600, the output blind hole 619. In addition, the cross-section shows output e-field probe 620 in output blind hole 619.

FIG. 6Eii is an elevation view of the resonator 600 in FIG. 6E; the direction of viewing is as shown in FIG. 6E. The elevation view features the input h-field patch opening 613 and the input h-field patch 670. The elevation view displays the conductive veneer 601 as well as (hidden from view) the output blind hole 619 and (hidden from view) the output e-field probe 620.

FIG. 6Eiii is a plan view of the resonator 600 in FIG. 6E; the direction of viewing is as shown in FIG. 6E. The plan view displays the output opening 610 and the output blind hole 619 that starts substantially within the output opening 610, as well as the output e-field probe 620.

FIG. 6Eiv is a plan view of the resonator 600 in FIG. 6E; the direction of viewing is as shown in FIG. 6E. The plan displays (hidden from view) the output opening 610 and (hidden from view) the output blind hole 619 that starts substantially within the output opening 610, as well as (hidden from view) the output e-field probe 620.

Figure 6F:
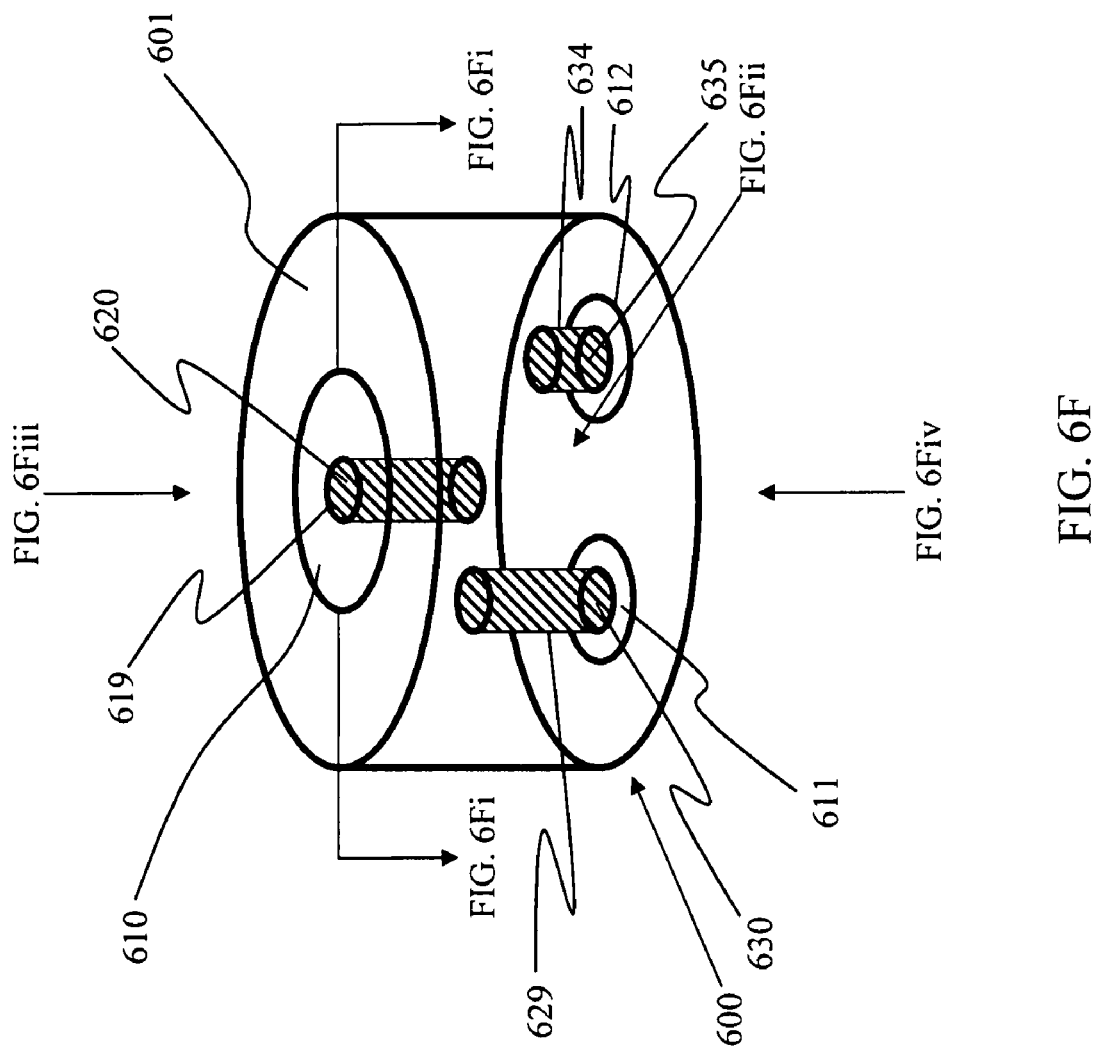
FIG. 6F is a perspective view of a resonator as described in FIG. 6C, further comprising a feedback opening, a feedback blind hole, and a feedback e-field probe.

FIG. 6F is a perspective view of a resonator 600 as described in FIG. 6C, further comprising a feedback opening 612, a feedback blind hole 634, and a feedback e-field probe 635. The feedback e-field probe 635 has a shorter probe length compared to the coupling probes, which are output e-field probe 620 and input e-field probe 630. Feedback e-field probe 635 couples a much smaller amount of RF energy out of the resonator 600 to provide input to the amplifier 210 (not shown) to create oscillations at the RF resonant frequency of the resonator 600 and generate RF power that couples from the output of the amplifier into the resonator via probe 630. As in the resonator 600 of FIG. 6C, input e-field probe 630 couples energy into the resonator 600 and output e-field probe 620 couples energy out of the resonator 600 and into the gas-fill vessel 130 (not shown), which is located in the opening 610 of the conductive veneer 601 substantially covering the resonator 600.

FIG. 6Fi is a cross-sectional view of the resonator 600 in FIG. 6F; the direction of the cross-section is as shown in FIG. 6F. The cross-section shows the three blind holes in the resonator 600, the output blind hole 619, the input blind hole 629, and the feedback blind hole 634. In addition, the cross-section shows output e-field probe 620 in output blind hole 619, input e-field probe 630 in input blind hole 629, and feedback e-field probe 635 in feedback blind hole 634.

FIG. 6Fii is an elevation view of the resonator 600 in FIG. 6F; the direction of viewing is as shown in FIG. 6F. The elevation view displays the conductive veneer 601 as well as (hidden from view) the output blind hole 619, (hidden from view) the input blind hole 629, (hidden from view) the feedback blind hole 634, (hidden from view) the output e-field probe 620, (hidden from view) the input e-field probe 630, and (hidden from view) the feedback e-field probe 635.

FIG. 6Fiii is a plan view of the resonator 600 in FIG. 6F; the direction of viewing is as shown in FIG. 6F. The plan view displays the output opening 610 and the output blind hole 619 that starts substantially within the output opening 610, as well as the output e-field probe 620. The plan view also displays (hidden from view) the input opening 611, (hidden from view) the input blind hole 629 that starts substantially within the input opening 611, as well as (hidden from view) the input e-field probe 630. Finally, the plan view displays (hidden from view) the feedback opening 612, (hidden from view) the feedback blind hole 634 that starts substantially within the feedback opening 612, as well as (hidden from view) the feedback e-field probe 635.

FIG. 6Fiv is a plan view of the resonator 600 in FIG. 6F; the direction of viewing is as shown in FIG. 6F. The plan view displays the input opening 611 and the input blind hole 629 that starts substantially within the input opening 611, as well as the input e-field probe 630. In addition, the plan view displays the feedback opening 612 and the feedback blind hole 634 that starts substantially within the feedback opening 612, as well as the feedback e-field probe 635. The plan view also displays (hidden from view) the output opening 610 and (hidden from view) the output blind hole 619 that starts substantially within the output opening 610, as well as (hidden from view) the output e-field probe 620.

Figure 6G:
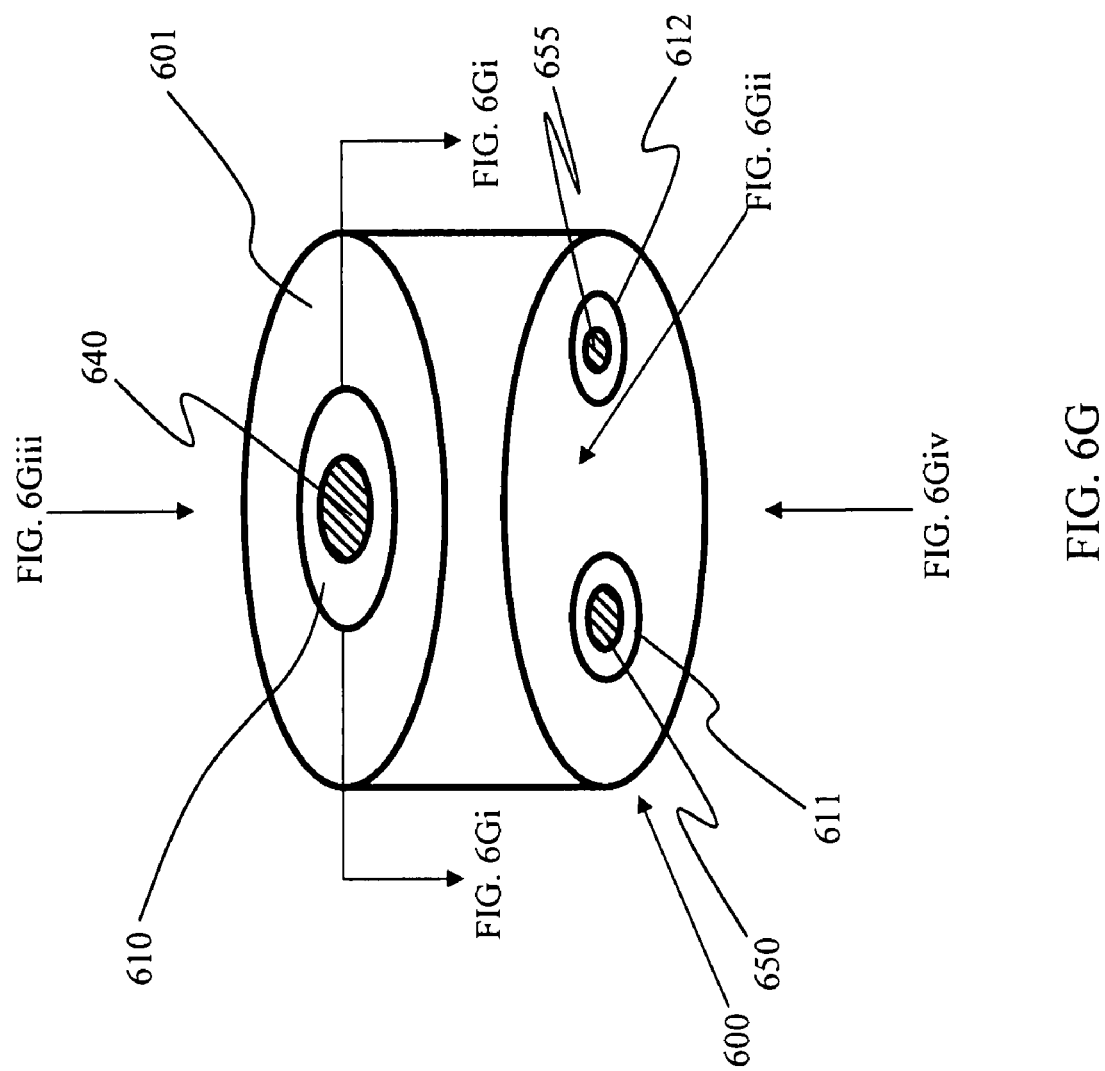
FIG. 6G is a perspective view of a resonator as described in FIG. 6D, further comprising a feedback opening and a feedback patch antenna.
Figure 6G:
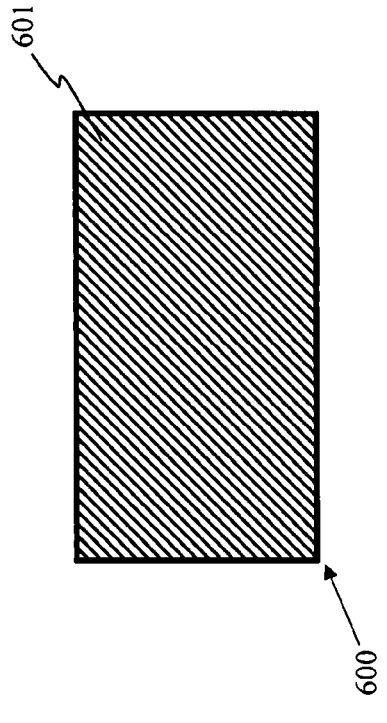
Figure 6G:
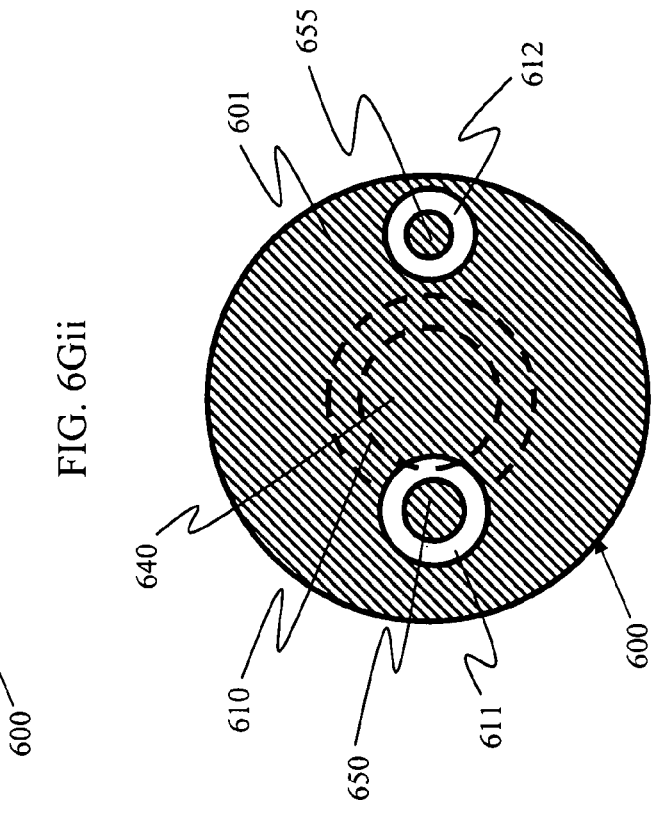
Figure 6G:
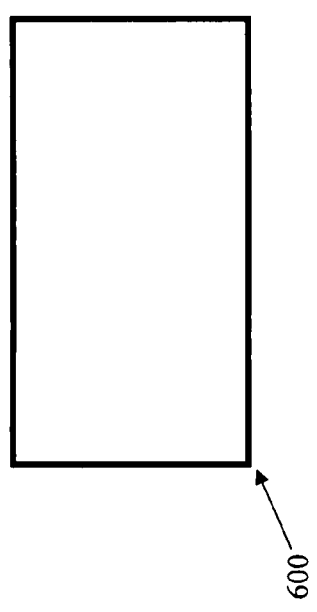

FIG. 6G is a perspective view of a resonator 600 as described in FIG. 6D, further comprising a feedback opening 612 and a feedback patch antenna 655. This patch antenna (feedback antenna) is much smaller than the coupling antennae, which are input patch antenna 650 and output patch antenna 640, and couples a much smaller amount of RF energy out of the resonator 600 to provide input to the amplifier 210 (not shown) to cause oscillations at the resonant RF frequency of the resonator 600 and generate RF power that couples from the output of the amplifier into the resonator via patch antenna 650. As in the resonator of FIG. 6D, input patch antenna 650 couples energy into the resonator 600 and output patch antenna 640 couples energy out of the resonator 600 and into the gas-fill vessel 130 (not shown), which is located in the output opening 610 of the conductive veneer 601 covering the resonator 600.

FIG. 6Gi is a cross-sectional view of the resonator 600 in FIG. 6G; the direction of the cross-section is as shown in FIG. 6G. The cross-section shows only the bulk of the dielectric resonator 600 in this case.

FIG. 6Gii is an elevation view of the resonator 600 in FIG. 6G; the direction of viewing is as shown in FIG. 6G. The elevation view displays the conductive veneer 601 of the resonator 600.

FIG. 6Giii is a plan view of the resonator 600 in FIG. 6G; the direction of viewing is as shown in FIG. 6G. The plan view displays the output opening 610, as well as the output patch antenna 640. The plan view also displays (hidden from view) the input opening 611, as well as (hidden from view) the input patch antenna 650. Finally, the plan view displays (hidden from view) the feedback opening 612, as well as (hidden from view) the feedback patch antenna 655.

FIG. 6Giv is a plan view of the resonator 600 in FIG. 6G; the direction of viewing is as shown in FIG. 6G. The plan view displays the input opening 611, as well as the input patch antenna 650. In addition, the plan view displays the feedback opening 612, as well as the feedback patch antenna 655. The plan view also displays (hidden from view) the output opening 610, as well as (hidden from view) the output patch antenna 640.

Figure 6H:
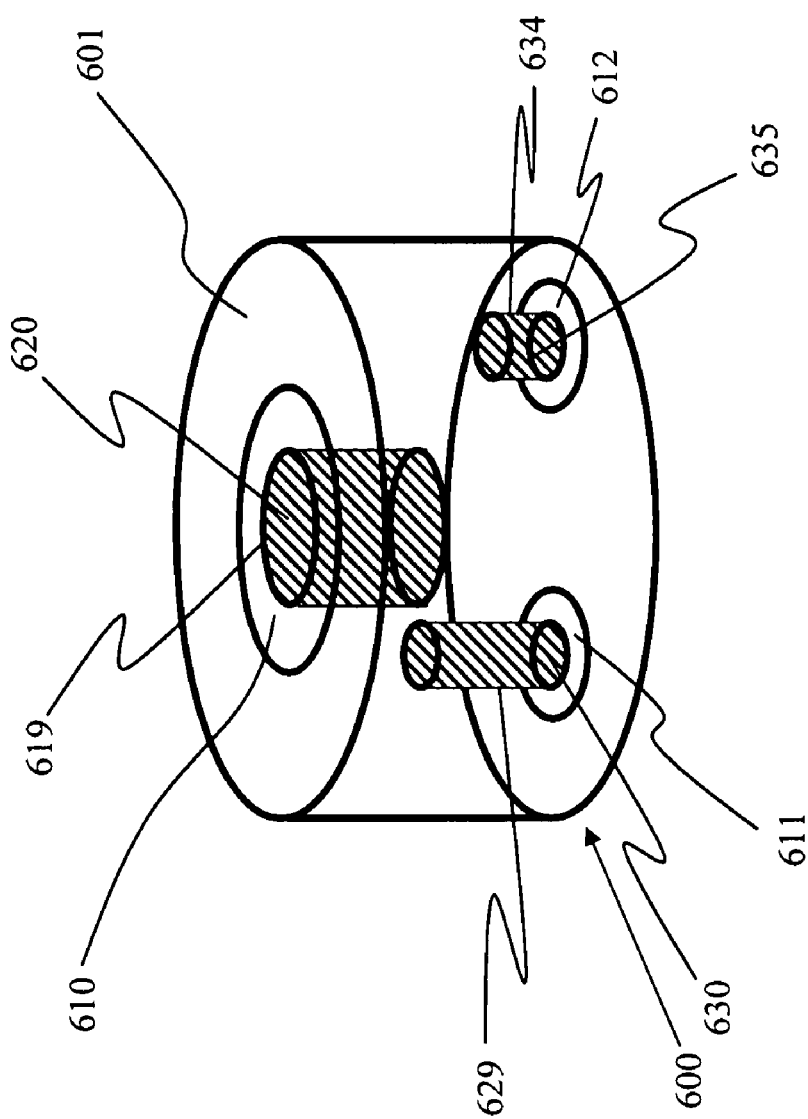
FIG. 6H is a perspective view of a distributed resonator that is in the form of the dielectric resonator of FIG. 6F, where the output e-field probe has much larger diameter than that of the e-field probe shown in FIG. 6F.

FIG. 6H is a perspective view of a distributed and dielectric resonator 600 that is in the form of the dielectric resonator of FIG. 6F, where the output e-field probe 620 has much larger diameter than the e-field probe shown in FIG. 6F. The larger diameter of the output e-field probe 620 lowers the resonant frequency of the resonator 600, allowing operation of the lamp using lower frequency power amplifiers (such as amplifier 210, which is not shown) that are lower in cost. By changing the dimensions of the probe, in addition to impedance matching to the gas-fill vessel, it is possible to lower the resonant frequency of the resonator 600 without having to use higher dielectric constant materials or to increase the size of the resonator 600.

Figure 6I:
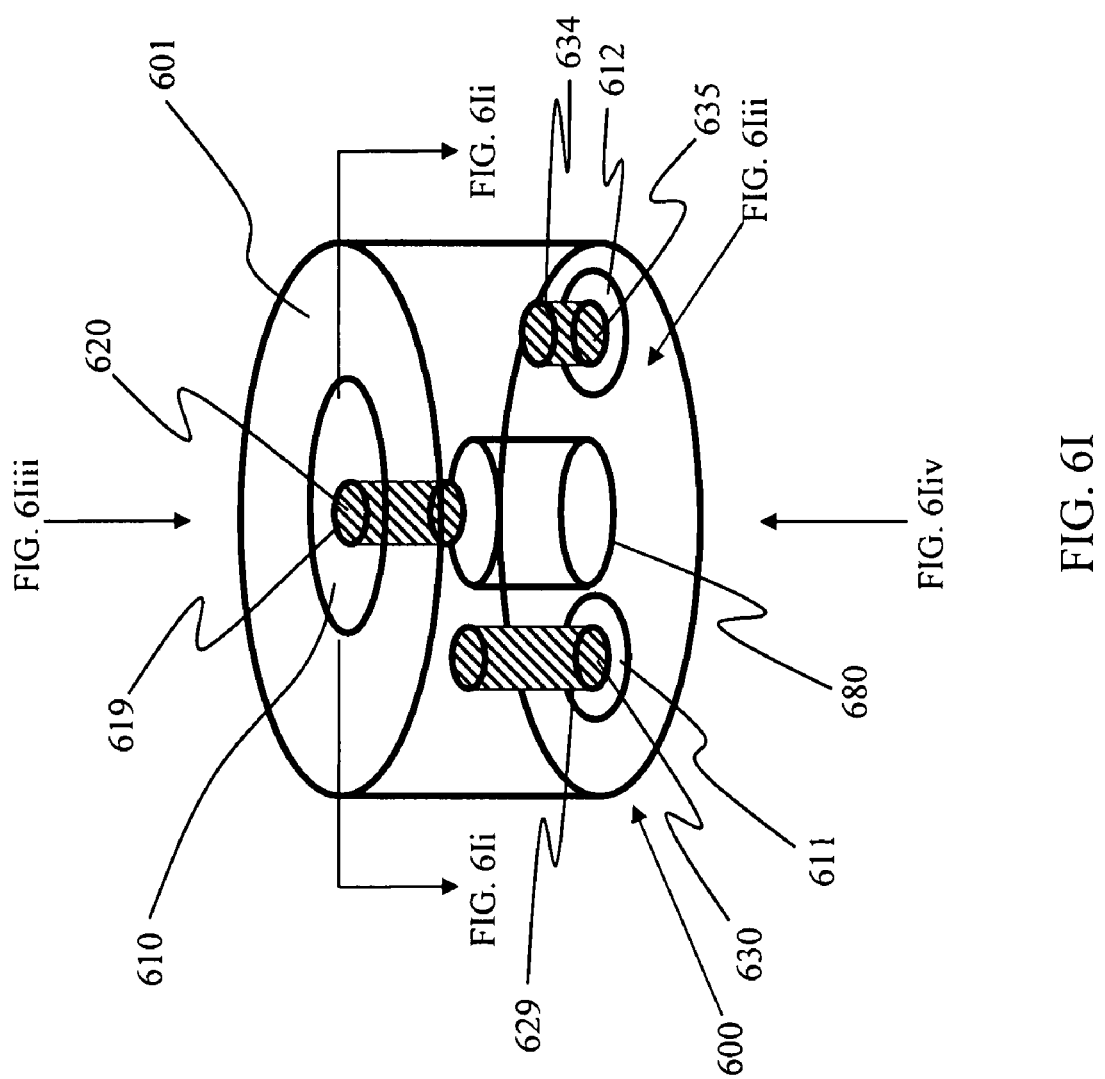
FIG. 6I depicts a distributed resonator that is in the form of a dielectric resonator similar to FIG. 6F, further comprising a tuning blind hole.

FIG. 6I depicts a distributed resonator 600 that is in the form of a dielectric resonator similar to FIG. 6F, further comprising a tuning blind hole 680. The dimension of the tuning blind hole 680 can be adjusted to lower the RF resonant frequency of the resonator 600 without increasing the size of the resonator 600. The tuning blind hole 680 does not go all the way through the resonator, as is also implied by the name tuning blind hole 680. The inside of the tuning blind hole is covered with a conductive veneer connected to conductive veneer 601 covering the distributed resonator 600. It is also possible to fill the tuning blind hole 680 with large diameter metal pin that is connected to the RF ground of the resonator 600.

FIG. 6Ii is a cross-sectional view of the resonator 600 in FIG. 6I highlighting the tuning blind hole 680. The tuning blind hole 680 is covered by the conductive veneer 601, which also covers the surface of the resonator except for output opening 610, input opening 611, and feedback opening 612. The conductive veneer 601 serves as RF ground of the resonator 600. As discussed above, the dimensions of the tuning blind hole 680 can be adjusted to lower the resonant frequency of the resonator 600 without increasing the size of the resonator 600. One can clearly see in the cross-sectional view that the tuning blind hole 680 does not go all the way through the resonator 600. The tuning blind hole 680 can also be filled with a metal pin that is connected to the ground of the resonator, or, alternatively, the tuning blind hole 680 can be filled with a dielectric material before being covered by the conductive veneer 601. Even though in FIG. 6I one tuning blind hole is shown it is possible to have more than one tuning blind hole and the blind hole does not have to be located at the center of the resonator.

FIG. 6Iii is an elevation view of the resonator 600 in FIG. 6I; the direction of viewing is as shown in FIG. 6I. The elevation view displays the conductive veneer 601 as well as (hidden from view) the tuning blind hole 680, (hidden from view) the output blind hole 619, (hidden from view) the input blind hole 629, (hidden from view) the feedback blind hole 634, (hidden from view) the output e-field probe 620, (hidden from view) the input e-field probe 630, and (hidden from view) the feedback e-field probe 635.

FIG. 6Iiii is a plan view of the resonator 600 in FIG. 6I; the direction of viewing is as shown in FIG. 6I. The plan view displays the output opening 610 and the output blind hole 619 that starts substantially within the output opening 610, as well as the output e-field probe 620. The plan view also displays (hidden from view) the tuning blind hole 680, (hidden from view) the input opening 611, (hidden from view) the input blind hole 629 that starts substantially within the input opening 611, as well as (hidden from view) the input e-field probe 630. Finally, the plan view displays (hidden from view) the feedback opening 612, (hidden from view) the feedback blind hole 634 that starts substantially within the feedback opening 612, as well as (hidden from view) the feedback e-field probe 635.

FIG. 6Iiv is a plan view of the resonator 600 in FIG. 6I; the direction of viewing is as shown in FIG. 6I. The plan view displays the tuning blind hole 680 and illustrates that the tuning blind hole is, as discussed above, substantially covered by the conductive veneer 601. The plan view also displays the input opening 611 and the input blind hole 629 that starts substantially within the input opening 611, as well as the input e-field probe 630. In addition, the plan view displays the feedback opening 612 and the feedback blind hole 634 that starts substantially within the feedback opening 612, as well as the feedback e-field probe 635. The plan view also displays (hidden from view) the output opening 610 and (hidden from view) the output blind hole 619 that starts substantially within the output opening 610, as well as (hidden from view) the output e-field probe 620.

Figure 6J:
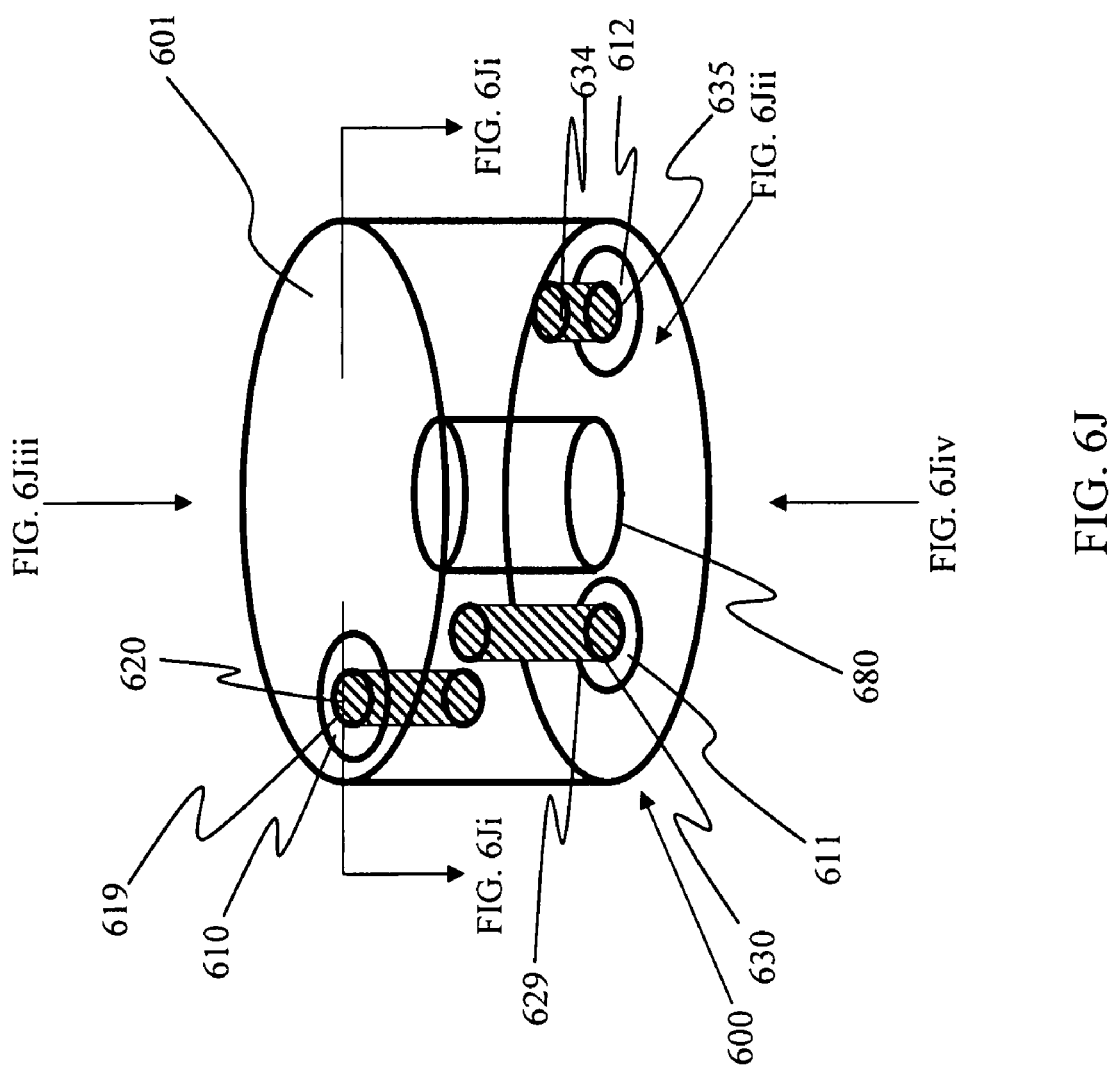
FIG. 6J depicts a distributed resonator similar to FIG. 6I, but with significantly offset placement of the output opening, output blind hole, and output e-field probe.

FIG. 6J depicts a distributed resonator 600 similar to FIG. 6I, but with significantly offset placement of the output opening 610, output blind hole 619, and output e-field probe 620. Output opening 610, output blind hole 619, and output e-field probe 620 will be referred to collectively as "output coupling elements;" similarly input opening 611, input blind hole 629, and input e-field probe 630 will be referred to collectively as "input coupling elements." This offset placement of output coupling elements allows for a larger central tuning blind hole 680 than can be achieved in FIG. 6I; in addition, allowing the offset placement of output probing elements allows for a wider range of impedance matching using the output probing elements. Output probing elements are not near the center of the resonator but are, instead, proximate the input coupling elements. By adjusting the size and location of the input probing elements and output probing elements, coupling of the RF energy into the gas-fill vessel 130 (not shown) can be maximized. As mentioned above, the tuning blind hole 680 can be used to lower the resonant frequency of the resonator 600 without changing the size of the resonator 600. The tuning blind hole 680 does not go all the way through the resonator 600, as is implied by the name tuning blind hole 680. Conductive veneer 601 covers the resonator, including inside of the tuning blind hole 680, except for openings in the conductive veneer 601 which facilitate probing such as output opening 610, input opening 611, and feedback opening 612. The shorter feedback e-field probe 635 is used to couple a small amount of RF energy out of the resonator 600 to provide feedback to amplifier 210 (not shown) for producing RF oscillations at the RF resonant frequency of the resonator 600 and generate RF power that couples from the output of the amplifier into the resonator via probe 630. The tuning blind hole 680 need not be empty; it is also possible to fill the blind hole 680 with large diameter metal pin that is connected to the RF ground of the resonator 600.

FIG. 6Ji is a cross-sectional view of the resonator 600 in FIG. 6I highlighting the tuning blind hole 680. The tuning blind hole 680 is covered by the conductive veneer 601, which also covers the surface of the resonator except for output opening 610, input opening 611, and feedback opening 612. The conductive veneer 601 serves as RF ground of the resonator 600. As discussed above, the dimensions of the tuning blind hole 680 can be adjusted to lower the resonant frequency of the resonator 600 without increasing the size of the resonator 600. One can clearly see in the cross-sectional view that the tuning blind hole 680 does not go all the way through the resonator 600. The tuning blind hole 680 can also be filled with a metal pin that is connected to the ground of the resonator, or, alternatively, the tuning blind hole 680 can be filled with a dielectric material with a higher dielectric constant material than resonator 600 before being covered with conductive veneer 601.

FIG. 6Jii is an elevation view of the resonator 600 in FIG. 6J; the direction of viewing is as shown in FIG. 6J. The elevation view displays the conductive veneer 601 as well as (hidden from view) the tuning blind hole 680, (hidden from view) the output blind hole 619, (hidden from view) the input blind hole 629, (hidden from view) the feedback blind hole 634, (hidden from view) the output e-field probe 620, (hidden from view) the input e-field probe 630, and (hidden from view) the feedback e-field probe 635.

FIG. 6Jiii is a plan view of the resonator 600 in FIG. 6J; the direction of viewing is as shown in FIG. 6J. The plan view displays the output opening 610 and the output blind hole 619 that starts substantially within the output opening 610, as well as the output e-field probe 620. The plan view also displays (hidden from view) the tuning blind hole 680, (hidden from view) the input opening 611, (hidden from view) the input blind hole 629 that starts substantially within the input opening 611, as well as (hidden from view) the input e-field probe 630. Finally, the plan view displays (hidden from view) the feedback opening 612, (hidden from view) the feedback blind hole 634 that starts substantially within the feedback opening 612, as well as (hidden from view) the feedback e-field probe 635.

FIG. 6Jiv is a plan view of the resonator 600 in FIG. 6J; the direction of viewing is as shown in FIG. 6J. The plan view displays the tuning blind hole 680 and illustrates that the tuning blind hole is, as discussed above, substantially covered by the conductive veneer 601. The plan view also displays the input opening 611 and the input blind hole 629 that starts substantially within the input opening 611, as well as the input e-field probe 630. In addition, the plan view displays the feedback opening 612 and the feedback blind hole 634 that starts substantially within the feedback opening 612, as well as the feedback e-field probe 635. The plan view also displays (hidden from view) the output opening 610 and (hidden from view) the output blind hole 619 that starts substantially within the output opening 610, as well as (hidden from view) the output e-field probe 620.

As can be appreciated by one of ordinary skill in the art, although the tuning blind hole 680 is shown emanating from the input end 604 of the resonator 600, the placement of the tuning blind hole 680 is entirely arbitrary. Tuning will occur with the tuning blind hole 680 emanating from any portion of the resonator 600 and protruding in at any angle. Furthermore, one of ordinary skill in the art can appreciate that multiple tuning blind holes can be incorporated into the same resonator to facilitate a wider range of tuning.

One of ordinary skill in the art can appreciate that there is no special significance to the words "input" and "output" as used with respect to this invention. In some cases, the words merely indicate the direction of energy flow as seen by a user feeding RF energy into the resonator 600, which is then coupled into the gas-fill vessel 130.

One of ordinary skill in the art can appreciate that the probing means, such as e-field probes, patch antenna, and h-field patches, can be any known method of coupling RF energy into or out of an RF electromagnetic resonator. In addition, probing means can couple to the e-field, h-field, or any combination thereof to achieve the coupling of RF energy.

Figure 7B:
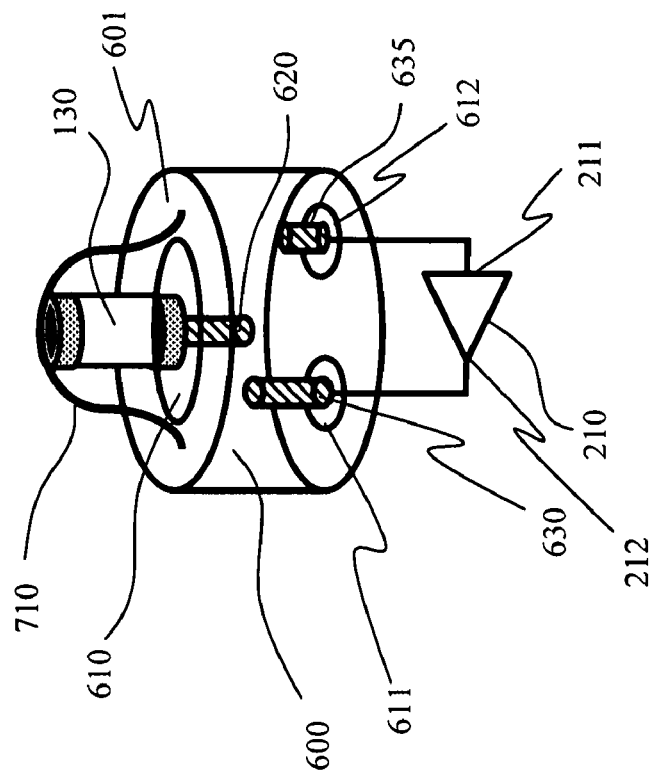
FIG. 7B is a perspective view of an external resonator electrode-less lamp, employing a distributed resonator as shown in FIG. 6F.
Figure 7A:
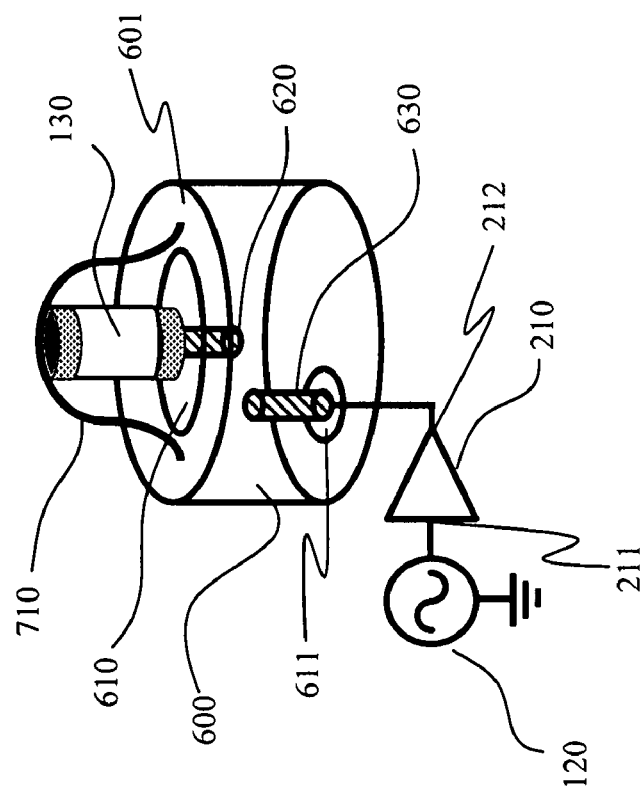
FIG. 7A is a perspective view of an external resonator electrode-less lamp, employing a distributed resonator as shown in FIG. 6C.

FIG. 7A is a perspective view of an external resonator electrode-less lamp, employing a distributed resonator 600 as shown in FIG. 6C. As described above, and as can be appreciated by one of ordinary skill in the art, the gas-fill vessel 130 is not contained within the resonator 600 and does not sample the RF electromagnetic field of the resonator 600 directly. Instead, RF energy from the resonator 600 is coupled into the gas-fill vessel 130 indirectly via output e-field probe 620, which could, alternatively, be an output patch antenna 640 or any other RF coupling means known in the art. The resonator 600 is affixed with the gas-fill vessel 130 and capacitively coupled to the resonator 600 via output e-field probe 620. RF Energy is coupled into the resonator 600 from an RF source comprising an RF oscillator 120 and RF amplifier 210. The RF oscillator 120 is conductively connected with RF amplifier input 211 of RF amplifier 210, and RF amplifier output 212 is conductively connected with input e-field probe 630, which couples RF energy into the resonator 600. RF energy is coupled out of the resonator 600 to the gas-fill vessel 130 via output e-field probe 620. A grounding strap 710 connected with a portion of the gas-fill vessel 130 makes electrical connection to RF circuit ground via conductive veneer 601. As can be appreciated by one of ordinary skill in the art, a grounding strap can be anything with sufficiently low RF impedance to allow connection of a portion of the gas-fill vessel 130 with RF ground. The resonator is substantially covered by conductive veneer 601, except for input opening 611 and output opening 610. The size (length and diameter) and location of the input e-field probe 630 and output e-field probe 620 are optimized to maximize RF energy transferred to the gas-fill vessel 130. The resonant frequency of the dielectric resonator 600 is primarily determined by the dimensions of the dielectric resonator 600 and the dielectric constant of the material from which resonator 600 is made but will also depend on the dimensions of the output e-field probe 620 and input e-field probe 630. In this figure and in following figures, it should be understood that labeling of blind holes, such as output blind hole 619, and input blind hole 629, are omitted for clarity but are still a part of the resonator 600.

FIG. 7B is a perspective view of an external resonator electrode-less lamp, employing a distributed resonator 600 as shown in FIG. 6F. The resonator 600 is connected with gas-fill vessel 130. The shorter feedback e-field probe 635 couples a small amount of RF energy out of the resonator 600 and provides feedback to the RF amplifier input 211 of RF amplifier 210 to create a Dielectric Resonator Oscillator (DRO). The input e-field probe 630, which is conductively connected with RF amplifier output 212, completes the DRO circuit. RF Energy is coupled out of the resonator 600 to the gas-fill vessel 130 through the output e-field probe 620. Grounding strap 710 makes electrical connection from a portion of the gas-fill vessel 130 to circuit ground through conductive veneer 601. The resonator 600 is substantially covered by conductive veneer 601, except for input opening 611, output opening 610, and feedback opening 612. The size (length and diameter) and location of the input e-field probe 630, output e-field probe 620, and feedback e-field probe 635 are optimized to maximize RF energy transfer to gas-fill vessel 130. The resonant frequency of the dielectric resonator 600 is primarily determined by the dimensions of the dielectric resonator 600 and the dielectric constant of the material from which resonator 600 is made but will also depend on the dimensions of output e-field probe 620, input e-field probe 630, and—to a lesser extent—feedback e-field probe 635. In this figure it should be understood by one of ordinary skill in the art that labeling of feedback blind hole 634 is omitted for clarity but it is still a part of the resonator 600. In addition, one of ordinary skill in the art can appreciate that, as will often be done for the remainder of the detailed description, labeling of the RF amplifier input 211 and RF amplifier output 212 can be omitted without any loss of clarity.

Figure 7D:
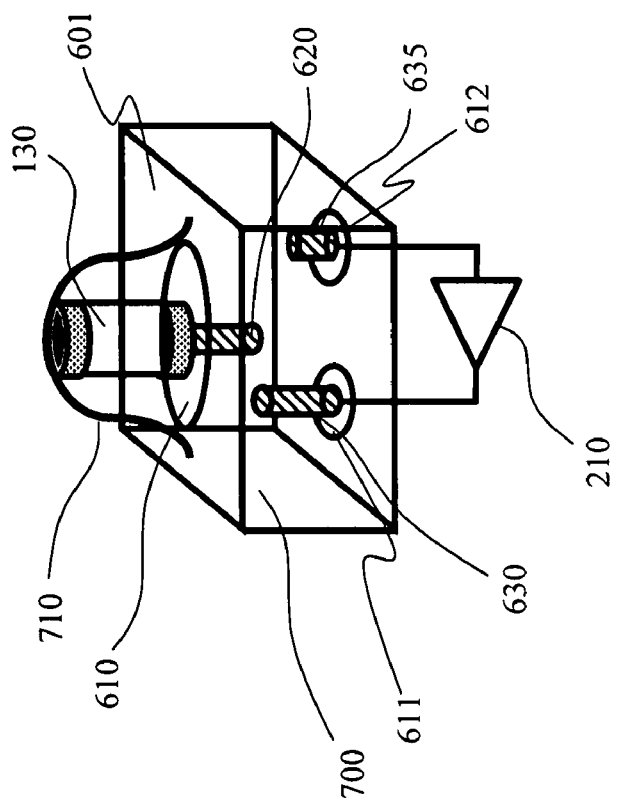
FIG. 7D is a perspective view of an external resonator electrode-less lamp, employing a distributed resonator, which is similar to the resonator of FIG. 6F and FIG. 7B but with the shape of the resonator substantially in the form of a rectangular block; feedback from the short feedback probe is delivered to the input of an RF amplifier; the longer input probe forms the other probe of the DRO, energy is coupled out of the resonator to the gas-fill vessel through an output probe, a grounding strap is seen connected with the gas-fill vessel making electrical connection to the circuit ground.
Figure 7C:
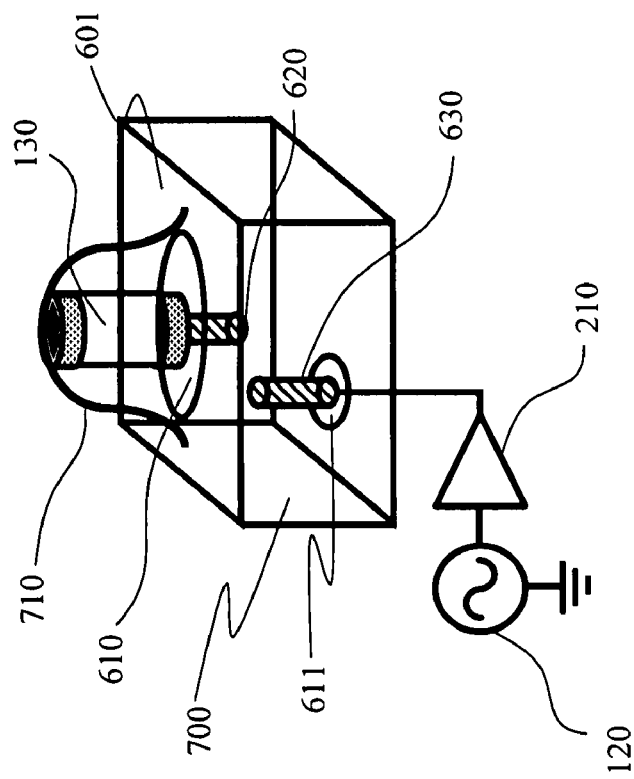
FIG. 7C is a perspective view of an external resonator electrode-less lamp, employing a distributed resonator, which is similar to the resonator of FIG. 6C and FIG. 7A but with the shape of the resonator substantially in the form of a rectangular block; energy is coupled from an RF source into the resonator via an input probe, and energy is coupled out of the resonator to the gas-fill vessel through an output probe; a grounding strap is seen connected with the gas-fill vessel making electrical connection to the circuit ground.

FIG. 7C is a perspective view of an external resonator electrode-less lamp, employing a distributed resonator 700, which is similar to the resonator 600 of FIG. 6C and FIG. 7A but with the shape of the resonator substantially in the form of a rectangular block. The rectangular block dielectric resonator 700 is not only a particularly useful embodiment of a dielectric resonator but shows that the shape of any of the resonators in FIG. 6A-FIG. 6J can be changed to suit a particular application without substantially changing the performance or general operating characteristics of the lamp. Energy is coupled from an RF source comprising an RF oscillator 120 and RF amplifier 210 into the resonator 700 via a e-field probe 630, and energy is coupled out of the resonator 700 to the gas-fill vessel through output probe 620, a grounding strap 710 makes electrical connection to the circuit ground. The resonator 700 is covered with a conductive layer except for areas around the e-field probes such as 610. The size (length and diameter) and location of the e-field probes 630 and 620 are optimized to maximize the RF energy transferred to the gas-fill vessel 130.

FIG. 7D is a perspective view of an external resonator electrode-less lamp, employing a distributed resonator, which is similar to the resonator 600 of FIG. 6F and FIG. 7B but with the shape of the resonator substantially in the form of a rectangular block. The resonator 700 is connected with gas-fill vessel 130. The shorter feedback e-field probe 635 couples a small amount of RF energy out of the resonator 700 and provides feedback to the input of RF amplifier 210 to create a Dielectric Resonator Oscillator (DRO). The input e-field probe 630 completes the oscillator circuit. RF Energy is coupled out of the resonator 700 to the gas-fill vessel 130 through the output e-field probe 620. Grounding strap 710 makes electrical connection from a portion of the gas-fill vessel 130 to circuit ground through conductive veneer 601. The resonator 700 is substantially covered by conductive veneer 601, except for input opening 611, output opening 610, and feedback opening 612. The size (length and diameter) and location of the input e-field probe 630, output e-field probe 620, and feedback e-field probe 635 are optimized to maximize RF energy transfer to gas-fill vessel 130. The resonant frequency of the dielectric resonator 700 is primarily determined by the dimensions of the dielectric resonator 700 and the dielectric constant of the material from which resonator 700 is made but will also depend on the dimensions of output e-field probe 620, input e-field probe 630, and—to a lesser extent—feedback e-field probe 635.

Figure 8A:
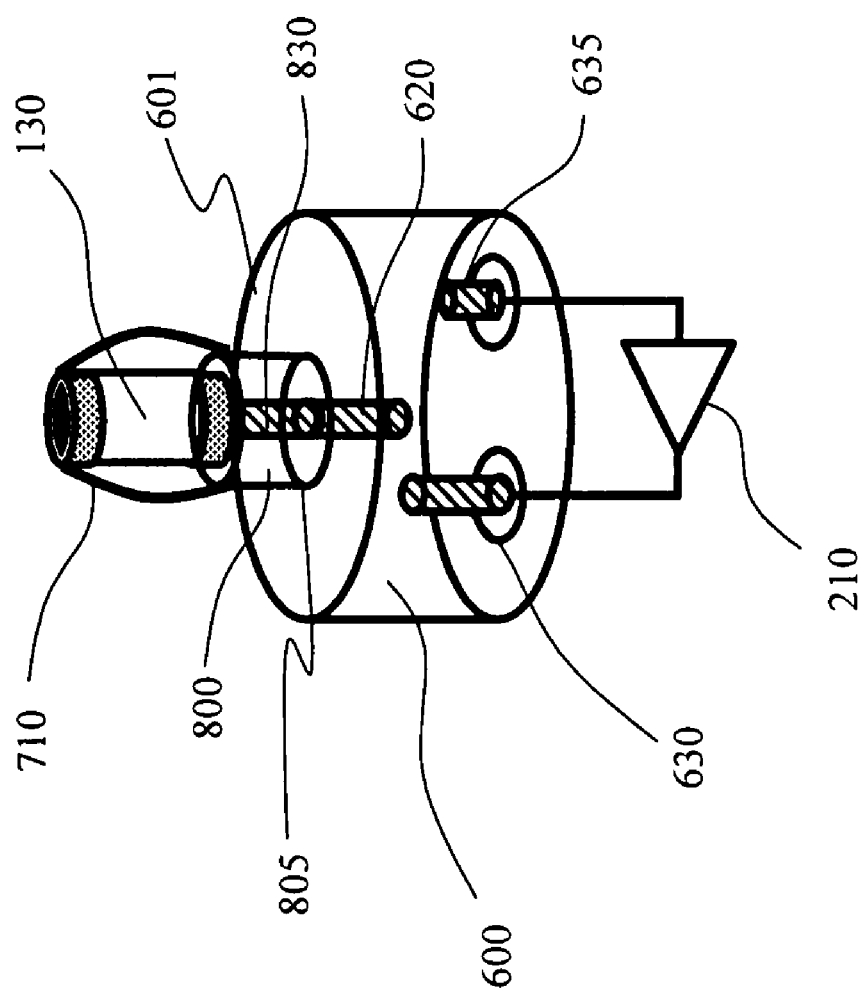
FIG. 8A is a perspective view of a distributed resonator and gas-fill vessel similar to FIG. 7B, a length of coaxial transmission line is added between the output probe of the resonator and the gas-fill vessel to provide additional space between the resonator and the gas-fill vessel; the dimensions of the probe are chosen to retain impedance match between the resonator and the gas-fill vessel, a grounding strap is seen connected with the gas-fill vessel making electrical connection to the circuit ground on the coaxial transmission line.

FIG. 8A is a perspective view of a distributed resonator 600 and gas-fill vessel 130 similar to FIG. 7B. A length of coaxial transmission line 800 is added between the output e-field probe 620 of the resonator 600 and the gas-fill 130 vessel to provide additional space between the resonator 600 and the gas-fill vessel 130. The dimensions of the output e-field probe 620 are chosen to retain impedance matching between the resonator 600 and the gas-fill vessel 130. The center conductor 830 of coaxial transmission line 800 is conductively connected with output e-field probe 620 and the outer conductor 805 of the coaxial transmission line 800 is conductively connected with the conductive veneer 601 covering the resonator 600, the conductive veneer 601 serving as a common RF ground. Raising the gas-fill vessel 130 above the resonator 600 via the coaxial transmission line 800 improves the collection efficiency of the light generated by the gas-fill vessel 130 when using an optical reflector, as is shown, for example, in FIG. 8B. A grounding strap 710 makes electrical connection from a portion of the gas-fill vessel 130 to the outer conductor 805 of the coaxial transmission line 800. Feedback from feedback e-field probe 635 through the amplifier 210 to input e-field probe 630 completes the DRO circuit providing RF power to the output e-field probe 620.

Figure 8B:
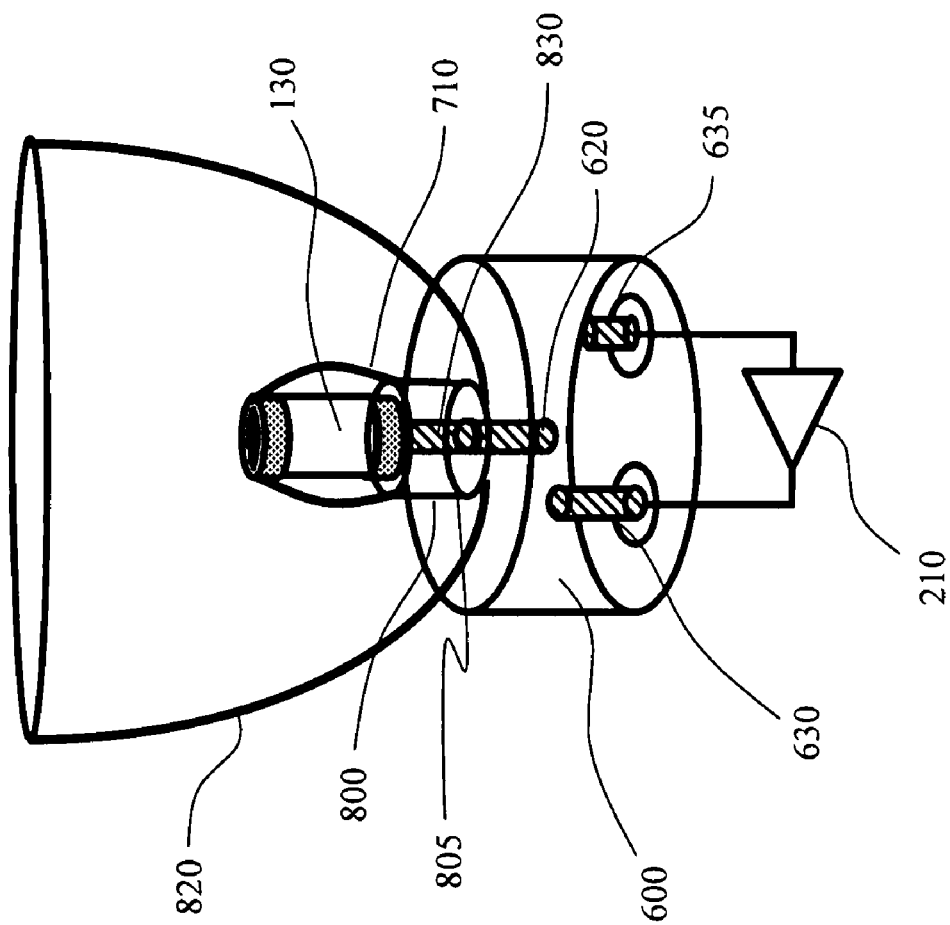
FIG. 8B is a perspective view of a distributed resonator and gas-fill vessel as shown in FIG. 8A, an optical reflector has been added to collect the light generated by the gas-fill vessel.

FIG. 8B is a perspective view of an external resonator electrode-less plasma lamp employing distributed resonator 600 and gas-fill vessel 130 as shown in FIG. 8A. An optical reflector 820 efficiently collects light generated by the gas-fill vessel and directs said light to its intended purpose, non-limiting examples of which are a collimated beam, a diffuse glow, a focused beam, or a pseudo point-source.

Figure 8C:
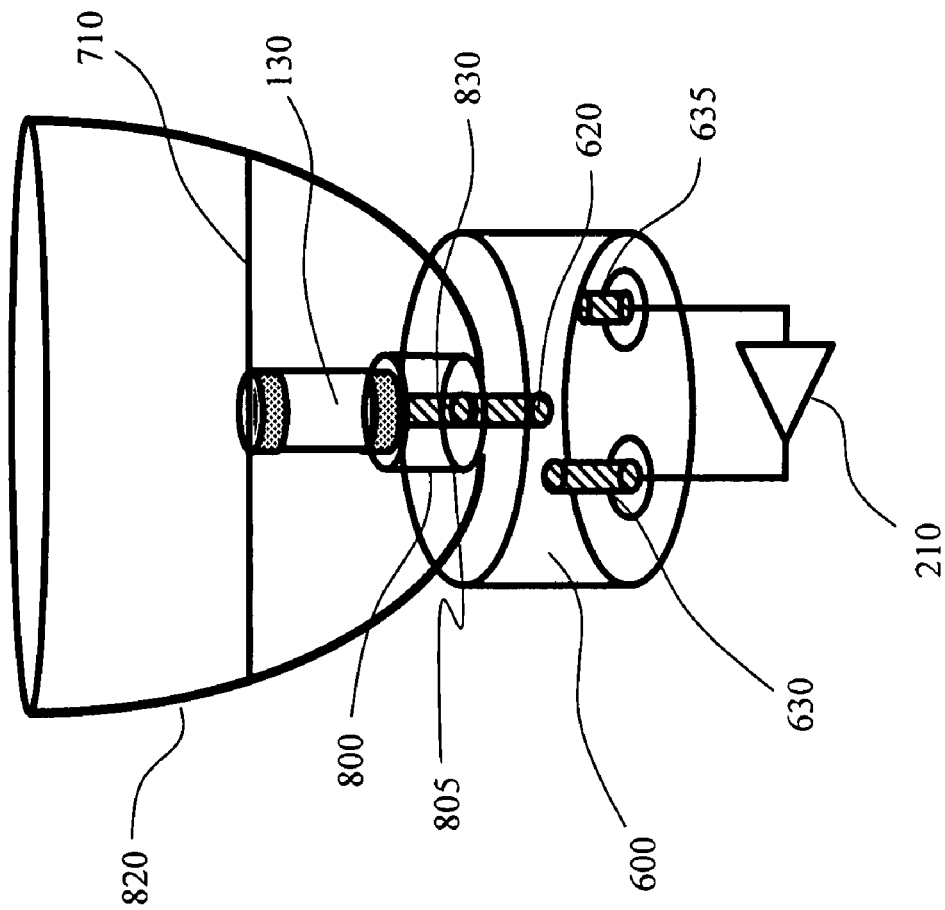
FIG. 8C is a perspective view of a distributed resonator and gas-fill vessel with optical reflector similar to FIG. 8B; the grounding strap connects the gas-fill vessel with an electrical conducting layer of the optical reflector which is connected to circuit ground.

FIG. 8C is a perspective view of an external resonator electrode-less plasma lamp employing distributed resonator 600 and gas-fill vessel 130 similar to FIG. 8B. The grounding strap 710 conductively connects an electrical conducting layer of the optical reflector 820, which is conductively connected with RF circuit ground, with the gas-fill vessel 130. The optical reflector can be made from an electrically-conducting material or can be a dielectric mirror with a backing layer that is made of an electrical conducting material such as a metal wire mesh. As can be appreciated by a person of ordinary skill in the art, these are just two examples of providing conducting optical reflectors. There are many methods of making conductive reflectors that are known in the art, and all suit this purpose.

FIG. 8D is a perspective view of an external resonator electrode-less plasma lamp employing distributed resonator 600 and gas-fill vessel 130 similar to FIG. 8C. The grounding strap 710 of FIG. 8C has been replaced by a metal wire mesh 810 to provide an improved conductive connection to RF ground as well as provide electromagnetic interference (EMI) shielding. In addition, the wire mesh is conductively connected with an electrical conducting layer of the optical reflector 820. This conducting layer can be a metal wire mesh backing for the optical reflector (as described above), a conductive veneer on the reflector, or any other conductive reflector known in the art.

Figure 8E:
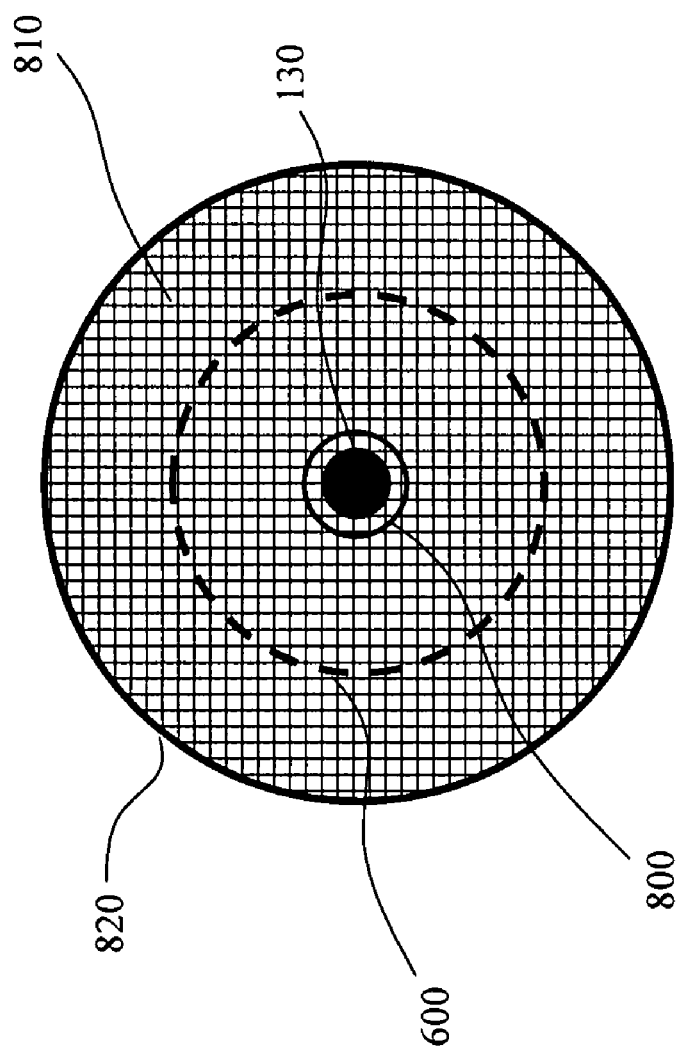
FIG. 8E is a plan view of FIG. 8D; the direction of viewing as shown in FIG. 8D; the gas-fill vessel is connected with the electrical conducting layer of the optical reflector with a metal wire mesh to provide circuit ground to the gas-fill vessel as well as provide shielding for EMI.

FIG. 8E is a plan view of FIG. 8D; the direction of viewing as shown in FIG. 8D. The gas-fill vessel 130 is conductively connected with the electrical conducting layer of optical reflector 820, with a metal wire mesh 810 providing the conductive connection to RF circuit ground, as well as provide shielding for EMI.

Figure 9:
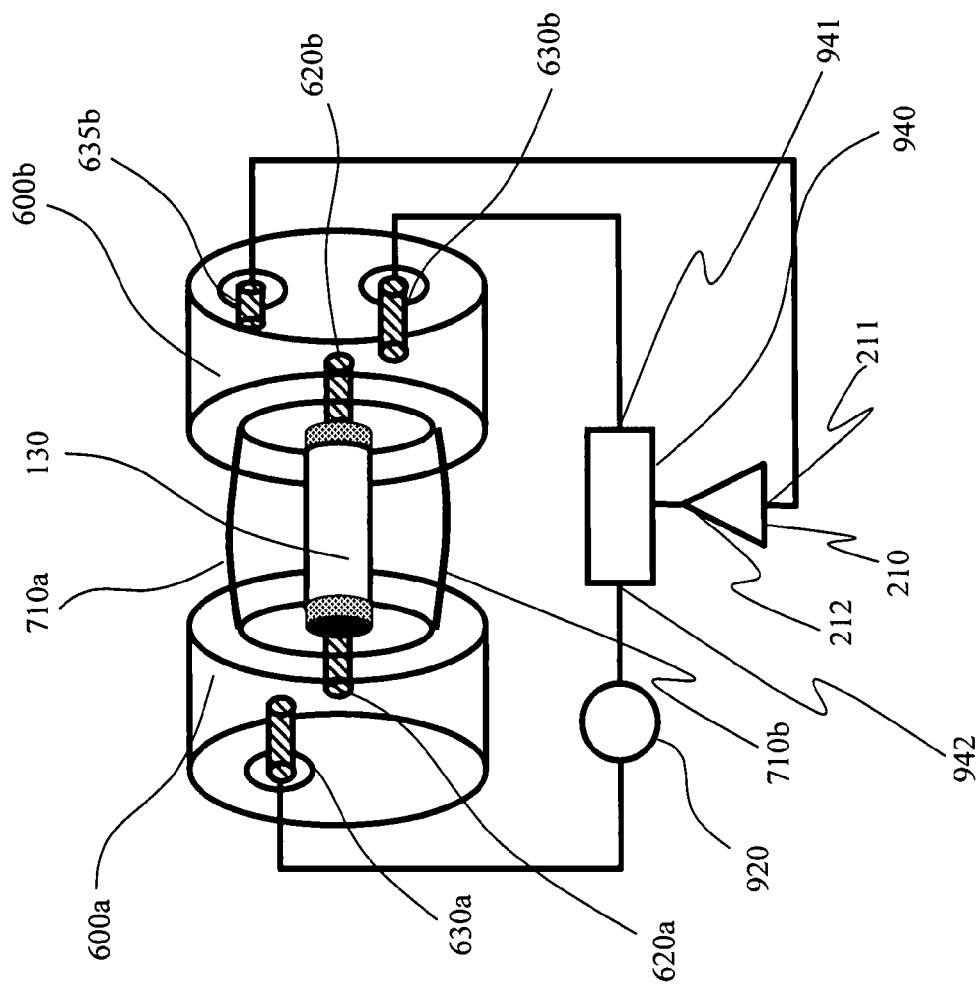
FIG. 9 is a perspective view of an external resonator electrode-less plasma lamp employing two distributed resonators as shown in FIG. 6A and FIG. 6D transferring RF energy to a gas-fill vessel; energy is coupled out of the two resonators to both ends of the gas-fill vessel, the ground of the two resonators are connected via grounding straps.

FIG. 9 is a perspective view of an external resonator electrode-less plasma lamp employing two distributed resonators 600a and 600b as shown in FIG. 6C and FIG. 6F, respectively, with gas-fill vessel 130. RF energy is coupled out of the two resonators 600a and 600b using input e-field probes 620a and 620b to both ends of the gas-fill vessel 130. The two resonators 600a and 600b are connected via grounding straps 710a and 710b. Feedback probe 635b couples a small amount of RF energy out of resonator 600b to feed to the RF power amplifier 210 input 211. The RF amplifier output 212 is split by power splitter 940. First power splitter output 941 of the power splitter 940 is conductively connected with input probe 630b of resonator 600b. Second power splitter output 942 of the power splitter 940 is conductively connected with input probe 630a of resonator 600a through RF phase shifter 920. By adjusting the RF phase shifter 920 as well as the input e-field probes 630a and 630b and output e-field probes 620a and 620b of the resonators 600a and 600b, respectively, the RF power delivered to gas-fill vessel 130 is maximized. This configuration can be used for gas-fill vessels that require more uniform distribution of emitted light along the length of the gas-fill vessel 130, such as in long gas-fill vessels, or for gas-fill vessels that require higher RF power levels, which is also a general requirement of longer or larger gas-fill vessels.

Figure 10:
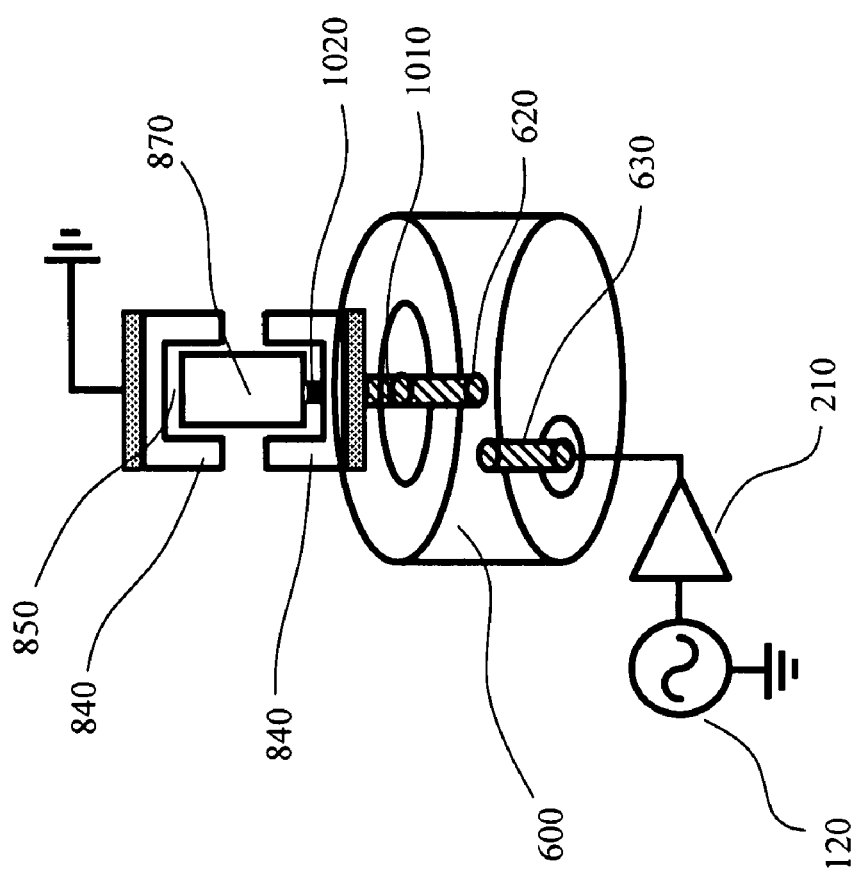
FIG. 10 is a perspective view of another implementation of the lamp shown in FIG. 7A; the RF source is coupled to the resonator via an input probe. The resonator is coupled to the gas-fill vessel through an output probe; the gas-fill vessel sits on thin air cushions between two coupling electrodes.

FIG. 10 is a perspective view of another specific implementation of the lamp of FIG. 7A. The RF source consisting of an oscillator 120 and RF amplifier 210 is coupled to the resonator via input e-field probe 630. The resonator is coupled to a first coupling electrode 840 through output e-field probe 620, which is conductively connected with an extender 1010 to slightly separate the coupling electrode 840 from the resonator 600. The gas-fill vessel 870 sits on thin air cushions 850 between two coupling electrodes with short stem 1020 that is a thermal insulator made from quartz or another low thermal conductivity and thermally insulating material holding the gas-fill vessel in place. Addition of the air cushions 850 reduces the thermal load presented to the ends of the gas-fill vessel and allows the lamp to operate more efficiently and reliably. The internal walls of the coupling electrodes 840 can be made from optically reflective material to reflect part of the light from the gas-fill vessel back into it to enhance the properties of the emitted light.

Figure 11:
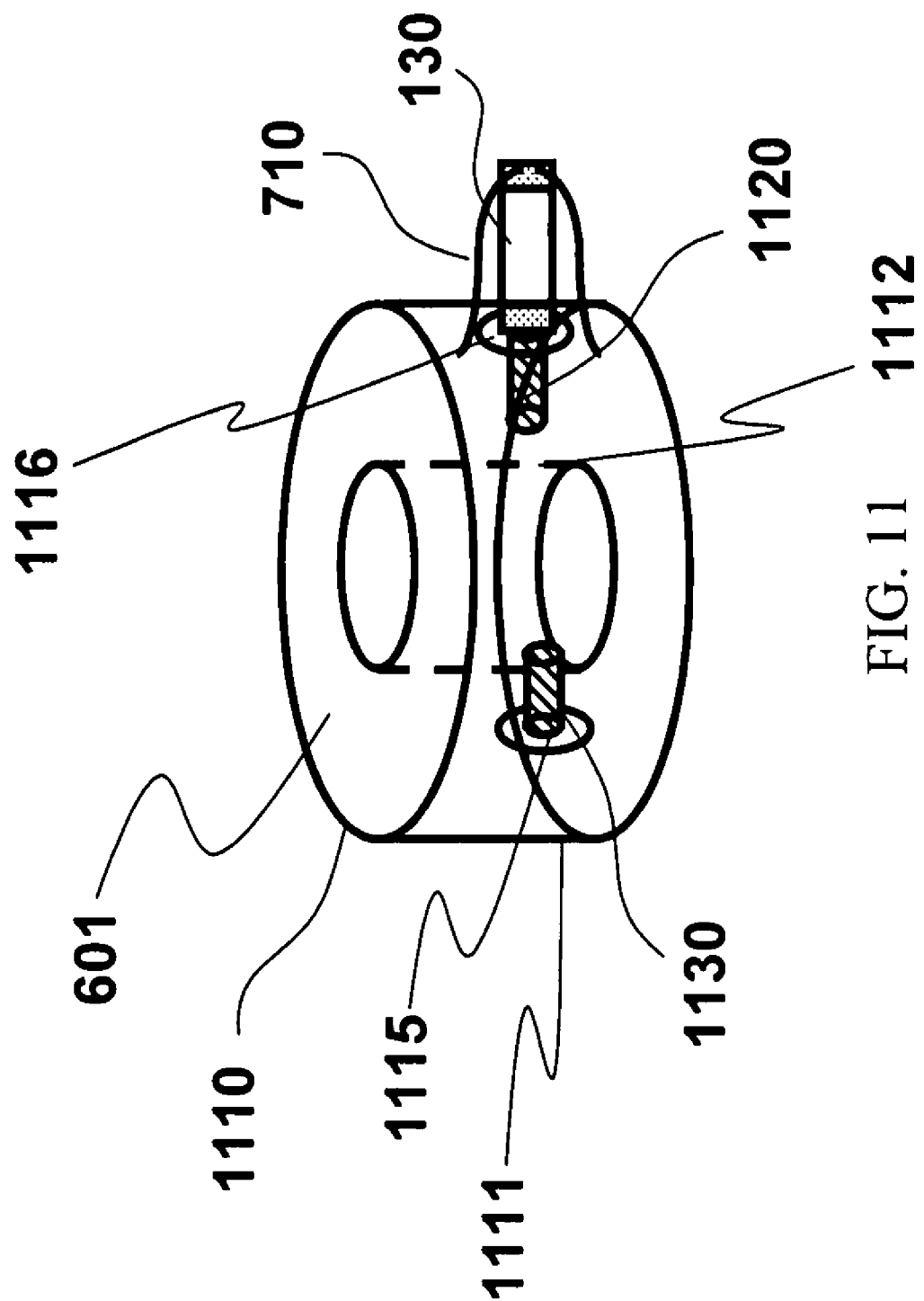
FIG. 11 depicts a distributed resonator and gas-fill vessel similar to FIG. 7A but with the resonator shown substantially in the form of a toroid.

FIG. 11 is a perspective view of an external resonator electrode-less plasma lamp employing a distributed resonator 1110 similar to FIG. 7A but with the resonator 1110 substantially in the form of a toroid. A surface 1111 and a central hole 1112 substantially geometrically define the toroidal resonator 1110 made from a dielectric material such as alumina. The outside diameter of the toroid, the size of the central hole, and the dielectric constant of the material determine the resonant frequency of the toroidal resonator. RF energy is coupled from an RF source into the toroidal resonator 1110 via input e-field probe 1130 along the direction of the electric field in the resonator, and energy is coupled out of the resonator 1110 to the gas-fill vessel 130 through output e-field probe 1120. Grounding strap 710 makes an electrical connection to the conductive veneer 601, which serves as RF circuit ground. The conductive veneer 601 substantially covers the toroidal resonator 1110 except for input opening 1115 and output opening 1116.

One of ordinary skill in the art can appreciate that, in all the embodiments described above, and, in general, the exact positions and orientations of the probing means, which include but are not limited to e-field probes, patch antenna, and h-field patches, is unimportant as long as the desired coupling rates and impedance matching of RF energy to the gas-fill vessel 130 are maintained. In particular, the probes could be connected with—in the case of patch antenna or h-field patches—or inserted into—in the case of e-field probes—any portion of the resonator 600 that has an opening in the conductive veneer 601. In addition, any of the particular embodiments described above can be made to utilize patch antenna, e-field probes, h-field patches, or any other probing means known in the art in any combination, regardless of the particular probes shown in the figures, without substantially changing the basic operating principles or performance of the invention, as long as the desired coupling rates and impedance matching of RF energy to the gas-fill vessel 130 are maintained.

As can be appreciated by one skilled in the art, although the above description utilized many specific measurements and parameters, the invention is not limited thereto and is to be afforded the widest scope possible. Additionally, although the device is described as being used as a lamp which produces visible light for illumination, it is not intended to be limited to this region of the electromagnetic spectrum and can be incorporated into a wide array of devices for a large variety of uses, including uses which require illumination in the ultra-violet and infrared portions of the electromagnetic spectrum.

What is claimed is:

1. A plasma electrode-less lamp, comprising:
   (a) a gas-fill vessel comprising:
      (i) a closed, transparent body comprising:
         (A) a first end;
         (B) a second end;
         (C) an outer surface; and
         (D) an inner surface, the inner surface forming a cavity;
      (ii) a first refractory veneer substantially covering a first portion of the body of the gas-fill vessel;
      (iii) a second refractory veneer substantially covering a second portion of the body of the gas-fill vessel;
      (iv) a first conductive veneer substantially covering the first refractory veneer; and
      (v) a second conductive veneer substantially covering the second refractory veneer;
   (b) a gas-fill contained within the gas-fill vessel, the gas-fill comprising:
      (i) a fluorophor; and
      (ii) an inert gas;
   (c) an RF electromagnetic radiation source comprising:
      (i) an RF electromagnetic oscillator; and
      (ii) an RF amplifier comprising:
         (A) an RF amplifier input conductively connected with the RF electromagnetic oscillator; and
         (B) an RF amplifier output;
   (d) an RF electromagnetic resonator having a Q such that a substantial amount of RF power is coupled into the gas-fill, the RF electromagnetic resonator comprising:
      (i) a body comprising a dielectric material, the body having an input end and an output end;
      (ii) a conductive veneer substantially covering the dielectric body;
      (iii) an output opening in the conductive veneer on the output end; and
      (iv) an input opening in the conductive veneer on the input end;
   (e) an output probe conductively connected with the second conductive veneer of the gas-fill vessel, the output probe selected from the group consisting of e-field probe, h-field probe, and patch antenna, the output probe intersecting the output end substantially within the output opening, the size, shape, and position of the output probe creating substantial impedance matching between the RF electromagnetic resonator and the gas-fill vessel;
   (f) an input probe conductively connected with the RF amplifier output of the RF electromagnetic radiation source, the input probe selected from the group consisting of e-field probe, h-field probe, and patch antenna, the input probe intersecting the input end substantially within the input opening, the size, shape, and position of the input probe creating substantial impedance matching between the RF electromagnetic resonator and the RF electromagnetic radiation source; and
   (g) a grounding strap conductively connecting the first conductive veneer of the gas-fill vessel with the conductive veneer of the RF electromagnetic resonator;
   whereby RF electromagnetic radiation is coupled to the gas via the RF electromagnetic resonator, which forms a plasma that heats the fluorophor and thus causes the fluorophor to fluoresce.

2. A plasma electrode-less lamp as set forth in claim 1, wherein the body of the RF electromagnetic resonator is substantially a cylinder.

3. A plasma electrode-less lamp as set forth in claim 1, wherein the body of the RF electromagnetic resonator is substantially a rectangular block.

4. A plasma electrode-less lamp as set forth in claim 1, further comprising a reflector, the reflector conductively connected with the conductive veneer of the RF electromagnetic resonator, the reflector having a shape such that light emitted from the gas-fill vessel is substantially collected and substantially directed, focused, or collimated, and wherein the grounding strap is a wire mesh that conductively connects the reflector with the first conductive veneer of the gas-fill vessel without substantially obstructing light emanating from the reflector, the mesh further providing electromagnetic interference shielding for the RF plasma electrode-less lamp.

5. A plasma electrode-less lamp as set forth in claim 1, further comprising:
   (a) an extender, the extender conductively connecting the second conductive veneer of the gas-fill vessel with the output probe such that a gap is created between the gas-fill vessel and the RF electromagnetic resonator;
   (b) a short stem, the short stem substantially a thermal insulator, the short stem connecting the second refractory veneer of the gas-fill vessel with the second end of the transparent body of the gas-fill vessel such that air cushions are created between the second end of the refractory veneer of the gas-fill vessel and the second end of the transparent body of the gas-fill vessel such that the gas-fill vessel is thermally isolated from the resonator.

6. A plasma electrode-less lamp as set forth in claim 1, further comprising a coaxial transmission line comprising:
   (a) a center conductor conductively connecting the output probe with the second conductive veneer of the gas-fill vessel;
   (b) an outer conductor conductively connecting the grounding strap with the conductive veneer of the RF electromagnetic resonator; and
   (c) a length such that the RF electromagnetic resonator is substantially impedance matched to the gas-fill vessel,
   whereby light collection efficiency is substantially improved by raising the gas-fill vessel substantially away from the RF electromagnetic resonator.

7. A plasma electrode-less lamp as set forth in claim 1, further comprising a tuning blind hole in the RF electromagnetic resonator, the tuning blind hole substantially penetrating into the RF electromagnetic resonator and wherein the conductive veneer of the RF electromagnetic resonator extends substantially within the tuning blind hole such that RF electromagnetic radiation of substantially lower energy resonates inside the RF electromagnetic resonator, whereby the RF electromagnetic resonator is tuned by the size, shape, and position of the tuning blind hole.

8. A plasma electrode-less lamp as set forth in claim 1, further comprising a plurality of tuning blind holes in the RF electromagnetic resonator, wherein each of the tuning blind holes substantially penetrates into the RF electromagnetic resonator and wherein the conductive veneer of the RF electromagnetic resonator extends substantially within each of the tuning blind holes such that RF electromagnetic radiation of substantially lower energy resonates inside the RF electromagnetic resonator, whereby the RF electromagnetic resonator is tuned by the size, shape, and position each of the tuning blind holes.

9. A plasma electrode-less lamp, comprising:
   (a) a gas-fill vessel comprising:
      (i) a closed, transparent body comprising:
         (A) a first end;
         (B) a second end;

(C) an outer surface; and
(D) an inner surface, the inner surface forming a cavity;
(ii) a first refractory veneer substantially covering a first portion of the body of the gas-fill vessel;
(iii) a second refractory veneer substantially covering a second portion of the body of the gas-fill vessel;
(iv) a first conductive veneer substantially covering the first refractory veneer; and
(v) a second conductive veneer substantially covering the second refractory veneer;
(b) a gas-fill contained within the gas-fill vessel, the gas-fill comprising:
(i) a fluorophor; and
(ii) an inert gas;
(c) an RF electromagnetic amplifier having gain substantial to sustain RF oscillations, the RF electromagnetic amplifier comprising:
(i) an RF amplifier input; and
(ii) an RF amplifier output;
(d) an RF electromagnetic resonator having a Q such that a substantial amount of RF power is coupled into the gas-fill, the RF electromagnetic resonator comprising:
(i) a body comprising a dielectric material, the body having an input end and an output end;
(ii) a conductive veneer substantially covering the dielectric body;
(iii) an output opening in the conductive veneer on the output end;
(iv) an input opening in the conductive veneer on the input end; and
(v) a feedback opening in the conductive veneer on the input end;
(e) an output probe conductively connected with the second conductive veneer of the gas-fill vessel, the output probe selected from the group consisting of e-field probe, h-field probe, and patch antenna, the output probe intersecting the output end substantially within the output opening, the size, shape, and position of the output probe creating substantial impedance matching between the RF electromagnetic resonator and the gas-fill vessel;
(f) an input probe conductively connected with the RF amplifier output of the RF electromagnetic radiation source, the input probe selected from the group consisting of e-field probe, h-field probe, and patch antenna, the input probe intersecting the input end substantially within the input opening, the size, shape, and position of the input probe creating substantial impedance matching between the RF electromagnetic resonator and the RF electromagnetic amplifier;
(g) a feedback probe conductively connected with the RF amplifier input of the RF electromagnetic radiation source, the feedback probe selected from the group consisting of e-field probe, h-field probe, and patch antenna, the feedback probe intersecting the input end substantially within the feedback opening; and
(h) a grounding strap conductively connecting the first conductive veneer of the gas-fill vessel with the conductive veneer of the RF electromagnetic resonator;
whereby RF electromagnetic radiation is coupled to the gas via the RF electromagnetic resonator, which forms a plasma that heats the fluorophor and thus causes the fluorophor to fluoresce.

10. A plasma electrode-less lamp as set forth in claim 9, wherein the body of the RF electromagnetic resonator is substantially a cylinder.

11. A plasma electrode-less lamp as set forth in claim 9, wherein the body of the RF electromagnetic resonator is substantially a rectangular block.

12. A plasma electrode-less lamp as set forth in claim 9, further comprising a reflector, the reflector conductively connected with the conductive veneer of the RF electromagnetic resonator, the reflector having a shape such that light emitted from the gas-fill vessel is substantially collected and substantially directed, focused, or collimated, and wherein the grounding strap is a wire mesh that conductively connects the reflector with the first conductive veneer of the gas-fill vessel without substantially obstructing light emanating from the reflector, the mesh further providing electromagnetic interference shielding of the gas-fill vessel.

13. A plasma electrode-less lamp as set forth in claim 9, further comprising:
(a) an extender, the extender conductively connecting the second conductive veneer of the gas-fill vessel with the output probe such that a gap is created between the gas-fill vessel and the RF electromagnetic resonator;
(b) a short stem, the short stem substantially a thermal insulator, the short stem connecting the second refractory veneer of the gas-fill vessel with the second end of the transparent body of the gas-fill vessel such that thermally-insulating air cushions are created between the second end of the refractory veneer of the gas-fill vessel and the second end of the transparent body of the gas-fill vessel.

14. A plasma electrode-less lamp as set forth in claim 9, further comprising a coaxial transmission line comprising:
(a) a center conductor conductively connecting the output probe with the second conductive veneer of the gas-fill vessel;
(b) an outer conductor conductively connecting the grounding strap with the conductive veneer of the RF electromagnetic resonator; and
(c) a length such that the RF electromagnetic resonator is substantially impedance matched to the gas-fill vessel,
whereby light collection efficiency is improved by raising the gas-fill vessel substantially away from the RF electromagnetic resonator.

15. A plasma electrode-less lamp as set forth in claim 9, further comprising a tuning blind hole in the RF electromagnetic resonator, the tuning blind hole substantially penetrating into the RF electromagnetic resonator and wherein the conductive veneer of the RF electromagnetic resonator extends substantially within the tuning blind hole such that RF electromagnetic radiation of substantially lower energy resonates inside the RF electromagnetic resonator, whereby the RF electromagnetic resonator is tuned by the size, shape, and position of the tuning blind hole.

16. A plasma electrode-less lamp as set forth in claim 9, further comprising a plurality of tuning blind holes in the RF electromagnetic resonator, wherein each of the tuning blind holes substantially penetrates into the RF electromagnetic resonator and wherein the conductive veneer of the RF electromagnetic resonator extends substantially within each of the tuning blind holes such that RF electromagnetic radiation of substantially lower energy resonates inside the RF electromagnetic resonator, whereby the RF electromagnetic resonator is tuned by the size, shape, and position each of the tuning blind holes.

17. A plasma electrode-less lamp, comprising:
(a) a gas-fill vessel comprising:
(i) a closed, transparent body comprising:
(A) a first end;
(B) a second end;

(C) an outer surface; and
(D) an inner surface, the inner surface forming a cavity;
(ii) a first refractory veneer substantially covering a first portion of the body of the gas-fill vessel;
(iii) a second refractory veneer substantially covering a second portion of the body of the gas-fill vessel;
(iv) a first conductive veneer substantially covering the first refractory veneer; and
(v) a second conductive veneer substantially covering the second refractory veneer;
(b) a gas-fill contained within the gas-fill vessel, the gas-fill comprising:
(i) a fluorophor; and
(ii) an inert gas;
(c) an RF phase shifter comprising:
(i) a phase shifter output; and
(ii) a phase shifter input;
(d) an RF power splitter comprising:
(i) a splitter input;
(ii) a first splitter output conductively connected with the phase shifter input of the RF phase shifter; and
(iii) a second splitter output;
(e) an RF electromagnetic amplifier comprising:
(i) an RF amplifier input conductively connected with a source of RF oscillations; and
(ii) an RF amplifier output conductively connected with the splitter input of the RF power splitter;
(f) a first RF electromagnetic resonator having a first Q such that a substantial amount of RF power is coupled into the gas-fill, the RF electromagnetic resonator comprising:
(i) a first body comprising a first dielectric material, the first body having a first input end and a first output end;
(ii) a first conductive veneer substantially covering the first dielectric body;
(iii) a first output opening in the first conductive veneer on the first output end; and
(iv) a first input opening in the first conductive veneer on the first input end;
(g) a first output probe conductively connected with the first conductive veneer of the gas-fill vessel, the first output probe selected from the group consisting of e-field probe, h-field probe, and patch antenna, the first output probe intersecting the first output end substantially within the first output opening, the size, shape, and position of the first output probe creating substantial impedance matching between the first RF electromagnetic resonator and the gas-fill vessel;
(h) a first input probe conductively connected with the phase shifter output, the first input probe selected from the group consisting of e-field probe, h-field probe, and patch antenna, the first input probe intersecting the first input end substantially within the first input opening, the size, shape, and position of the first input probe creating substantial impedance matching between the first RF electromagnetic resonator and the RF electromagnetic amplifier;
(i) a second RF electromagnetic resonator having a second Q such that a substantial amount of RF power is coupled into the gas-fill, the RF electromagnetic resonator comprising:
(i) a second body comprising a second dielectric material, the second body having a second input end and a second output end;

(ii) a second conductive veneer substantially covering the second dielectric body;
(iii) a second output opening in the second conductive veneer on the second output end; and
(iv) a second input opening in the second conductive veneer on the second input end;
(j) a second output probe conductively connected with the second conductive veneer of the gas-fill vessel, the second output probe selected from the group consisting of e-field probe, h-field probe, and patch antenna, the second output probe intersecting the second output end substantially within the second output opening, the size, shape, and position of the second output probe creating substantial impedance matching between the second RF electromagnetic resonator and the gas-fill vessel;
(k) a second input probe conductively connected with the second splitter output, the second input probe selected from the group consisting of e-field probe, h-field probe, and patch antenna, the second input probe intersecting the second input end substantially within the second input opening, the size, shape, and position of the second input probe creating substantial impedance matching between the second RF electromagnetic resonator and the RF electromagnetic amplifier; and
(l) a grounding strap conductively connecting the first conductive veneer of the first RF electromagnetic resonator with the second conductive veneer of the second RF electromagnetic resonator;
whereby RF electromagnetic radiation is coupled to the gas via both the first RF electromagnetic resonator and the second RF electromagnetic resonator, the gas forming a plasma that heats the fluorophor and thus causes the fluorophor to fluoresce.

18. A plasma electrode-less lamp as set forth in claim 17, further comprising:
a feedback opening in the second conductive veneer on the second input end of the second RF electromagnetic resonator; and
a feedback probe selected from the group consisting of e-field probe, h-field probe, and patch antenna, the feedback probe intersecting the second input end substantially within the second feedback opening, the feedback probe further conductively connected with the RF amplifier input, the feedback probe thus acting as the source of RF oscillations;
and wherein the RF electromagnetic amplifier has sufficient gain to sustain RF oscillations.

19. A plasma electrode-less lamp, comprising:
(a) a gas-fill vessel comprising:
(i) a closed, transparent body comprising:
(A) a first end;
(B) a second end;
(C) an outer surface; and
(D) an inner surface, the inner surface forming a cavity;
(ii) a first refractory veneer substantially covering a first portion of the body of the gas-fill vessel;
(iii) a second refractory veneer substantially covering a second portion of the body of the gas-fill vessel;
(iv) a first conductive veneer substantially covering the first refractory veneer; and
(v) a second conductive veneer substantially covering the second refractory veneer;
(b) a gas-fill contained within the gas-fill vessel, the gas-fill comprising:
(i) a fluorophor; and
(ii) an inert gas;

(c) an RF electromagnetic radiation source comprising:
  (i) an RF electromagnetic oscillator; and
  (ii) an RF amplifier comprising:
    (A) an RF amplifier input conductively connected with the RF electromagnetic oscillator; and
    (B) an RF amplifier output;
(d) an RF electromagnetic resonator comprising:
  (i) a toroidal body comprising a dielectric material with a surface and a central hole;
  (ii) a conductive veneer substantially covering the surface of the toroidal body and inside the central hole;
  (iii) an output opening in the conductive veneer; and
  (iv) an input opening in the conductive veneer;
(e) an output probe conductively connected with the first conductive veneer of the gas-fill vessel, the output probe selected from the group consisting of e-field probe, h-field probe, and patch antenna, the output probe intersecting the output end substantially within the output opening, the size, shape, and position of the output probe creating substantial impedance matching between the RF electromagnetic resonator and the gas-fill vessel;
(f) an input probe conductively connected with the RF amplifier output of the RF electromagnetic radiation source, the input probe selected from the group consisting of e-field probe, h-field probe, and patch antenna, the input probe intersecting the input end substantially within the input opening, the size, shape, and position of the input probe creating substantial impedance matching between the RF electromagnetic resonator and the RF electromagnetic radiation source; and
(g) a grounding strap conductively connecting the first conductive veneer of the gas-fill vessel with the conductive veneer of the RF electromagnetic resonator;
whereby RF electromagnetic radiation is coupled to the gas via the RF electromagnetic resonator, which forms a plasma that heats the fluorophor and thus causes the fluorophor to fluoresce.

* * * * *